United States Patent
Yu

(10) Patent No.: US 11,399,331 B2
(45) Date of Patent: Jul. 26, 2022

(54) NETWORK ACCESS METHOD, RELATED APPARATUS, AND SYSTEM

(71) Applicant: HUAWEI TECHNOLOGIES CO., LTD., Guangdong (CN)

(72) Inventor: Youyang Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 83 days.

(21) Appl. No.: 17/100,457

(22) Filed: Nov. 20, 2020

(65) Prior Publication Data

US 2021/0076301 A1 Mar. 11, 2021

Related U.S. Application Data

(63) Continuation of application No. PCT/CN2019/086411, filed on May 10, 2019.

(30) Foreign Application Priority Data

May 22, 2018 (CN) .......................... 201810497274.4
Jun. 26, 2018 (CN) .......................... 201810672363.8

(51) Int. Cl.
*H04W 48/02* (2009.01)
*H04W 48/08* (2009.01)

(52) U.S. Cl.
CPC ........... *H04W 48/02* (2013.01); *H04W 48/08* (2013.01)

(58) Field of Classification Search
None
See application file for complete search history.

(56) References Cited

U.S. PATENT DOCUMENTS

2010/0303009 A1* 12/2010 Liu ................. H04W 48/17 370/328
2014/0274097 A1   9/2014 Chen et al.
2020/0280562 A1*  9/2020 Salkintzis ............... H04L 65/80

FOREIGN PATENT DOCUMENTS

CN 102740401 A 10/2012
CN 102883378 A  1/2013
(Continued)

OTHER PUBLICATIONS

Office Action issued in Indian Application No. 202027050228 dated Dec. 10, 2021, 6 pages.
(Continued)

*Primary Examiner* — Hong S Cho
(74) *Attorney, Agent, or Firm* — Fish & Richardson P.C.

(57) ABSTRACT

Embodiments of this application disclose a network access method. The method may include: receiving, by a data management network element, a request message from an access and mobility management function network element, where the request message includes identification information of user equipment and identification information of a residential gateway connected to the user equipment; determining, by the data management network element, subscription data of the residential gateway based on the identification information of the residential gateway; determining, by the data management network element, a subscription type of the user equipment based on the subscription data of the residential gateway and the identification information of the user equipment; and sending, by the data management network element, indication information of the subscription type to the access and mobility management function network element, where the subscription type indicates a subscriber or a non-subscriber of the residential gateway.

20 Claims, 21 Drawing Sheets

(56) References Cited

FOREIGN PATENT DOCUMENTS

| CN | 103024738 A | 4/2013 |
|---|---|---|
| CN | 103813409 A | 5/2014 |
| CN | 105188041 A | 12/2015 |
| CN | 105704762 A | 6/2016 |
| EP | 2096884 A1 | 9/2009 |
| WO | 2011134320 A1 | 11/2011 |

OTHER PUBLICATIONS

3GPP TR 23.716 V0.1.0 (Aug. 2017), "3rd Generation Partnership Project;Technical Specification Group Services and System Aspects;Study on the Wireless and Wireline Convergence for the 5G system architecture;(Release 15)," Aug. 2017, 17 pages.
Extended European Search Report issued in European Application No. 19808381.8 dated May 14, 2021, 9 pages.
Office Action issued in Chinese Application No. 201810672363.8 dated Mar. 16, 2020, 14 pages (with English translation).
PCT International Search Report and Written Opinion issued in International Application No. PCT/CN2019/086411 dated Aug. 9, 2019, 15 pages (with English translation).

* cited by examiner

NETWORK ACCESS METHOD, RELATED APPARATUS, AND SYSTEM

CROSS-REFERENCE TO RELATED APPLICATIONS

This application is a continuation of International Application No. PCT/CN2019/086411, filed on May 10, 2019, which claims priority to Chinese Patent Application No. 201810672363.8, filed on Jun. 26, 2018, which claims priority to Chinese Patent Application No. 201810497274.4, filed on May 22, 2018. The disclosure of the aforementioned applications are hereby incorporated by reference in their entireties.

TECHNICAL FIELD

This application relates to the field of wireless communications technologies, and in particular, to a network access method, a related apparatus, and a system.

BACKGROUND

A generalized functional design plus a forward compatible "access network-core network" interface enables a generalized 5G core 5th generation core, 5GC) network to cooperate with different access networks. In addition to access through radio access network (RAN), the 5GC further needs to support access through a fixed network/wireline network. For example, a 5G residential gateway (5G RG)/customer-premises equipment (CPE) accesses the 5GC through a wireline 5G access network (W-5GAN).

In a scenario in which the residential gateway accesses the 5GC through the wireline 5G access network, 5GC capable user equipment (UE) may access the 5GC through the 5G residential gateway. In this case, the 5GC capable user equipment is a remote device, and the 5G residential gateway is a relay device. Currently, a technical solution is urgently needed to support this access mode, to enable the remote device to access the 5GC through the relay device.

SUMMARY

Embodiments of this application provide a network access method, a related apparatus, and a system, so that user equipment (UE) can access a 5GC through a residential gateway and the 5GC can support more access modes. This improves convergence of a fixed network and a mobile network.

According to a first aspect, this application provides a network access method, applied to a unified data management network element side. The method may include: receiving, by a unified data management network element, a request message from an access and mobility management function network element, where the request message includes identification information of user equipment and identification information of a residential gateway connected to the user equipment; determining, by the unified data management network element, subscription data of the residential gateway based on the identification information of the residential gateway, and determining a classification type of the user equipment based on the subscription data of the residential gateway and the identification information of the user equipment; and sending, by the unified data management network element, indication information of a subscription type to the access and mobility management function network element. The subscription type indicates a subscriber or a non-subscriber of the residential gateway.

In some embodiments of the first aspect, the classification type of the user equipment includes the subscription type. The subscription type indicates a subscriber or a non-subscriber of the residential gateway.

With reference to the first aspect, in some optional embodiments, the subscription data of the residential gateway may include identification information of user equipment that is a subscriber of the residential gateway. In this case, the determining, by the unified data management network element, a subscription type of the user equipment based on the subscription data of the residential gateway and the identification information of the user equipment may specifically include: if the identification information of the user equipment belongs to the identification information of the user equipment that is a subscriber of the residential gateway, determining, by the unified data management network element, that the user equipment is a subscriber of the residential gateway.

With reference to the first aspect, in some optional embodiments, the subscription data may further include indication information of a type of access to the residential gateway, and the type of access indicates whether the residential gateway allows access of a non-subscriber.

With reference to the first aspect, in some optional embodiments, the unified data management network element may determine, in the following manners, whether the user equipment is allowed to access a residential gateway:

Optionally, if the identification information of the user equipment belongs to the identification information of the user equipment that is a subscriber of the residential gateway, the unified data management network element determines that the user equipment is allowed to access the residential gateway. This is because the subscriber can access the residential gateway regardless of whether a type of the residential gateway is an open type (in this case, access of a non-subscriber is allowed) or a private type (in this case, access of a non-subscriber is not allowed).

Optionally, if the identification information of the user equipment does not belong to the identification information of the user equipment that is a subscriber of the residential gateway but the type of access to the residential gateway indicates that the residential gateway allows access of a non-subscriber, the unified data management network element determines that the user equipment is allowed to access the residential gateway.

Optionally, if the identification information of the user equipment does not belong to the identification information of the user equipment that is a subscriber of the residential gateway and the type of access to the residential gateway indicates that the residential gateway does not allow access of a non-subscriber, the unified data management network element determines that the user equipment is not allowed to access the residential gateway.

A subscriber list and the indication information of the type of access to the residential gateway are not limited thereto. Content of the subscription data of the residential gateway may alternatively exist in another form, provided that specific subscribers of the residential gateway can be indicated and specific users allowed to access the residential gateway can be indicated. For example, the subscription data may include a mapping table. The mapping table includes identification information of a plurality of UEs and indication information of subscription types respectively corresponding to the identification information of the plurality of UEs. The identification information of the plurality of UEs may include identification information of UE that is a subscriber, and may further include identification information of UE that is a non-subscriber. In this way, based on identification information of specific UE, a subscription type corresponding to the specific UE may be obtained by searching the mapping table.

With reference to the first aspect, in some optional embodiments, the method described in the first aspect may further include: sending, by the unified data management network element, access indication information to the access and mobility management function network element. The access indication information may indicate whether the user equipment is allowed to access the residential gateway.

Specifically, the access indication information may be a security key. In this case, a W-5GAN may determine, based on the received security key, that authentication of the UE succeeds, and therefore determine that access of the UE is allowed. Alternatively, the access indication information may be an EAP-Success message. In this case, after receiving the EAP-Success message, a 5G-RG may determine that authentication of the UE succeeds, and therefore determine that access of the UE is allowed.

With reference to the first aspect, in some optional embodiments, the method described in the first aspect may further include: sending, by the unified data management network element, the subscription data to the access and mobility management function network element. In this way, the access and mobility management function network element may also determine, based on the subscription data, the subscription type of the UE and whether the UE is allowed to access the residential gateway.

With reference to the first aspect or a second aspect, in some optional embodiments, the subscription data of the residential gateway stored on the unified data management network element is updated. For example, the type of access to the residential gateway changes from the open type to the private type, or the subscriber list is updated.

Optionally, the unified data management network element may re-determine, based on updated subscription data of the residential gateway, a subscription type of the user equipment and whether the user equipment is allowed to access the residential gateway. Optionally, the unified data management network element may further send the updated subscription data of the residential gateway to the access and mobility management network element, and the access and mobility management network element re-determines, based on the updated subscription data of the residential gateway, the subscription type of the user equipment and whether the user equipment is allowed to access the residential gateway.

When the subscription data of the residential gateway is updated, the unified data management network element may send an access update message to the access and mobility management network element based on identification information of the access and mobility management network element.

Specifically, the access update message is implemented as follows:

(1) If the type of access to the residential gateway changes from the open type to the private type, and the subscription type of the user equipment indicates a non-subscriber, the access update message may include an access reject indication.

(2) If an updated subscriber list of the residential gateway indicates a change of user equipment subscription, the access update message may include indication information of an updated subscription type of the user equipment, to notify the access and mobility management network element to adjust an access type of the user equipment and a service management policy of the user equipment.

(3) The access update message may include at least one of an updated type of access to the residential gateway and an updated subscriber list, and the access and mobility management network element determines, based on the updated type of access to the residential gateway and/or the updated subscriber list, the subscription type of the user equipment and whether the user equipment is allowed to access the residential gateway.

After receiving the access update message, the access and mobility management network element may send a notification message to the user equipment. The notification message may be used to notify the user equipment of the changed subscription type of the user equipment. When the user equipment can no longer access a core network through the residential gateway, the notification message may carry a reselection indication, and the reselection indication is used to notify the user equipment to reselect a residential gateway for access.

By implementing the method described in the first aspect or the possible implementations of the first aspect, the UDM may distinguish different access types of the UE, to subsequently perform different service control, for example, different QoS control. Particularly, when there are limited network resources, a network side may preferentially guarantee access of a subscriber but restrict access of a non-subscriber. Differentiated service management policies (such as a host policy and a guest policy) performed by a 5GC for the UE are not limited in this application, and may be specifically determined based on an application scenario supported by 5G or NR.

According to a second aspect, this application provides a network access method, applied to a unified data management network element side. The method may include: receiving, by a data management network element, a request message from an access and mobility management function network element, where the request message includes identification information of a residential gateway connected to user equipment; and determining, by the data management network element, subscription data of the residential gateway based on the identification information of the residential gateway; and sending the subscription data to the access and mobility management function network element, where the subscription data is used by the access and mobility management function network element to determine a subscription type of the user equipment. The subscription type indicates a subscriber or a non-subscriber of the residential gateway.

According to a third aspect, this application provides a network access method, applied to an access and mobility management function network element side. The method may include: sending, by an access and mobility management function network element, a request message to a unified data management network element, where the request message includes identification information of user equipment and identification information of a residential gateway connected to the user equipment; and receiving, by the access and mobility management function network element, indication information that is of a classification type of the user equipment and that is from the unified data management network element; and determining, based on the classification type of the user equipment, whether the user equipment is allowed to access the residential gateway, and/or a service management policy of the user equipment.

In some embodiments of the third aspect, the classification type of the user equipment includes a subscription type.

With reference to the third aspect, in some optional embodiments, the determining, by the access and mobility management function network element based on the subscription type of the user equipment, whether the user equipment is allowed to access the residential gateway may specifically include: if the subscription type of the user equipment indicates a subscriber of the residential gateway, determining, by the access and mobility management function network element, that the user equipment is allowed to access the residential gateway. This is because the subscriber can access the residential gateway regardless of whether a type of the residential gateway is an open type (in this case, access of a non-subscriber is allowed) or a private type (in this case, access of a non-subscriber is not allowed).

With reference to the third aspect, in some optional embodiments, the determining, by the access and mobility management function network element based on the subscription type of the user equipment, a service management policy of the user equipment may specifically include: if the subscription type indicates the non-subscriber, determining, by the access and mobility management function network element, that the service management policy of the user equipment is a service management policy corresponding to the non-subscriber; or if the subscription type indicates the subscriber, determining, by the access and mobility management function network element, that the service management policy of the user equipment is a service management policy corresponding to the subscriber.

With reference to the third aspect, in some optional embodiments, the method described in the third aspect may further include: receiving, by the access and mobility management function network element, indication information of the service management policy of the user equipment and/or access indication information that are/is from the unified data management network element, where the access indication information indicates whether the user equipment is allowed to access the residential gateway.

With reference to the third aspect, in some optional embodiments, the method described in the third aspect may further include: receiving, by the access and mobility management function network element, subscription data of the residential gateway from the unified data management network element, and determining, based on the subscription data of the residential gateway and the identification information of the user equipment, whether the user equipment is allowed to access the residential gateway.

With reference to the third aspect, in some optional embodiments, the subscription data of the residential gateway may include identification information of user equipment that is a subscriber of the residential gateway.

With reference to the third aspect, in some optional embodiments, the subscription data of the residential gateway may further include indication information of a type of access to the residential gateway, and the type of access indicates whether the residential gateway allows access of a non-subscriber.

With reference to the third aspect, in some optional embodiments, the access and mobility management function network element may determine, in the following manners, whether the user equipment is allowed to access an access network device:

Optionally, if the identification information of the user equipment belongs to the identification information of the user equipment that is a subscriber of the residential gateway, the access and mobility management function network element determines that the user equipment is allowed to access the residential gateway. This is because the subscriber can access the residential gateway regardless of whether a type of the residential gateway is an open type (in this case, access of a non-subscriber is allowed) or a private type (in this case, access of a non-subscriber is not allowed).

Optionally, if the identification information of the user equipment does not belong to the identification information of the user equipment that is a subscriber of the residential gateway but the type of access to the residential gateway indicates that the residential gateway allows access of a non-subscriber, the access and mobility management function network element determines that the user equipment is allowed to access the residential gateway.

Optionally, if the identification information of the user equipment does not belong to the identification information of the user equipment that is a subscriber of the residential gateway and the type of access to the residential gateway indicates that the residential gateway does not allow access of a non-subscriber, the access and mobility management function network element determines that the user equipment is not allowed to access the residential gateway.

A subscriber list and the indication information of the type of access to the residential gateway are not limited thereto. Content of the subscription data of the residential gateway may alternatively exist in another form, provided that specific subscribers of the residential gateway can be indicated and specific users allowed to access the residential gateway can be indicated. For example, the subscription data may include a mapping table. The mapping table includes identification information of a plurality of UEs and indication information of subscription types respectively corresponding to the identification information of the plurality of UEs. The identification information of the plurality of UEs may include identification information of UE that is a subscriber, and may further include identification information of UE that is a non-subscriber. In this way, based on identification information of specific UE, a subscription type corresponding to the specific UE may be obtained by searching the mapping table.

With reference to the third aspect, in some optional embodiments, the method described in the third aspect may further include: sending, by the access and mobility management function network element, the indication information of the service management policy of the user equipment and/or the access indication information to the access network device or the residential gateway, where the access indication information indicates whether the user equipment is allowed to access the residential gateway.

With reference to the third aspect, in some optional embodiments, the identification information of the residential gateway carried in the request message from the access and mobility management function network element is permanent identifier information. The method described in the third aspect may further include: obtaining, by the access and mobility management function network element, temporary identifier information of the residential gateway, and obtaining the permanent identifier information from a context of the residential gateway based on the temporary identifier information.

Optionally, the access and mobility management function network element may obtain the temporary identifier information from NAS signaling from the user equipment. In other words, the temporary identifier information of the residential gateway obtained by the access and mobility management function network element is from the user equipment.

Optionally, the access and mobility management function network element may obtain the temporary identifier information from signaling from an access network device accessed by the residential gateway. In other words, the temporary identifier information of the residential gateway obtained by the access and mobility management function network element is from the access network device. The temporary identifier information included in the signaling from the access network device is from the residential gateway to the access network device; or is identified by the access network device based on an IP address of the user equipment, an identity of a line connected to the fixed network gateway, a VLAN identifier, or an access point identifier of the user equipment.

By implementing the method described in the third aspect or the possible implementations of the third aspect, the AMF may distinguish different access types of the UE, to subsequently perform different service control, for example, different QoS control. Particularly, when there are limited network resources, a network side may preferentially guarantee access of a subscriber but restrict access of a non-subscriber. Differentiated service management policies (such as a host policy and a guest policy) performed by a 5GC for the UE are not limited in this application, and may be specifically determined based on an application scenario supported by 5G or NR.

According to a fourth aspect, this application provides a network access method, applied to an access and mobility management function network element side. The method may include: receiving, by an access and mobility management function network element, a request message from an access network device, where the request message includes identification information of a residential gateway; and obtaining, by the access and mobility management function network element, subscription data of the residential gateway based on the identification information of the residential gateway; and determining a classification type of the user equipment and/or a service management policy of the user equipment based on the subscription data of the residential gateway and identification information of the user equipment.

In some embodiments of the fourth aspect, the classification type of the user equipment includes a subscription type.

With reference to the fourth aspect, in some optional embodiments, the method described in the fourth aspect may further include: sending, by the access and mobility management function network element, indication information of the subscription type of the user equipment and/or indication information of the service management policy of the user equipment to the access network device or the residential gateway.

With reference to the fourth aspect, in some optional embodiments, the obtaining, by the access and mobility management function network element, subscription data of the residential gateway based on the identification information of the residential gateway may specifically include: receiving, by the access and mobility management function network element based on the identification information of the residential gateway, the subscription data of the residential gateway from a unified data management network element.

With reference to the fourth aspect, in some optional embodiments, the obtaining, by the access and mobility management function network element, subscription data of the residential gateway based on the identification information of the residential gateway may specifically include: obtaining, by the access and mobility management function network element, the subscription data of the residential gateway from a context of the residential gateway based on the identification information of the residential gateway.

With reference to the fourth aspect, in some optional embodiments, the subscription data of the residential gateway may include identification information of user equipment that is a subscriber of the residential gateway. In this case, the determining, by the access and mobility management function network element, the subscription type of the user equipment based on the subscription data of the residential gateway may specifically include: if the identification information of the user equipment belongs to the identification information of the user equipment that is a subscriber of the residential gateway, determining, by the access and mobility management function network element, that the user equipment is a subscriber of the residential gateway.

With reference to the fourth aspect, in some optional embodiments, the subscription data of the residential gateway may further include indication information of a type of access to the residential gateway, and the type of access indicates whether the residential gateway allows access of a non-subscriber.

With reference to the fourth aspect, in some optional embodiments, the access and mobility management function network element may determine, in the following manners, whether the user equipment is allowed to access the access network device:

Optionally, if the identification information of the user equipment belongs to the identification information of the user equipment that is a subscriber of the residential gateway, the access and mobility management function network element determines that the user equipment is allowed to access the residential gateway. This is because the subscriber can access the residential gateway regardless of whether a type of the residential gateway is an open type (in this case, access of a non-subscriber is allowed) or a private type (in this case, access of a non-subscriber is not allowed).

Optionally, if the identification information of the user equipment does not belong to the identification information of the user equipment that is a subscriber of the residential gateway but the type of access to the residential gateway indicates that the residential gateway allows access of a non-subscriber, the access and mobility management function network element determines that the user equipment is allowed to access the residential gateway.

Optionally, if the identification information of the user equipment does not belong to the identification information of the user equipment that is a subscriber of the residential gateway and the type of access to the residential gateway indicates that the residential gateway does not allow access of a non-subscriber, the access and mobility management function network element determines that the user equipment is not allowed to access the residential gateway.

A subscriber list and the indication information of the type of access to the residential gateway are not limited thereto. Content of the subscription data of the residential gateway may alternatively exist in another form, provided that specific subscribers of the residential gateway can be indicated and specific users allowed to access the residential gateway can be indicated. For example, the subscription data may include a mapping table. The mapping table includes identification information of a plurality of UEs and indication information of subscription types respectively corresponding to the identification information of the plurality of UEs. The identification information of the plurality of UEs may include identification information of UE that is a subscriber, and may further include identification information of UE that is a non-subscriber. In this way, based on identification information of specific UE, a subscription type corresponding to the specific UE may be obtained by searching the mapping table.

With reference to the fourth aspect, in some optional embodiments, the method described in the fourth aspect may further include: sending, by the access and mobility management function network element, the indication information of the service management policy of the user equipment and/or access indication information to the access network device or the residential gateway. The access indication information indicates whether the user equipment is allowed to access the residential gateway.

With reference to the fourth aspect, in some optional embodiments, the identification information of the residential gateway included in the request message from the access network device is temporary identifier information. The method described in the fourth aspect may further include: obtaining, by the access and mobility management function network element, the temporary identifier information of the residential gateway, and determining the subscription data from the context of the residential gateway based on the temporary identifier information.

Optionally, the access and mobility management function network element may obtain the temporary identifier information from NAS signaling from the user equipment. In other words, the temporary identifier information of the residential gateway obtained by the access and mobility management function network element is from the user equipment.

Optionally, the access and mobility management function network element may obtain the temporary identifier information from signaling from an access network device accessed by the residential gateway. In other words, the temporary identifier information of the residential gateway obtained by the access and mobility management function network element is from the access network device. The temporary identifier information included in the signaling from the access network device is from the residential gateway to the access network device; or is identified by the access network device based on an IP address of the user equipment, an identity of a line connected to the fixed network gateway, a VLAN identifier, or an access point identifier of the user equipment.

According to a fifth aspect, this application provides a network access method, applied to an access network device side. The method may include: obtaining, by an access network device, temporary identifier information of a residential gateway connected to user equipment, and sending a message to an access and mobility management function network element, where the message includes the temporary identifier information of the residential gateway and identification information of the user equipment, and the identification information of the user equipment is from the user equipment.

With reference to the fifth aspect, in some optional embodiments, the obtaining, by an access network device, temporary identifier information of a residential gateway connected to user equipment may specifically include: receiving, by the access network device, the temporary identifier information from the user equipment; or receiving, by the access network device, the temporary identifier information from the residential gateway.

Optionally, the access network device may obtain the temporary identifier information from NAS signaling from the user equipment. In other words, the temporary identifier information of the residential gateway obtained by the access network device is from the user equipment. Optionally, the access network device may obtain the temporary identifier information from signaling from the residential gateway. In other words, the temporary identifier information of the residential gateway obtained by the access network device is from the access network device.

Optionally, the temporary identifier information may be further identified by the access network device based on an IP address of the user equipment, an identity of a line connected to the fixed network gateway, a VLAN identifier, or an access point identifier of the user equipment.

According to a sixth aspect, this application provides a network access method, applied to a user equipment side. The method may include: obtaining, by user equipment, temporary identifier information of a residential gateway connected to the user equipment, and sending, by the user equipment, a request message to an access network device, where the request message includes the temporary identifier information of the residential gateway and identification information of the user equipment.

With reference to the sixth aspect, in some optional embodiments, the obtaining, by user equipment, temporary identifier information of a residential gateway connected to the user equipment may specifically include: receiving, by the user equipment, the temporary identifier information of the residential gateway from the residential gateway.

Specifically, after establishing a connection to the residential gateway, the user equipment may obtain the temporary identifier information of the residential gateway through query according to an access network query protocol (ANQP). Specifically, the user equipment may receive an ANQP message or an EAP message from the residential gateway, where these messages include the temporary identifier information of the residential gateway. Alternatively, the user equipment may obtain the temporary identifier information of the residential gateway through an EAP message. Specifically, the residential gateway includes a temporary identifier of the residential gateway in the EAP message from the residential gateway to the user equipment. The EAP message may be an EAP-Request/Identity message or an EAP-Request/5G-Start message.

According to a seventh aspect, this application provides a network access method, applied to an access network device side. The method may include: receiving, by an access network device, a request message, where the request message includes identification information of a packet data unit PDU session; and sending, by the access network device, a response message to a terminal device, where the response message includes an address that is of the access network device and that corresponds to the PDU session, and the address that is of the access network device and that corresponds to the PDU session is used as a target address for a user plane data packet that is of the PDU session and that is from the terminal device.

With reference to the seventh aspect, in some optional embodiments, the method may further include: storing, by the access network device, a correspondence between the identification information of the PDU session and address information that is of the access network device and that corresponds to the PDU session.

With reference to the seventh aspect, in some optional embodiments, the method may further include: receiving, by the access network device, identification information of the terminal device, and assigning, by the access network device, an address to the terminal device based on the identification information of the terminal device; and sending, by the access network device, the address of the terminal device to the terminal device, where the address of the terminal device is used as a source address for the user plane data packet that is of the PDU session and that is from the terminal device.

With reference to the seventh aspect, in some optional embodiments, the method may further include: receiving, by the access network device, the user plane data packet that is of the PDU session and that is from the terminal device, where a destination address included in the user plane data packet is the address that is of the access network device and that corresponds to the PDU session; and identifying, by the access network device, the PDU session based on the address information that is of the access network device and that corresponds to the PDU session.

According to an eighth aspect, this application provides a network access method, applied to an access network device side. The method may include: assigning, by an access network device, a user plane address that is of the access network device and that corresponds to a terminal device; and sending, by the access network device, the user plane address of the access network device to the terminal device, where the user plane address is used as a destination address for a user plane data packet that is of a PDU session and that is from the terminal device.

With reference to the eighth aspect, in some optional embodiments, the method may further include: receiving, by the access network device, identification information of the terminal device; assigning, by the access network device, an address to the terminal device based on the identification information of the terminal device; and sending, by the access network device, the address of the terminal device to the terminal device, where the address of the terminal device is used as a source address for the user plane data packet that is of the PDU session and that is from the terminal device.

With reference to the eighth aspect, in some optional embodiments, the method may further include: receiving, by the access network device, the user plane data packet that is from the terminal device, where the destination address in the user plane data packet is the user plane address of the access network device, and the user plane data packet further includes identification information of the PDU session; and identifying, by the access network device, the PDU session based on the identification information of the PDU session.

According to a ninth aspect, this application provides a network access method, applied to a terminal device side. The method may include: receiving, by user equipment, a user plane address of an access network device from the access network device; and sending, by the access network device, a user plane data packet of a PDU session to the access network device, where a destination address included in the user plane data packet is the user plane address of the access network device.

With reference to the ninth aspect, in some optional embodiments, the method may further include: sending, by the user equipment, identification information of the user equipment to the access network device; and receiving, by the user equipment, an address of the user equipment that is assigned and from the access network device, where a source address included in the user plane data packet is the address of the user equipment.

According to a tenth aspect, this application provides a network access method, applied to a terminal device side. The method may include: receiving, by user equipment, an address of an access network device from the access network device; and sending, by the access network device, a user plane data packet of a PDU session to the access network device, where a destination address included in the user plane data packet is the address of the access network device, and the user plane data packet further includes identification information of the PDU session.

With reference to the tenth aspect, in some optional embodiments, the method may further include: sending, by the user equipment, identification information of the user equipment to the access network device; and receiving, by the user equipment, an address of the user equipment that is assigned and from the access network device, where a source address included in the user plane data packet is the address of the user equipment.

According to an eleventh aspect, this application provides a service management policy sending method, applied to a policy control network element side. The method may include: receiving, by a policy control network element, a first message from an access and mobility management function network element or a session management network element, where the first message includes indication information of a device type of user equipment; and sending, by the policy control network element, a second message to the session management network element, where the second message includes a service management policy that is for the user equipment and that is determined by the policy control network element based on the indication information of the device type of the user equipment.

With reference to the eleventh aspect, in some optional embodiments, the service management policy includes a local resource access policy of a residential gateway and/or a QoS policy.

With reference to the eleventh aspect, in some optional embodiments, the service management policy includes the local resource access policy of the residential gateway; and the method may further include: sending, by the policy control network element, the local resource access policy to the access and mobility management function network element.

According to a twelfth aspect, this application provides a network access method, applied to a residential gateway side. The method may include: receiving, by a residential gateway, identification information of user equipment and indication information of a device type of the user equipment that are from an access and mobility management function network element; obtaining, by the residential gateway, a local resource access policy of the residential gateway; and controlling, by the residential gateway, access of the user equipment to a local resource based on the indication information of the device type of the user equipment and the local resource access policy.

With reference to the twelfth aspect, in some optional embodiments, the obtaining, by the residential gateway, a local resource access policy of the residential gateway may specifically include: receiving, by the residential gateway, the local resource access policy of the residential gateway from the access and mobility management function network element or a session management network element.

With reference to the twelfth aspect, in some optional embodiments, the obtaining, by the residential gateway, a local resource access policy of the residential gateway may specifically include: configuring, by the residential gateway, the local resource access policy.

With reference to the twelfth aspect, in some optional embodiments, the local resource access policy includes address information of a device connected to the residential gateway.

With reference to the twelfth aspect, in some optional embodiments, the method may further include: receiving, by the residential gateway, a request message from the user equipment, where the request message includes the identification information of the user equipment; and the controlling, by the residential gateway, access of the user equipment to a local resource based on the indication information of the device type of the user equipment and the local resource access policy includes: determining, by the residential gateway, the device type of the user equipment based on the identification information of the user equipment and the indication information of the device type of the user equipment; and controlling, by the residential gateway, access of the user equipment to the local resource based on the device type of the user equipment and the local resource access policy.

According to a thirteenth aspect, this application provides a core network device. The core network device includes a plurality of functional units and is configured to correspondingly perform the method provided in any one of the possible implementations in the first aspect, the second aspect, the third aspect, the fourth aspect, or the eleventh aspect. The core network device may be implemented as the unified data management network element or the access and mobility management network element in the first aspect, the second aspect, the third aspect, the fourth aspect, or the eleventh aspect.

According to a fourteenth aspect, this application provides an access network device. The access network device includes a plurality of functional units and is configured to correspondingly perform the method provided in any one of the possible implementations in the fifth aspect, the seventh aspect, or the eighth aspect.

According to a fifteenth aspect, this application provides user equipment. The user equipment includes a plurality of functional units and is configured to correspondingly perform the method provided in any one of the possible implementations in the sixth aspect.

According to a sixteenth aspect, this application provides a terminal device. The terminal device includes a plurality of functional units and is configured to correspondingly perform the method provided in any one of the possible implementations in the ninth aspect or the tenth aspect.

According to a seventeenth aspect, this application provides a core network device, configured to perform the network access method described in any one of the possible implementations in the first aspect, the second aspect, the third aspect, or the fourth aspect. The core network device may be implemented as the unified data management network element or the access and mobility management network element in the first aspect, the second aspect, the third aspect, the fourth aspect, or the eleventh aspect. The core network device may include: a memory, a processor coupled to the memory, and a transceiver. The transceiver is configured to communicate with another communications device (for example, an access network device). The memory is configured to store code for implementing the network access method described in any one of the possible implementations in the first aspect, the second aspect, the third aspect, or the fourth aspect. The processor is configured to execute program code stored in the memory, that is, perform the method provided in any one of the possible implementations in the first aspect, the second aspect, the third aspect, the fourth aspect, or the eleventh aspect.

According to an eighteenth aspect, this application provides an access network device, configured to perform the network access method described in any one of the possible implementations in the fifth aspect. An application server may include: a memory, a processor coupled to the memory, and a transceiver. The transceiver is configured to communicate with another communications device (for example, a core network device or a residential gateway). The memory is configured to store code for implementing the network access method described in any one of the possible implementations in the fifth aspect, the seventh aspect, or the eighth aspect. The processor is configured to execute program code stored in the memory, that is, perform the method provided in any one of the possible implementations in the fifth aspect, the seventh aspect, or the eighth aspect.

According to a nineteenth aspect, this application provides user equipment, configured to perform the network access method described in any one of the possible implementations in the sixth aspect. The user equipment may include: a memory, a processor coupled to the memory, and a transceiver. The transceiver is configured to communicate with another communications device (for example, a residential gateway). The memory is configured to store code for implementing the network access method described in any one of the possible implementations in the sixth aspect. The processor is configured to execute program code stored in the memory, that is, perform the method provided in any one of the possible implementations in the sixth aspect.

According to a twentieth aspect, this application provides a terminal device, configured to perform the network access method described in any one of the possible implementations in the sixth aspect. The terminal may include: a memory, a processor coupled to the memory, and a transceiver. The transceiver is configured to communicate with another communications device (for example, a residential gateway). The memory is configured to store code for implementing the network access method described in any one of the possible implementations in the ninth aspect or the tenth aspect. The processor is configured to execute program code stored in the memory, that is, perform the method provided in any one of the possible implementations in the ninth aspect or the tenth aspect.

According to a twenty-first aspect, this application provides a communications system. The communications system includes user equipment, a residential gateway, an access network device, and a core network device. The core network device may be the core network device described in the thirteenth aspect or the seventeenth aspect. The access network device may be the access network device described in the fourteenth aspect or the eighteenth aspect. The user equipment may be the user equipment described in the fifteenth aspect or the nineteenth aspect. The residential gateway may be the terminal device described in the sixteenth aspect or the twentieth aspect.

According to a twenty-second aspect, this application provides a computer-readable storage medium. The computer-readable storage medium stores an instruction, and when the instruction is run on a computer, the computer is enabled to perform the network access method described in any one of the first aspect to the twelfth aspect.

According to a twenty-third aspect, this application provides a computer program product including an instruction. When the computer program product runs on a computer, the computer is enabled to perform the network access method described in any one of the first aspect to the twelfth aspect.

BRIEF DESCRIPTION OF DRAWINGS

To describe the technical solutions in the embodiments of this application more clearly, the following briefly describes the accompanying drawings required for describing the embodiments of this application or the background.

DESCRIPTION OF EMBODIMENTS

Terms used in the embodiments of this application are merely used to explain specific embodiments of this application, but are not intended to limit this application.

Figure 1A:
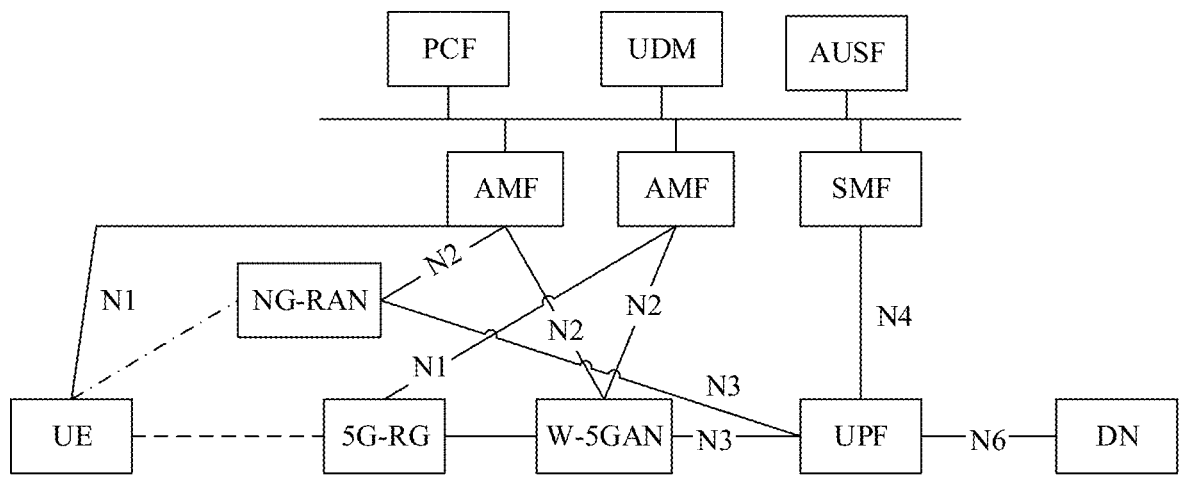
FIG. 1A to FIG. 1C are schematic architectural diagrams of wireless communications systems according to this application.
Figure 1B:
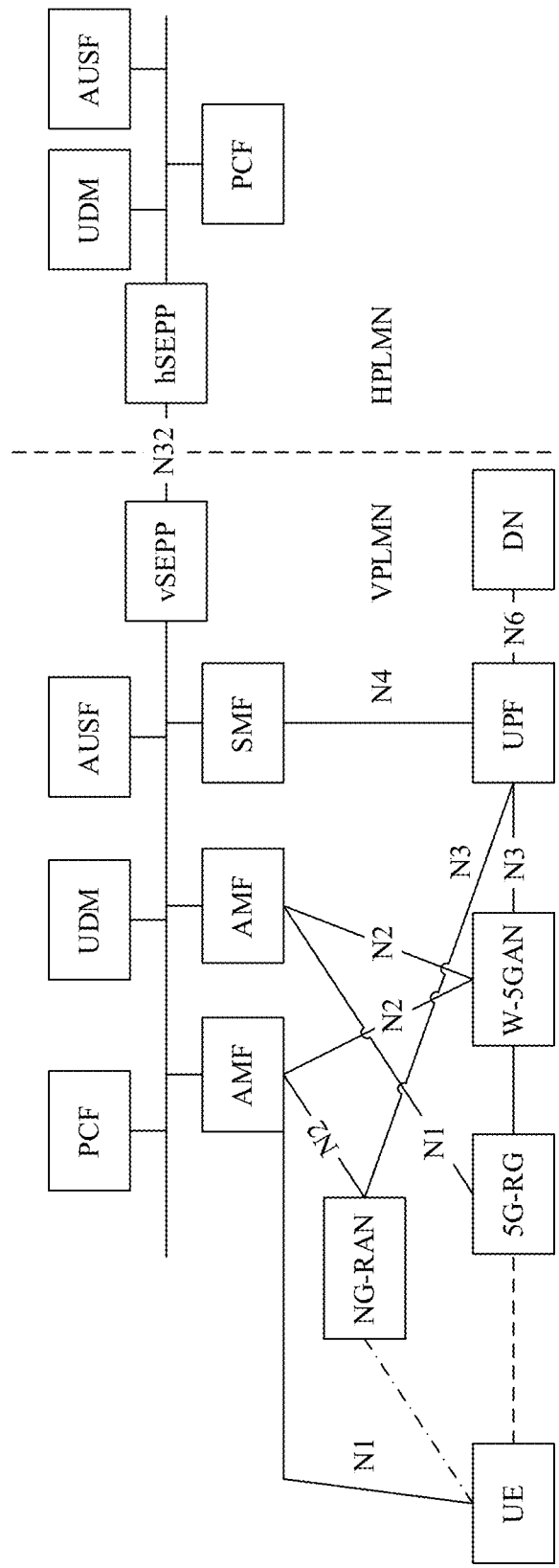
Figure 1C:
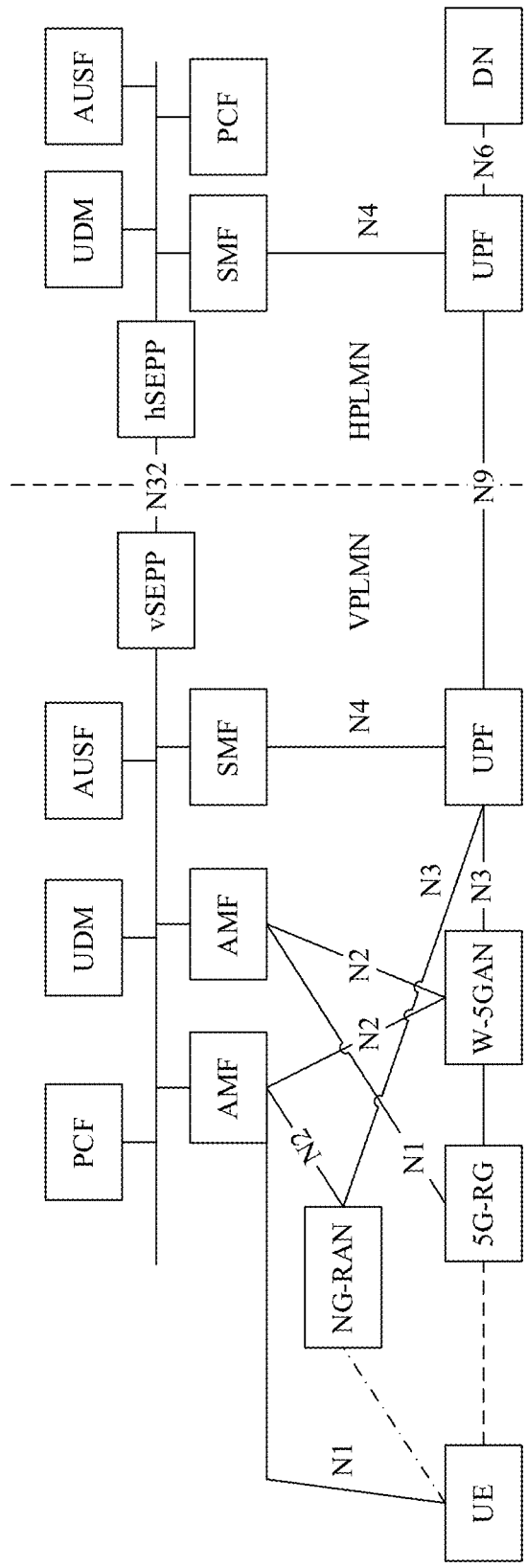

FIG. 1A to FIG. 1C show system architectures of wireless communications systems related to this application. FIG. 1A shows a non-roaming system architecture, FIG. 1B shows a local breakout roaming system architecture, and FIG. 1C shows a home routed roaming system architecture. The system architectures shown in FIG. 1A to FIG. 1C not only support access to a core network (CN) by using a radio access technology (such as LTE, a 5G RAN, or a next generation RAN (NG RAN)) that is defined by the 3GPP standardization group, but also support access to the core network by using a non-3GPP technology through a non-3GPP interworking function (N3IWF) or a next generation access gateway (ngPDG). As shown in FIG. 1A to FIG. 1C, the system architectures further support access through a fixed network/wireline network. For example, a 5G residential gateway (5G RG)/CPE accesses a core network through a wireline 5G access network (W-5GAN). In a scenario in which the 5G residential gateway accesses a 5GC through the wireline 5G access network, 5GC capable user equipment may access the 5GC through the 5G residential gateway. In this case, the 5GC capable user equipment is a remote device, and the 5G residential gateway is a relay device.

A 5G communications system is not limited thereto. The system architectures shown in FIG. 1A to FIG. 1C may be further applied to a future evolved new radio (NR) system, a machine to machine (M2M) system, or the like. As shown in FIG. 1A to FIG. 1C, the system architectures may include the 5GC capable user equipment, the 5G-RG, an NG RAN device, a W-5GAN device, and a core network device. The 5GC capable user equipment is user equipment (UE) capable of accessing the 5G core network defined by the 3GPP.

The 5GC capable user equipment may access the core network through the NG RAN or the 5G-RG. The 5GC capable user equipment may be a handheld terminal, a subscriber unit, a cellular phone, a smartphone, a machine type communication (MTC) terminal device, or the like. The 5GC capable user equipment may alternatively be a wireless data card, a personal digital assistant (PDA) computer, a tablet computer, a wireless modem, a handheld device (handheld), a laptop computer, a cordless phone, or a wireless local loop (WLL), or another device that can access a network. In addition to the 5GC capable user equipment, the system architecture may further support access, to the core network, of a terminal device having only a 3GPP-defined radio access capability, and may further support access, to the core network, of a terminal device (for example, a tablet computer) having only a non-3GPP-defined access capability.

The 5G-RG is a residential gateway that can access the 5GC through the W-5GAN. In this application, the 5G-RG may further support the 5GC capable user equipment in accessing the 5GC through the 5G-RG. The residential gateway is the core of an entire home network, and is mainly used for internet access, connection between different subnets in the home network, remote control and management, and the like.

The NG RAN device is a RAN device and is mainly responsible for functions such as radio resource management, quality of service (QoS) management, data compression and encryption, and the like on an air interface side. In addition to the NG RAN device, the system architectures may further support another 3GPP-defined radio access network device, for example, a 5G RAN device. The RAN device may include a macro base station, a micro base station (also referred to as a small cell), a relay station, or the like. In systems using different radio access technologies, devices having a base station function may have different names. For example, in a 5th generation (5G) system, the device is referred to as a gNB; in an LTE system, the device is referred to as an evolved NodeB (eNB or eNodeB); and in a 3rd generation (3G) system, the device is referred to as a NodeB.

The W-5GAN device is a wireline AN device. An AN device may be a non-3GPP-defined access network device. The AN device allows a terminal device and a 3GPP core network to perform interconnection and interworking by using a non-3GPP technology. For example, the non-3GPP technology includes wireless fidelity (Wi-Fi), worldwide interoperability for microwave access (WiMAX), and a code division multiple access (CDMA), or the like. In addition to the W-5GAN device, the system architectures may further support another non-3GPP-defined radio access network device such as a Wi-Fi router.

As shown in FIG. 1A to FIG. 1C, the core network device may include a UPF, an AMF, a UDM, an SMF, a PCF, an AUSF, or the like. These core network devices constitute the 5GC, and the 5GC can support a 3GPP access network and a non-3GPP access network. A user plane function (UPF) network element is responsible for data packet forwarding and receiving.

The UPF network element may receive user data from a data network, and transmit the user data to a terminal device through an access network device. Further, the UPF network element may receive user data from the terminal device through the access network device, and forward the user data to the data network. A transmission resource and a scheduling function on the UPF network element that serve the terminal device are managed and controlled by an SMF network element. The UPF network element may buffer a data packet.

An access and mobility management function (AMF) network element is a core network element and is mainly responsible for signaling processing such as access control, mobility management, attachment, detachment, and gateway selection. When providing a service for a session of the terminal device, the AMF network element provides a control plane storage resource for the session, to store a session identifier, an SMF network element identifier associated with the session identifier, and the like.

A unified data management (UDM) network element is responsible for unified data management. The unified data management is implemented through two parts: an application front end (FE) and a user data repository (UDR). The FE can access subscriber information stored in the UDR. The FE supports authentication information processing, subscriber identity processing, access authorization, subscription management, SMS message management, and the like. The UDR is a storage server for user subscription data and provides a subscription data storage service.

A session management function (SMF) network element is responsible for user plane network element selection, user plane network element redirection, internet protocol (IP) address assignment, QoS control, and establishment, modification, and release of a data transmission channel. The SMF network element may buffer a data packet.

A policy control function (PCF) network element mainly provides a unified policy framework for controlling network behavior and provides a policy rule to a control layer device and a terminal device for offering policy information. In addition, the PCF network element is responsible for obtaining user subscription information related to policy decision.

An authentication server function (AUSF) network element mainly provides an authentication and authorization function.

In addition, the system architectures further include a data network (DN). The DN is a network that includes an application function and that provides an application data server for the terminal device.

To simplify the accompanying drawings, an unstructured data storage network function (UDSF), a structured data storage network function (SDSF), and an NF repository function (NRF) in the core network are not shown.

Names of members (such as the 5G capable UE, 5G-RG, and W-5GAN) in the system architectures shown in FIG. 1A to FIG. 1C may change in a future communications standard, but this does not affect applicability of the technical solutions provided in this application.

The system architectures shown in FIG. 1A to FIG. 1C are merely intended to describe the technical solutions in this application more clearly, but constitute no limitation on this application. A person of ordinary skill in the art may know that, with evolution of a network architecture and emergence of a new service scenario, the technical solutions provided in this application are also applicable to a similar technical problem.

This application provides a network access method, so that user equipment (UE) can access a 5GC through a residential gateway and the 5GC can support more access modes. This improves convergence of a fixed network and a mobile network.

In a scenario in which the UE accesses the core network through the residential gateway, the UE may be the 5GC capable UE in the system architectures shown in FIG. 1A to FIG. 1C, and the residential gateway may be the 5G-RG in the system architectures shown in FIG. 1A to FIG. 1C.

A main inventive principle of this application may include determining, based on subscription data of the 5G-RG, (1) whether the residential gateway allows access of the UE; and (2) a UE access type (which includes subscriber access and non-subscriber access) if the 5G-RG allows access of the UE. The subscriber access is access of a family member to the 5GC through the 5G-RG. The non-subscriber access is access of a non-family member (such as a visitor or stranger) to the 5GC through the 5G-RG.

In this application, the subscription data of the 5G-RG may indicate specific subscribers of the 5G-RG. In other words, the subscription data of the 5G-RG may indicate specific users allowed to access the 5G-RG.

Specifically, the subscription data of the 5G-RG may include the following information:

(1) Subscriber list: The subscriber list includes identification information of user equipment that is a subscriber of the 5G-RG. The identification information of the user equipment in the subscriber list indicates that the user equipment is a subscriber, that is, a family member. The identification information of the user equipment may be at least one of permanent identifier information of the UE or a mobile subscriber international ISDN/PSTN number (MSISDN) of the UE. Herein, ISDN is short for integrated services digital network, and PSTN is short for public switched telephone network.

(2) Indication information of a type of access to the 5G-RG: The type of access to the 5G-RG may include an open type and a closed/private type. The closed/private type indicates that the 5G-RG allows access of only a subscriber but does not allow access of a non-subscriber. The open type indicates that the 5G-RG allows access of not only a subscriber but also a non-subscriber.

The subscriber list may be used by a network side to determine a subscription type (which indicates a subscriber or a non-subscriber) of the UE, so as to determine the access typeaccess type of the UE, to be specific, determine whether the access typeaccess type of the UE is subscriber access or non-subscriber access.

The type of access to the 5G-RG may be used by the network side to determine whether the UE is allowed to access the 5G-RG. If the type of access to the 5G-RG is the open type, it indicates that the UE is allowed to access the 5G-RG. If the type of access to the 5G-RG is the closed/private type, whether the UE is allowed to access the 5G-RG further needs to be determined with reference to the subscriber list. If the identification information of the UE is included in the subscriber list, the UE is allowed to access the 5G-RG. If the identification information of the UE is not included in the subscriber list, the UE is not allowed to access the 5G-RG.

It should be understood that, if the identification information of the UE connected to the 5G-RG is included in the subscriber list, the network side may determine that the UE is allowed to access the 5G-RG. In other words, the subscriber is allowed to access the 5G-RG, regardless of whether the type of access to the 5G-RG is the open type or the closed/private type.

(1) and (2) is not limited thereto. Content of the subscription data of the 5G-RG may alternatively exist in another form. For details, refer to a subsequent embodiment. Details are not described herein.

In this application, indication information of the subscription type may be terminal device classification information, and the terminal device classification information is information about a terminal device classification list or indication information of a terminal device classification. Specifically, the information about the terminal device classification list includes an identifier of at least one terminal device, and the terminal device belongs to a same terminal device classification. For example, the terminal device classification list is a list of subscribed terminal devices or a list of non-subscribed terminal devices. The indication information of the terminal device classification may be an identifier of the terminal device classification. For example, the indication information of the terminal device classification is indication information of a subscribed terminal device or indication information of a non-subscribed terminal device. In this way, a core network device may determine, based on the terminal device classification, whether access of the terminal device is allowed or whether to perform policy control (for example, QoS policy control, or local policy control for the residential gateway). Specifically, if the identification information of the terminal device is included in a subscribed terminal device classification list, access of a remote device is allowed. If the identification information of the terminal device is not included in the subscribed terminal device classification list, access of the remote device is not allowed.

In this application, the 5GC can perform different host policies or guest policies for the UE. For example, different QoS control is performed, permission to use a specific resource (for example, a printer) is given, or access to the internet is allowed. The host policy is provided for UE that is a subscriber of the 5G-RG, for example, user equipment that is a family member. The guest policy is provided for UE that is not a subscriber of the 5G-RG, for example, user equipment that is a visitor.

It may be understood that the network side distinguishes different access typeaccess types of the UE, to subsequently perform different service control, for example, different QoS control. Particularly, when there are limited network resources, the network side may preferentially guarantee access of a subscriber but restrict access of a non-subscriber. Differentiated service management policies (such as the host policy and the guest policy) performed by the 5GC for the UE are not limited in this application, and may be specifically determined based on an application scenario supported by 5G or NR.

The following describes in detail, through embodiments, the network access method provided in this application. The following embodiments relate to a UDM network element with which UE registers and a UDM network element with which a 5G-RG registers. The UDM network element with which the UE registers and the UDM network element with which the 5G-RG registers may be a same UDM network element or different UDM network elements. When the UE and the 5G-RG are served by different network operators, the UDM network element with which the UE registers and the UDM network element with which the 5G-RG registers are different UDM network elements. When the UE and 5G-RG are served by a same network operator, the UDM network element with which the UE registers and the UDM network element with which the 5G-RG registers may be a same UDM network element or different UDM network elements. Similarly, an AMF serving the UE and an AMF serving the 5G-RG that are related to the following embodiments may be a same AMF network element or different AMF network elements. In the following content, the UDM network element is briefly referred to as a UDM, and the AMF network element is briefly referred to as an AMF.

For differentiation, in the following embodiments, the UDM with which the 5G-RG registers is referred to as a UDM 1, and the UDM with which the UE registers is referred to as a UDM 2. Similarly, the AMF serving the 5G-RG is referred to as an AMF 1, and the AMF serving the UE is referred to as an AMF 2.

Embodiment 1

Figure 2A:
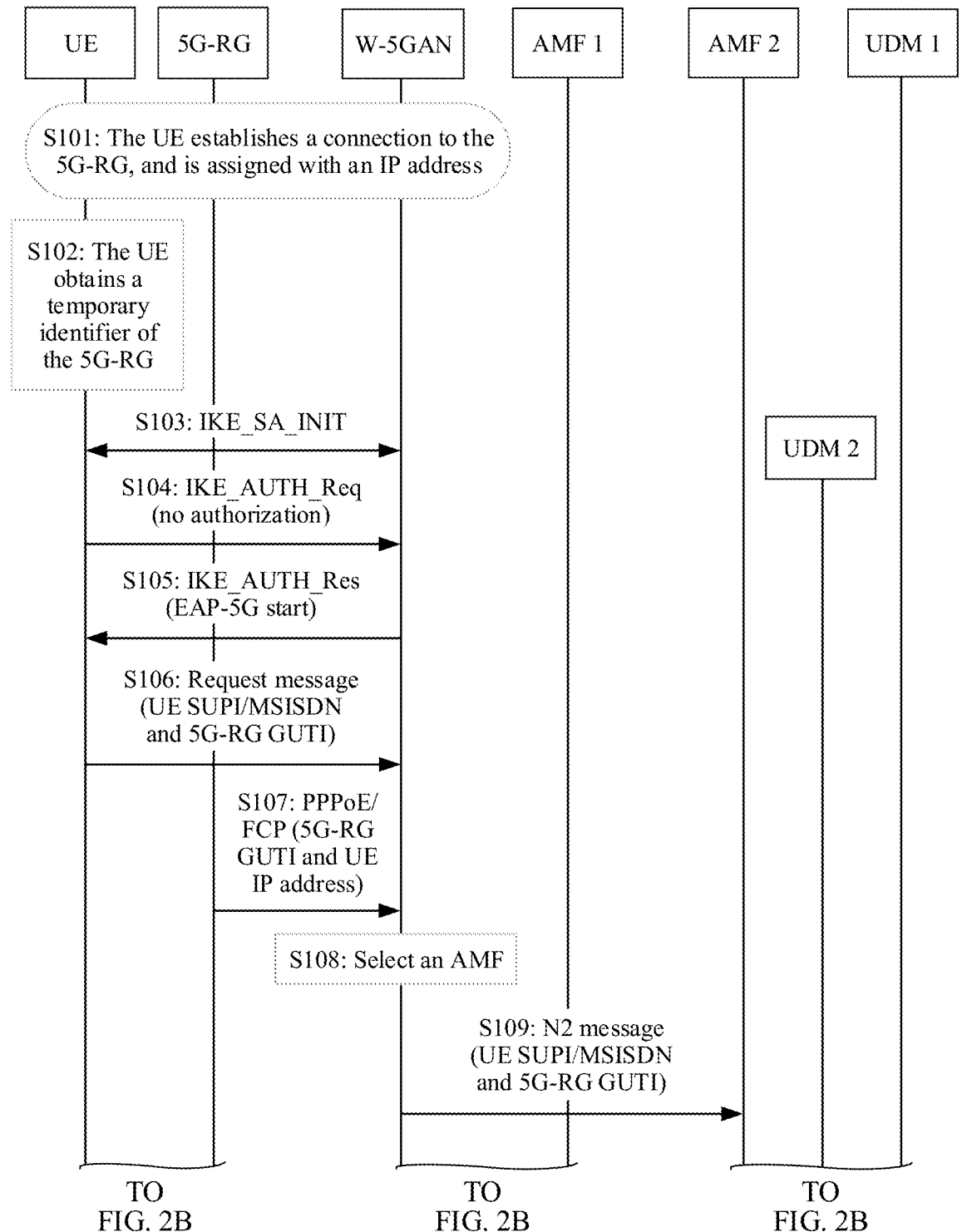
FIG. 2A, FIG. 2B, and FIG. 2C are a schematic flowchart of a network access method according to this application.
Figure 2B:
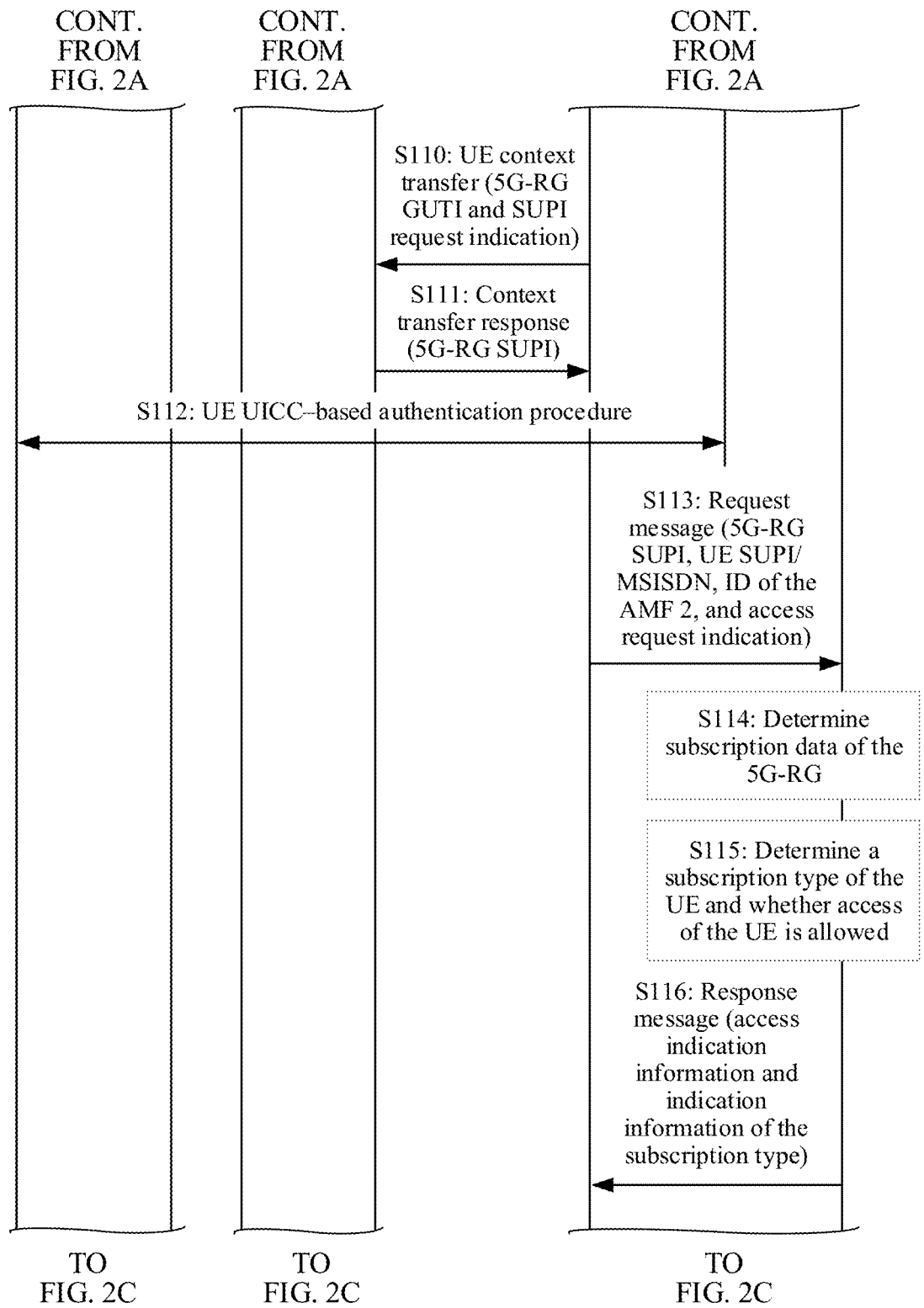
Figure 2C:
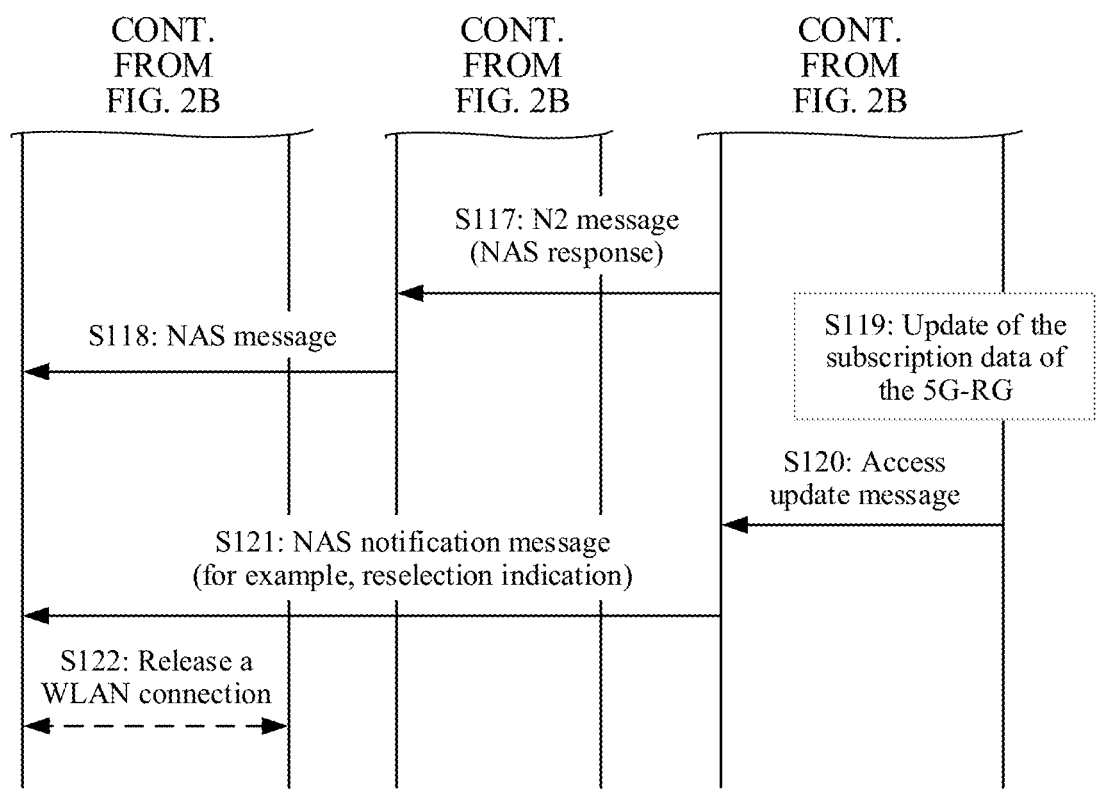

In this embodiment, a UDM is responsible for determining an access typeaccess type (including subscriber access and non-subscriber access) of UE, and determining whether a residential gateway allows access of the UE. As shown in FIG. 2A, FIG. 2B, and FIG. 2C, a network access method provided in Embodiment 1 may include the following steps.

(1) Phase 1: The UE initiates an access request. Details may be as follows:

S101: The UE establishes a connection to a 5G-RG, for example, establishes the connection through a WLAN interface. Optionally, the 5G-RG or a W-5GAN device accessed by the 5G-RG may assign an IP address to the UE.

Before S101, the 5G-RG may register with a 5GC, and a core network element with which the 5G-RG registers is an AMF 1. For a specific procedure in which the 5G-RG registers with the 5GC, refer to a registration procedure defined in a 3GPP standard protocol. Details are not described herein.

S103 to S105: The UE establishes a connection to the W-5GAN device.

A manner in which the UE establishes the connection to the W-5GAN device is not limited in this application.

For example, the UE may establish the connection to the W-5GAN device through an IKEv2 message. As shown in S103 to S105, the UE sends an IKE security connection initial message to the W-5GAN device, and then the W-5GAN device sends an IKE SA INIT response message. Then, the UE sends an authentication request message to the W-5GAN device. Herein, IKE represents an internet key exchange protocol.

For another example, after establishing the connection to the 5G-RG, the UE may exchange an extensible authentication protocol (EAP) message with the 5G-RG and a W-5GAN, to establish a connection between W-5GAN devices. The EAP message may include an EAP-Request/Response message, an EAP-Request/Identity message, an EAP-Response/Identity message, an EAP-Request/5G-Start message, an EAP-Response/5G-NAS message, or the like. The UE sends the EAP message to the W-5GAN, where the EAP message carries an AN parameter and a non-access stratum (NAS) message. The NAS message is a registration request message, a mobility registration update request message, a periodic location update request message, a service request message, or the like.

S106: The UE may send a request message to the W-5GAN device over the connection established between the UE and the W-5GAN device. The request message may be a NAS message. The request message may be carried in the EAP message and sent to the W-5GAN. For details, refer to S103 to S105. The request message may include identification information of the UE, and is used to request to access a core network (the 5GC). The W-5GAN device may forward the NAS message to an AMF 2. For details, refer to S109.

(2) Phase 2: A network side obtains identification information of the 5G-RG and subscription data of the 5G-RG. Details may be as follows:

S107: The 5G-RG sends temporary identifier information of the 5G-RG to the W-5GAN device.

The temporary identifier information of the 5G-RG may be used as an index for obtaining, on a core network side, a context of the 5G-RG. A temporary identifier of the 5G-RG may include a globally unique temporary identifier (GUTI), that is, a temporary identifier allocated by the network side (5GC) to the 5G-RG. A manner in which the 5G-RG sends the temporary identifier information of the 5G-RG is not limited in this application. For example, the 5G-RG sends a point-to-point over Ethernet (PPPoE) message or another control plane message. The message may carry the temporary identifier information of the 5G-RG. Optionally, the message may further carry the IP address of the UE.

Optionally, the request message from the UE to the W-5GAN device in S106 may further carry the temporary identifier information of the 5G-RG, and the temporary identifier information of the 5G-RG may be obtained by the UE. As shown in S102, after establishing the connection to the 5G-RG, the UE may obtain the temporary identifier information of the 5G-RG through query according to an access network query protocol (ANQP). Specifically, the UE may receive an ANQP message or an EAP message from the 5G-RG, where these messages include the temporary identifier of the 5G-RG. Alternatively, the UE may obtain the temporary identifier information of the 5G-RG through the EAP message. Specifically, the 5G-RG includes the temporary identifier of the 5G-RG in the EAP message sent to the UE. The EAP message may be an EAP-Request/Identity message or an EAP-Request/5G-Start message.

S108: The W-5GAN device may select the AMF 2 for the UE. Specifically, the W-5GAN device may select the AMF 2 based on slice selection information, the identification information of the UE, or identification information of an AMF. When selection is made based on the slice selection information, the message from the UE to the W-5GAN includes information about a slice requested by the UE. Different AMFs on the network side are responsible for different slices. Therefore, the W-5GAN may select the AMF 2 that is responsible for the slice based on slice information. Alternatively, the UE sends the identification information of the UE to the W-5GAN, where the identification information of the UE includes an identifier of an AMF; and the W-5GAN selects the AMF 2 corresponding to the identifier of the AMF. Alternatively, the UE directly sends the identification information of the AMF to the W-5GAN, and the W-5GAN selects the AMF 2 corresponding to an identifier of the AMF.

S109: The W-5GAN device may send a request message to the AMF 2, where the request message may include the identification information of the UE and the temporary identifier information of the 5G-RG and is used by the UE to request to access the core network. The request message may be an N2 message, and N2 is a reference point between the W-5GAN device and the AMF. Optionally, the W-5GAN device may include, in the N2 message, the NAS message (referring to S106) from the UE. In this way, the W-5GAN device may forward the NAS message to the AMF 2, where the NAS message is used by the UE to request access to the core network from the AMF 2.

S110 and S111: The AMF 2 obtains permanent identifier information of the 5G-RG based on the temporary identifier information of the 5G-RG. The permanent identifier information of the 5G-RG is used to subsequently obtain the subscription data of the 5G-RG.

It can be learned from the foregoing steps that the AMF 2 may first obtain the temporary identifier information of the 5G-RG in the following manners:

Manner 1: The AMF 2 obtains the temporary identifier information of the 5G-RG from NAS signaling from the UE.

Specifically, the UE obtains the temporary identifier information of the 5G-RG (referring to S102), includes the temporary identifier information of the 5G-RG in the NAS message (that is forwarded by the W-5GAN device), and then sends the NAS message including the temporary identifier information to the AMF 2.

Manner 2: The AMF 2 obtains the temporary identifier information of the 5G-RG from the W-5GAN device. The temporary identifier information may be from the 5G-RG to the W-5GAN device. For details, refer to S107.

After obtaining the temporary identifier information of the 5G-RG, the AMF 2 may obtain the permanent identifier information of the 5G-RG from the context of the 5G-RG based on the temporary identifier information.

When the AMF 1 and the AMF 2 are not a same AMF, as shown in S110 and S111, the context of the 5G-RG is stored on the AMF 1. In this case, the AMF 2 may find, based on the temporary identifier information of the 5G-RG, the AMF 1 serving the 5G-RG, and send a request message to the AMF 1. Optionally, the request message may further include an SUPI request indication, where the SUPI request indication indicates to request to obtain the permanent identifier information of the 5G-RG. Correspondingly, the AMF 1 may search the context of the 5G-RG based on the temporary identifier information of the 5G-RG, obtain the permanent identifier information of the 5G-RG from the context, and send the permanent identifier information to the AMF 2. The request message carries the temporary identifier information of the 5G-RG. Optionally, the request message may further carry the indication for requesting the permanent identifier information. The permanent identifier information may be a subscriber permanent identifier (SUPI)

It should be understood that when the AMF 1 and the AMF 2 are a same AMF, an interaction process shown in S110 and S111 is no longer required. In this case, the AMF may directly obtain, based on the temporary identifier information of the 5G-RG, the permanent identifier information of the 5G-RG from the context of the 5G-RG locally stored on the AMF.

S112: The AMF 2 may complete authentication of the UE according to an authentication procedure. Specifically, the AMF 2 finds, based on the identification information of the UE, a UDM 2 responsible for storing subscription data of the UE. Then, the UDM 2 and an AUSF complete the authentication procedure of the UE based on an authentication vector in the subscription data of the UE. For details of the authentication procedure, refer to a related 3GPP standard protocol. Details are not described herein.

S113: The AMF 2 finds, based on the permanent identifier information of the 5G-RG, a UDM 1 responsible for storing the subscription data of the 5G-RG, and sends a request message to the UDM 1, where the request message may include the identification information of the UE and the permanent identifier information of the 5G-RG. Optionally, the request message may further carry an access request indication, where the access request indication indicates that the UE represented by the identification information of the UE requests to access the core network through the 5G-RG represented by the 5G-RG SUPI. Optionally, the request message may further carry identification information of the AMF 2. In this way, the UDM 1 may store the identification information of the AMF 2, where the identification information of the AMF 2 may be used to notify, when the subscription data of the 5G-RG is subsequently updated, the AMF 2 to update a subscription type of the UE. Correspondingly, the UDM 1 receives the request message from the AMF 2.

(3) Phase 3: The core network determines the access typeaccess type of the UE based on the subscription data of the 5G-RG. Details may be as follows:

S114 and S115: After receiving the request message from the AMF 2, the UDM 1 may determine the subscription data of the 5G-RG based on the permanent identifier information of the 5G-RG. Then, the UDM 1 may determine the subscription type of the UE based on the subscription data of the 5G-RG. The UDM1 may further determine, based on the subscription data of the 5G-RG, whether the UE is allowed to access the 5G-RG.

The subscription data of the 5G-RG may include the following information:

(1) Subscriber list: The subscriber list includes identification information of user equipment that is a subscriber of the 5G-RG. The identification information of the user equipment in the subscriber list indicates that the user equipment is a subscriber, that is, a family member.

(2) Indication information of a type of access to the 5G-RG: The type of access to the 5G-RG may include an open type and a closed/private type. The closed/private type indicates that the 5G-RG allows access of only a subscriber but does not allow access of a non-subscriber. The open type indicates that the 5G-RG allows access of not only a subscriber but also a non-subscriber. In other words, the type of access may be used to indicate whether the 5G-RG allows access of a non-subscriber.

Specifically, the UDM 1 may determine the access typeaccess type of the UE based on an access typeaccess type of the subscriber list. If the identification information of the UE belongs to the identification information of the user equipment that is the subscriber in the subscriber list, the UDM 1 may determine that the UE is a subscriber of the 5G-RG.

Specifically, the UDM 1 may determine, in the following manners, whether the UE is allowed to access the 5G-RG:

(1) If the identification information of the UE is included in the subscriber list (in other words, the identification information of the UE belongs to the identification information of the user equipment that is a subscriber of the 5G-RG), the UDM 1 may determine that the UE is allowed to access the 5G-RG, regardless of whether the type of access to the 5G-RG is the open type or the closed/private type.

(2) If the identification information of the UE is included in the subscriber list (in other words, the identification information of the UE belongs to the identification information of the user equipment that is a subscriber of the 5G-RG), but the type of access to the 5G-RG indicates that the 5G-RG allows access of a non-subscriber (in other words, the type of access is the open type), the UDM 1 may determine that the UE is allowed to access the 5G-RG.

(3) If the identification information of the UE is not included in the subscriber list (in other words, the identification information of the UE does not belong to the identification information of the user equipment that is a subscriber of the 5G-RG), and the type of access to the 5G-RG indicates that the 5G-RG does not allow access of a non-subscriber (in other words, the type of access is the private type), the UDM 1 may determine that the UE is not allowed to access the 5G-RG.

The subscriber list and the indication information of the type of access to the 5G-RG are not limited thereto. Content of the subscription data of the 5G-RG may alternatively exist in another form, provided that specific subscribers of the 5G-RG can be indicated and specific users allowed to access the 5G-RG can be indicated. For example, the subscription data may include a mapping table. The mapping table includes identification information of a plurality of UEs and indication information of subscription types respectively corresponding to the identification information of the plurality of UEs. The identification information of the plurality of UEs may include identification information of UE that is a subscriber, and may further include identification information of UE that is a non-subscriber. In this way, the UDM 1 may obtain, based on identification information of specific UE by searching the mapping table, a subscription type corresponding to the specific UE.

S116: The UDM 1 may send a response message to the AMF 2. The response message may include indication information of the subscription type of the UE. Correspondingly, the AMF 2 may receive the response message from the UDM 1, and determine a service management policy (for example, QoS control) of the UE based on the subscription type of the UE. In this way, the network side may distinguish different access typeaccess types of the UE, to subsequently perform different service control.

Optionally, when the UE is a subscriber, the AMF 2 may further determine that the UE is allowed to access the 5G-RG.

Specifically, the response message may further include access indication information, and the access indication information indicates whether the UE is allowed to access the 5G-RG. When access of the UE is not allowed, the access indication information is an access reject indication. When access of the UE is allowed, the access indication information is an access grant indication. Optionally, for UE of which access is allowed, the AMF 2 may store a subscription type of the UE in a context of the UE.

In some optional embodiments, the UDM 1 may further send the subscription data of the 5G-RG to the AMF 2, and the AMF 2 determines the subscription type of the UE and whether the UE is allowed to access the 5G-RG. Specifically, a manner in which the AMF 2 determines the subscription type of the UE and whether the UE is allowed to access the 5G-RG may be the same as that used by the UDM 1. For details, refer to S114 and S115. Details are not described herein again.

In some optional embodiments, after determining that the UE is allowed to access the 5G-RG, the UDM 1 may further send the subscriber list to the AMF 2. In this way, the AMF 2 may determine, based on the subscriber list, the access typeaccess type of the UE that is to access the 5G-RG, and use a corresponding service management policy, for example, QoS control.

S117 and S118: The AMF 2 completes an access procedure, for example, an access grant procedure or an access reject procedure, of the UE based on an existing registration procedure, an existing mobility registration update procedure, or an existing periodic registration update procedure. For details of the existing registration procedure, the mobility registration update procedure, or the periodic registration update procedure, refer to a related 3GPP standard protocol. Details are not described herein.

Optionally, the AMF 2 may send access indication information to the W-5GAN device or the 5G-RG, where the access indication information is used to indicate whether the UE is allowed to access the 5G-RG. Specifically, the indication information may be a security key. In this case, the W-5GAN may determine, based on the received security key, that the authentication of the UE succeeds, and therefore determine that access of the UE is allowed. Alternatively, the indication information may be an EAP-Success message. In this case, after receiving the EAP-Success message, the 5G-RG may determine that the authentication of the UE succeeds, and therefore determine that access of the UE is allowed. Optionally, the AMF 2 may further send the indication information of the subscription type of the UE and/or indication information of the service management policy (such as QoS control or local resource access permission) of the UE to the W-5GAN device, the 5G-RG, or the UE. Specifically, the access indication information, or/and the indication information of the subscription type of the UE and/or the service management policy of the UE is/are from the AMF 2 to the W-5GAN through an N2 interface message, or from AMF 2 to the 5G-RG or the UE through a NAS (Non-Access-Stratum) message.

Optionally, after receiving the access indication information, or the indication information of the subscription type of the UE and/or the indication information of the service management policy of the UE, the W-5GAN device may send the access indication information, or the indication information of the subscription type of the UE and/or the indication information of the service management policy of the UE to the 5G-RG or the UE. Specifically, the indication information may be a security key. In this case, the W-5GAN may determine, based on the received security key, that the authentication of the UE succeeds, and therefore determine that access of the UE is allowed. Alternatively, the indication information may be an EAP-Success message. In this case, the 5G-RG or the UE may determine, based on the received EAP-Success message, that the authentication of the UE succeeds, and therefore determine that access of the UE is allowed. Alternatively, the indication information may be a NAS success message. In this case, the UE may determine, based on the NAS success message, that access of the UE is allowed. Specifically, the access indication information, or/and the indication information of the subscription type of the UE and/or the service management policy of the UE is/are from the W-5GAN to the 5G-RG or the UE through an access side message. The access side message is, for example, a PPPoE message or an EAP message, or another fixed-network access side message.

Optionally, after receiving the access indication information, or the indication information of the subscription type of the UE and/or the indication information of the service management policy of the UE, the 5G-RG may send the access indication information, or the indication information of the subscription type of the UE and/or the indication information of the service management policy of the UE to the UE. Specifically, the indication information may be an EAP-Success message. In this case, the UE may determine, based on the received EAP-Success message, that the authentication of the UE succeeds, and therefore determine that access of the UE is allowed. Alternatively, the indication information may be a NAS success message. In this case, the UE may determine, based on the NAS success message, that access of the UE is allowed. Specifically, the access indication information, or/and the indication information of the subscription type of the UE and/or the service management policy of the UE is/are from the 5G-RG to the UE through an air interface side message. The air interface side message is, for example, a PC5 interface message, an EAP message, a WLAN interface message, or a Bluetooth interface message.

(4) Phase 4: The subscription data of the 5G-RG is updated. Details may be as follows:

S119: The subscription data of the 5G-RG stored on the UDM 1 is updated. For example, the type of access to the 5G-RG changes from the open type to the private type, or the subscriber list is updated.

Optionally, the UDM 1 may re-determine, based on updated subscription data of the 5G-RG, a subscription type of the UE and whether the UE is allowed to access the 5G-RG.

Optionally, the UDM 1 may further send the updated subscription data of the 5G-RG to the AMF 2, and the AMF 2 re-determines, based on the updated subscription data of the 5G-RG, the subscription type of the UE and whether the UE is allowed to access the 5G-RG.

S120: When the subscription data of the 5G-RG is updated, the UDM 1 may send an access update message to the AMF 2 based on the identification information of the AMF 2.

Specifically, the access update message is implemented as follows:

(1) If the type of access to the 5G-RG changes from the open type to the private type, and the subscription type of the UE indicates the non-subscriber, the access update message may include an access reject indication.

(2) If an updated subscriber list of the 5G-RG indicates a change of UE subscription, the access update message may include indication information of an updated subscription type of the UE, to notify the AMF 2 to adjust the access typeaccess type of the UE and the service management policy of the UE.

(3) The access update message may include at least one of an updated type of access to the 5G-RG and the updated subscriber list, and the AMF 2 determines, based on the updated type of access to the 5G-RG and/or the updated subscriber list, the subscription type of the UE and whether the UE is allowed to access the 5G-RG.

S121: The AMF 2 sends a notification message to the UE. The notification message may be used to notify the UE of the changed subscription type of the UE. When the UE can no longer access the core network through the 5G-RG, the notification message may carry a reselection indication, and the reselection indication is used to notify the UE to reselect a 5G-RG for access.

S122: Optionally, if receiving the reselection indication from the AMF 2, the UE may release the connection to the original 5G-RG, and select another 5G-RG to access the 5GC.

In Embodiment 1 shown in FIG. 2A, FIG. 2B, and FIG. 2C, the UDM may distinguish different access typeaccess types of the UE based on the subscription data of the 5G-RG, to subsequently perform different service control, for example, different QoS control. Particularly, when there are limited network resources, the network side may preferentially guarantee access of a subscriber but restrict access of a non-subscriber. In this way, the 5GC can support more access modes. This improves convergence of a fixed network and a mobile network.

Embodiment 2

A main difference between Embodiment 2 and Embodiment 1 lies in that an AMF 2 obtains identification information of a 5G-RG in a different manner.

Figure 3A:
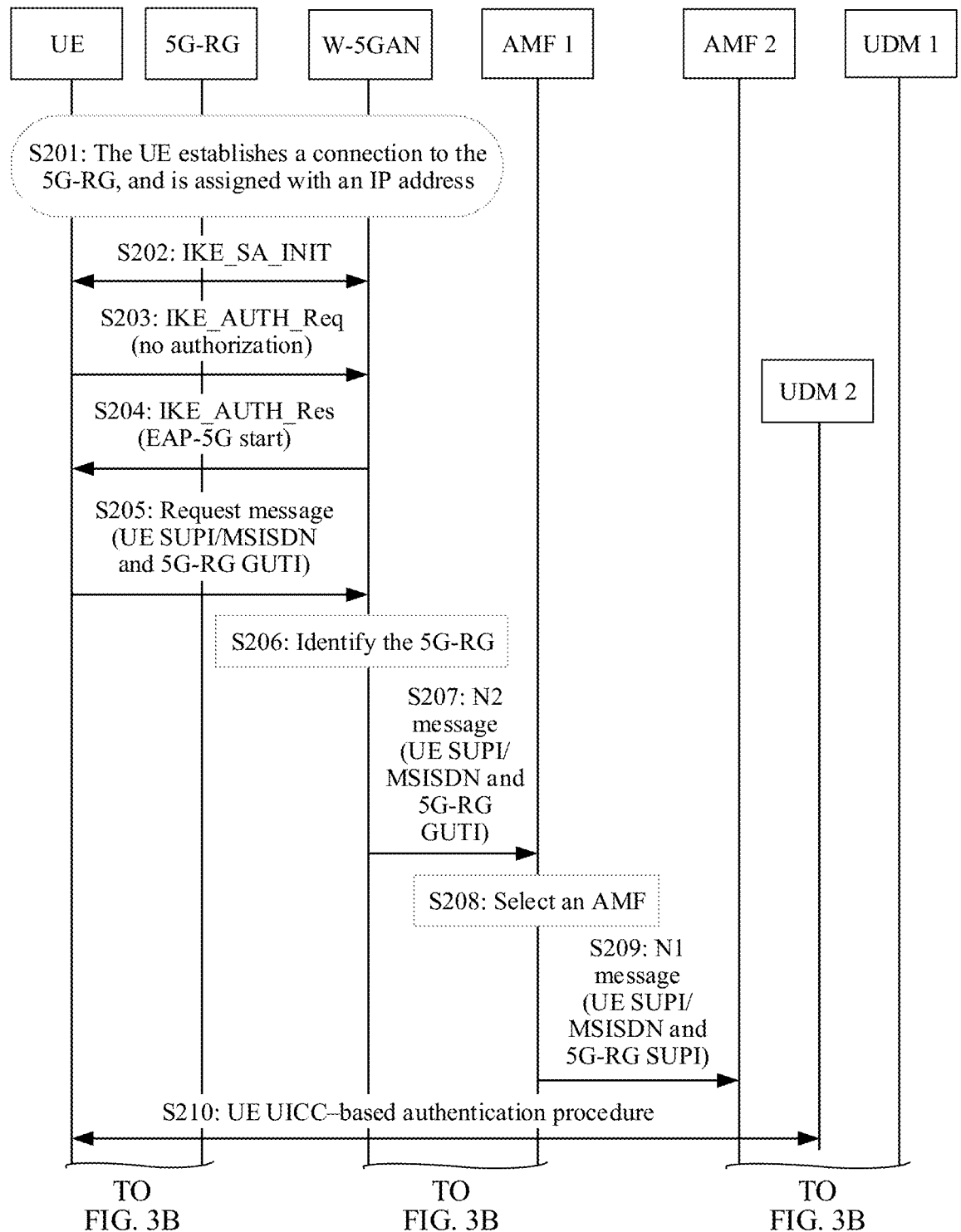
FIG. 3A and FIG. 3B are a schematic flowchart of another network access method according to this application.
Figure 3B:
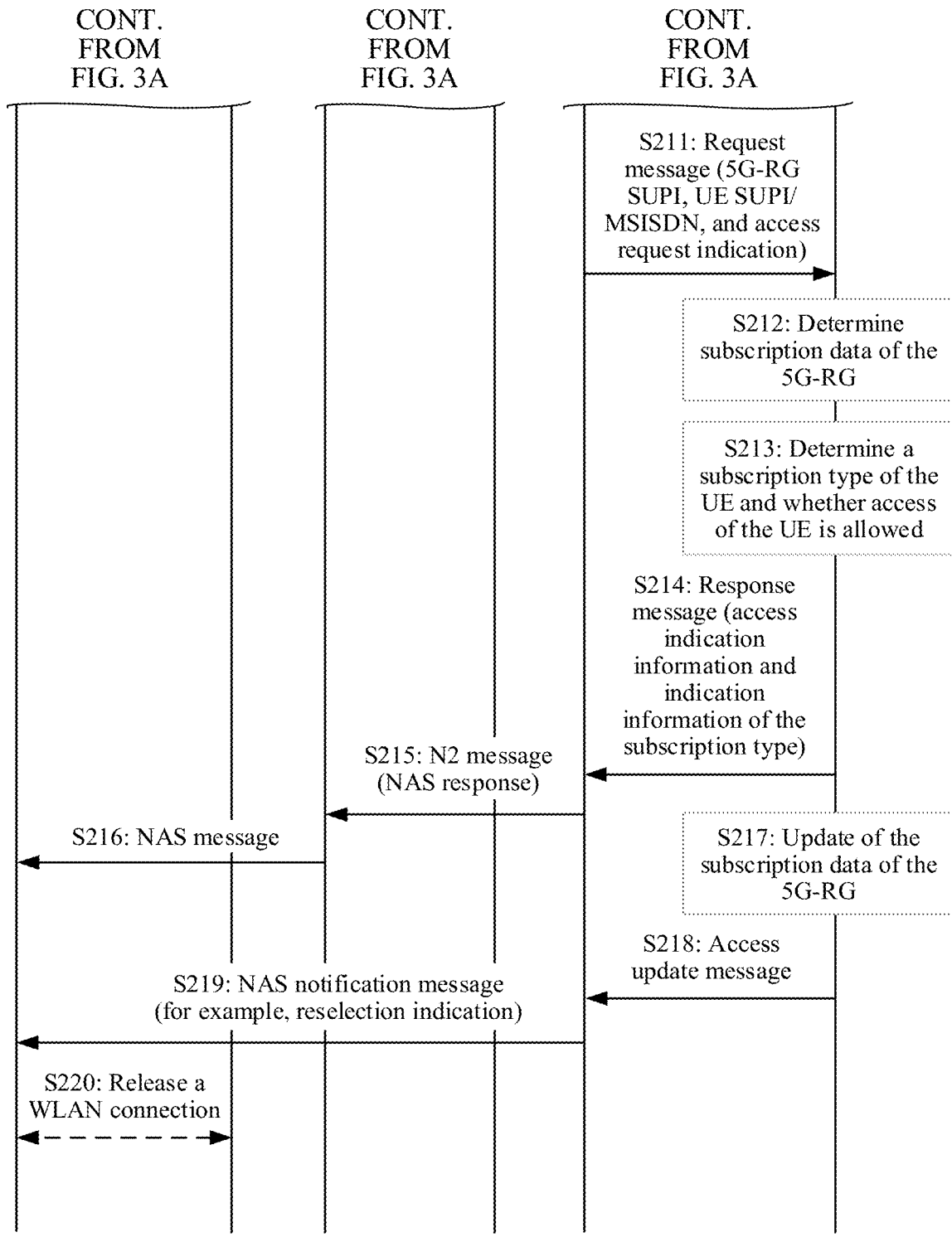

As shown in FIG. 3A and FIG. 3B, a network access method provided in Embodiment 2 may include the following steps.

(1) Phase 1: UE initiates an access request.

S201: The UE establishes a connection to a 5G-RG, for example, establishes a connection through a WLAN interface. Optionally, the 5G-RG or a W-5GAN device accessed by the 5G-RG may assign an IP address to the UE.

Before S201, the 5G-RG may register with a 5GC, and a core network element with which the 5G-RG registers is an AMF 1. For a specific procedure in which the 5G-RG registers with the 5GC, refer to a registration procedure defined in a 3GPP standard protocol. Details are not described herein.

S202 to S204: The UE establishes a connection to the W-5GAN device. For details, refer to S103 to S105 in Embodiment 1. Details are not described herein again.

S205: The UE may send a request message to the W-5GAN device over the connection established between the UE and the W-5GAN device. The request message may include identification information of the UE, and is used to request to access a core network (the 5GC). The request message may be a NAS message. The W-5GAN device may forward the NAS message to the AMF 1. For details, refer to S207.

(2) Phase 2: A network side obtains identification information of the 5G-RG and subscription data of the 5G-RG. Details may be as follows:

S206 and S207: The W-5GAN device identifies the 5G-RG, and obtains temporary identifier information such as a line identity (line ID) of the 5G-RG, a 5G-RG GUTI, or a 5G-RG temporary identifier on an N2 interface. In addition, the W-5GAN determines a context of the 5G-RG, obtains, from the context of the 5G-RG, the AMF 1 connected to the 5G-RG, and sends the request message to the AMF 1. The request message may include the identification information of the UE and the temporary identifier information of the 5G-RG. The temporary identifier information of the 5G-RG includes at least one of the line identity (line ID) of the 5G-RG, the 5G-RG GUTI, or the 5G-RG temporary identifier on the N2 interface. The request message may be an N2 message, and N2 is a reference point between the W-5GAN device and the AMF. Optionally, the W-5GAN device may include, in the N2 message, the NAS message (referring to S205) from the UE. In this way, the W-5GAN device may forward the NAS message to an AMF 2, where the NAS message is used by the UE to request access to the core network from the AMF 2.

Correspondingly, the AMF 1 receives the request message from the W-5GAN device, obtains the context of the 5G-RG based on the temporary identifier information of the 5G-RG as an index, and obtains permanent identifier information of the 5G-RG from the context of the 5G-RG.

Specifically, solutions used by the W-5GAN to identify the 5G-RG include but are not limited to the following several solutions:

(1) The W-5GAN identifies the 5G-RG based on a local IP address of the UE. To be specific, the W-5GAN identifies a specific 5G-RG that assigns an IP address space to which the IP address belongs, and then determines the 5G-RG.

(2) The W-5GAN device assigns the IP address of the UE based on a DHCP procedure. In this IP address assignment process, the W-5GAN device may obtain, from a DHCP message, the identity, namely, the line ID, of a line connected to the 5G-RG. The W-5GAN device may identify the 5G-RG based on a correspondence between the line ID and the 5G-RG.

Optionally, the W-5GAN device may alternatively identify the 5G-RG based on a virtual local area network (VLAN) identifier of the 5G-RG or a current access point identifier of the UE.

S208: The AMF 1 may select the AMF 2 for the UE. Specifically, the AMF 1 may select the AMF 2 based on slice selection information or the identification information of the UE.

S209: The AMF 1 sends a notification message to the AMF 2, where the notification message may include the identification information of the UE and the permanent identifier information of the 5G-RG. The notification message may be an N1 notification message (N1messageNotify), and N1 is a reference point between the UE and the AMF. Optionally, the AMF 1 may include, in the N1 notification message, the NAS message (referring to S205) from the UE.

Correspondingly, the AMF 2 may receive the notification message from the AMF 2, and obtain the permanent identifier information of the 5G-RG that is carried in the notification message.

Subsequent procedures (S210 to S220) are the same as S112 to S122 in Embodiment 1. Details are not described herein again.

Embodiment 3

In this embodiment, an AMF 1 is responsible for determining an access typeaccess type (including subscriber access and non-subscriber access) of UE, and determining whether a residential gateway allows access of the UE. A difference from Embodiment 1 and Embodiment 2 lines in that, in this embodiment, an AMF 2 determines subscription data of a 5G-RG with no need to interact with a UDM 1.

Figure 4A:
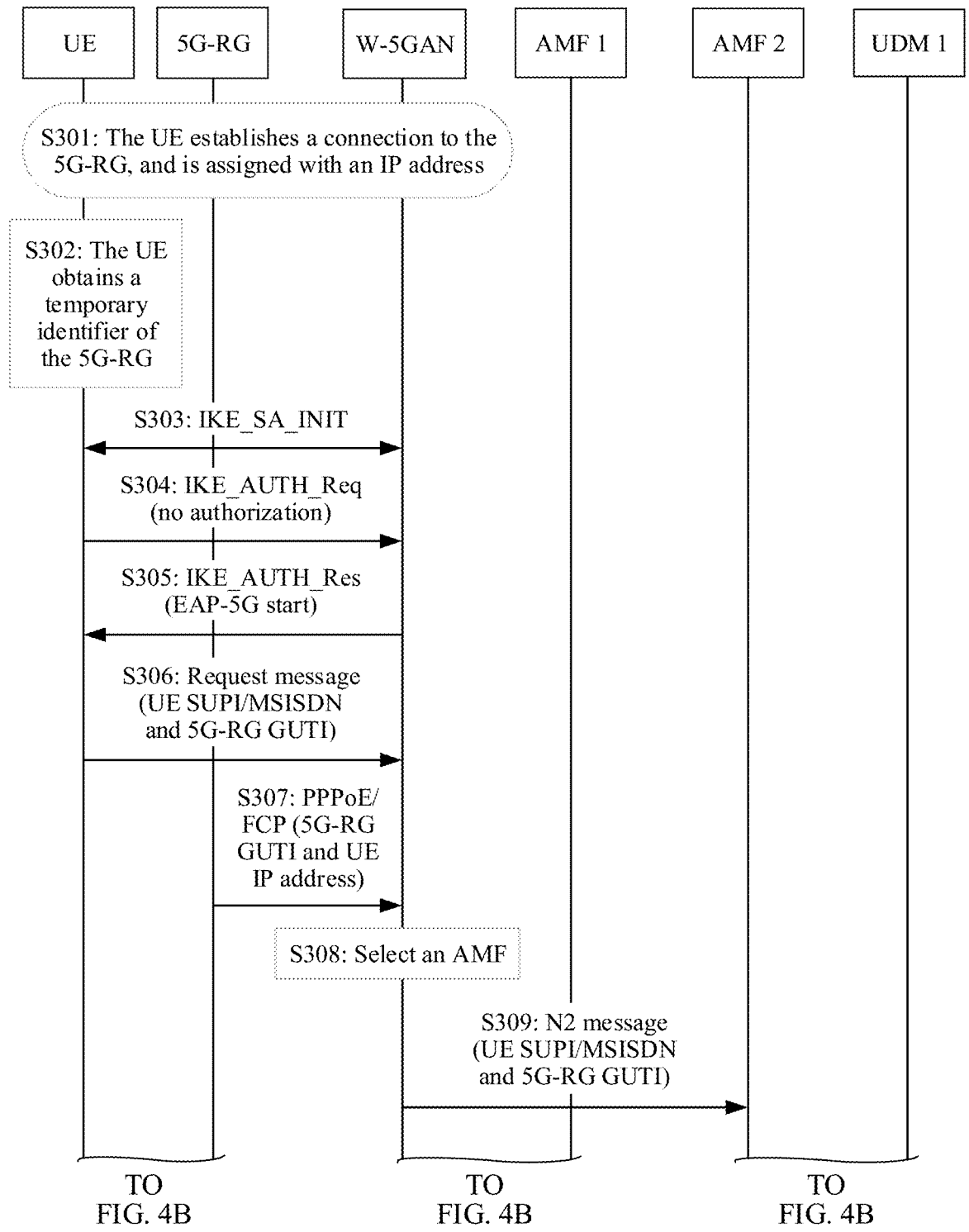
FIG. 4A, FIG. 4B, and FIG. 4C are a schematic flowchart of still another network access method according to this application.
Figure 4B:
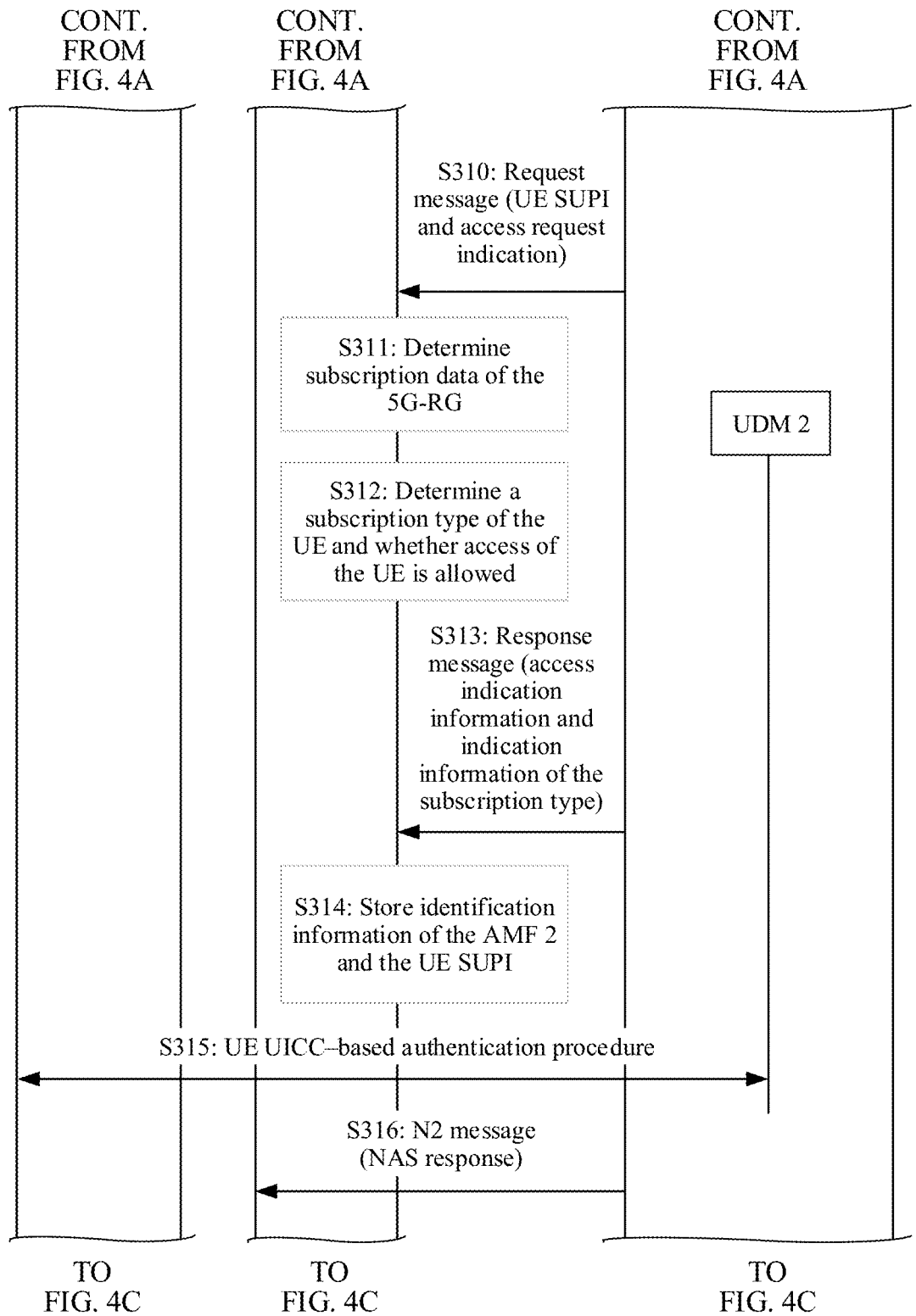
Figure 4C:
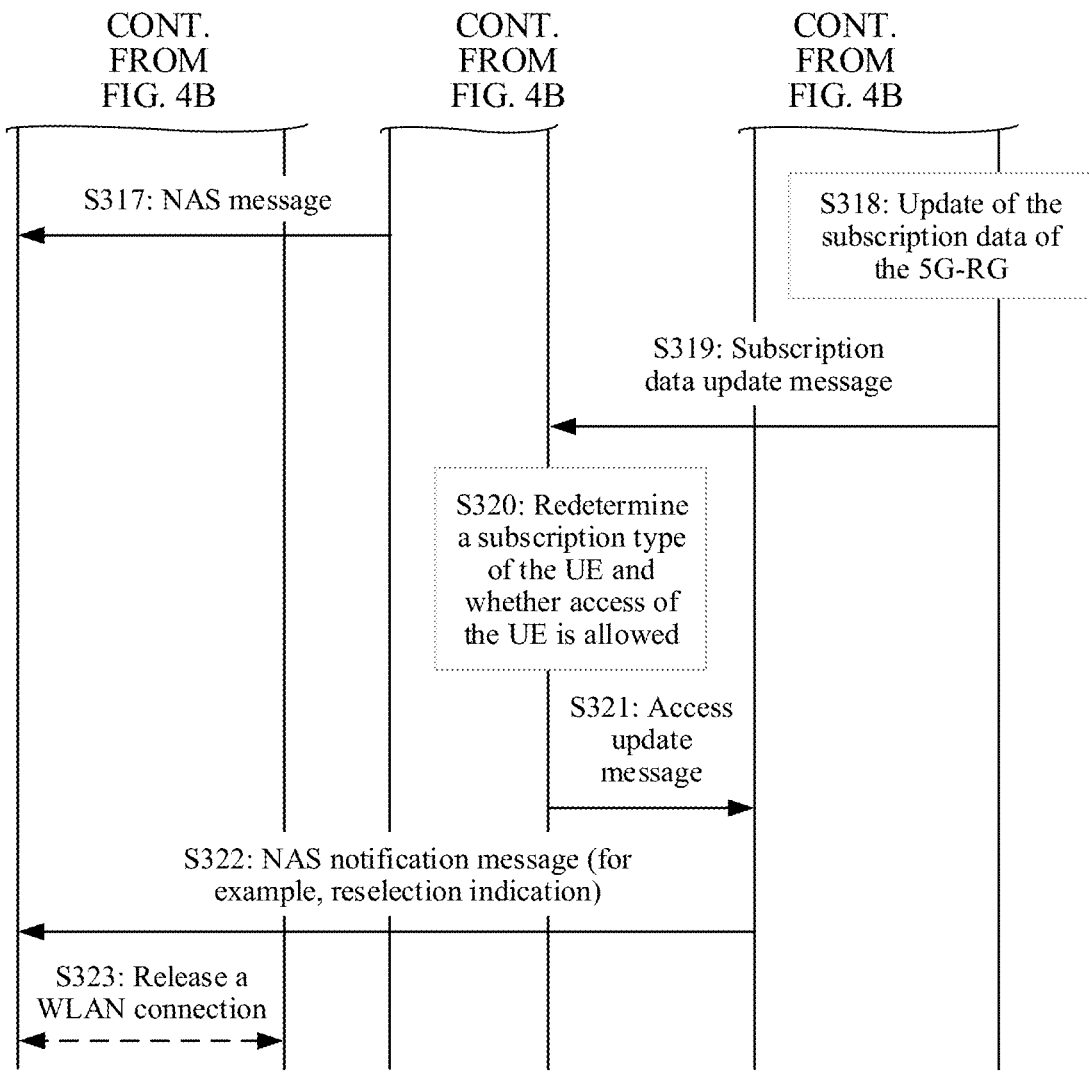

As shown in FIG. 4A, FIG. 4B, and FIG. 4C, a network access method provided in Embodiment 3 may include the following steps.

S301 to S306: The UE initiates an access request.

For details, refer to the phase 1 in Embodiment 1. Details are not described herein again.

S307 to S309: The AMF 2 obtains temporary identifier information of the 5G-RG. The steps are the same as S107 to S109 in Embodiment 1. Details are not described herein again.

S310: The AMF 2 may find the AMF 1 based on the temporary identifier information of the 5G-RG, and send a request message to the AMF 1. The request message may include identification information of the UE and the temporary identifier information of the 5G-RG. Optionally, the request message may further include an access request indication, where the access request indication indicates that the UE represented by the identification information of the UE requests to access a core network through the 5G-RG represented by the temporary identifier information of the 5G-RG.

S311 to S313: The AMF 1 may search for a context of the 5G-RG based on the temporary identifier information of the 5G-RG. The context of the 5G-RG includes the subscription data of the 5G-RG obtained from the UDM 1. Then, the AMF 1 may determine, based on the subscription data of the 5G-RG, a subscription type of the UE and whether the UE is allowed to access the 5G-RG. Specifically, a manner in which the AMF 1 determines, based on the subscription data of the 5G-RG, the subscription type of the UE and whether the UE is allowed to access the 5G-RG is the same as that used by the UDM in Embodiment 1. Details are not described herein again.

After determining the subscription type of the UE and whether the UE is allowed to access the 5G-RG, the AMF 1 may send a response message to the AMF 2. The response message may include indication information of the subscription type of the UE. Correspondingly, the AMF 2 may receive the response message from the AMF 1, and determine a service management policy (for example, QoS control) of the UE based on the subscription type of the UE. In this way, a network side may distinguish different access typeaccess types of the UE, to subsequently perform different service control.

Optionally, when the UE is a subscriber, the AMF 2 may further determine that the UE is allowed to access the 5G-RG.

Specifically, the response message may further include access indication information, and the access indication information indicates whether the UE is allowed to access the 5G-RG. When access of the UE is not allowed, the access indication information is an access reject indication. When access of the UE is allowed, the access indication information is an access grant indication. Optionally, for UE of which access is allowed, the AMF 2 may store a subscription type of the UE in a context of the UE.

S314: Optionally, the AMF 1 may store identification information of the AMF 2, where the identification information of the AMF 2 may be used to notify, when the subscription data of the 5G-RG is subsequently updated, the AMF 2 to update the subscription type of the UE. The AMF 1 may further store the identification information of the UE, where the identification information of the UE may be used to determine whether subscription data of the UE changes. If the subscription type of the UE changes from a subscriber to a non-subscriber, the UE needs to be notified in a targeted manner.

S315: The AMF 2 may complete authentication of the UE according to an authentication procedure. For details of the authentication procedure, refer to a related 3GPP protocol. Details are not described herein.

S316 and S317: The AMF 2 completes an access procedure, for example, an access grant procedure or an access reject procedure, of the UE based on an existing registration procedure, a mobility registration update procedure, or a periodic registration update procedure. For details of the existing registration procedure, the mobility registration update procedure, or the periodic registration update procedure, refer to a related 3GPP standard protocol. Details are not described herein.

Optionally, as described in S117 and S118, the AMF 2 may send access indication information to a W-5GAN device or the 5G-RG, where the access indication information is used to indicate whether the UE is allowed to access the 5G-RG. Optionally, the AMF 2 may further send the indication information of the subscription type of the UE and/or the service management policy (such as QoS control or local resource access permission) of the UE to the W-5GAN device, the 5G-RG, or the UE. Specifically, the access indication information, or/and the indication information of the subscription type of the UE and/or the service management policy of the UE is/are from the AMF 2 to the W-5GAN through an N2 interface message, or from AMF 2 to the 5G-RG or the UE through a NAS (Non-Access-Stratum) message.

Optionally, after receiving the access indication information, or the indication information of the subscription type of the UE and/or indication information of the service management policy of the UE, the W-5GAN device may send the access indication information, or the indication information of the subscription type of the UE and/or the indication information of the service management policy of the UE to the 5G-RG or the UE. Specifically, the access indication information, or/and the indication information of the subscription type of the UE and/or the service management policy of the UE is/are from the W-5GAN to the 5G-RG or the UE through an access side message. The access side message is, for example, a PPPoE message or an EAP message (Extensible Authentication Protocol), or another fixed-network access side message.

Optionally, after receiving the access indication information, or the indication information of the subscription type of the UE and/or the indication information of the service management policy of the UE, the 5G-RG may send the access indication information, or the indication information of the subscription type of the UE and/or the indication information of the service management policy of the UE to the UE. Specifically, the access indication information, or/and the indication information of the subscription type of the UE and/or the service management policy of the UE is/are from the 5G-RG to the UE through an air interface side message. The air interface side message is, for example, a PC5 interface message, an EAP message, a WLAN interface message, or a Bluetooth interface message.

S318: The subscription data of the 5G-RG stored on the UDM 1 is updated. For example, a type of access to the 5G-RG changes from an open type to a private type, or a subscriber list is updated.

S319: The UDM 1 sends a subscription data update message to the AMF 1, where the subscription data update message may carry updated subscription data of the 5G-RG.

S320 and S321: Correspondingly, the AMF 1 receives the subscription data update message from the UDM 1 and determines, based on the updated subscription data of the 5G-RG, a subscription type of the UE and whether the UE is allowed to access the 5G-RG. Then, the AMF 1 may send an access update message to the AMF 2 based on the identification information of the AMF 2. For specific implementation of the access update message, refer to the access update message mentioned in Embodiment 1. Details are not described herein again.

S322: The AMF 2 sends a notification message to the UE. The notification message may be used to notify the AMF 2 of the changed subscription type of the UE. When the UE can no longer access the core network through the 5G-RG, the notification message may carry a reselection indication, and the reselection indication is used to notify the UE to reselect a 5G-RG for access.

S323: Optionally, if receiving the reselection indication from the AMF 2, the UE may release a connection to the original 5G-RG, and select another 5G-RG to access a 5GC.

In Embodiment 3 shown in FIG. 4A, FIG. 4B, and FIG. 4C, the AMF may distinguish different access typeaccess types of the UE based on the subscription data of the 5G-RG, to subsequently perform different service control, for example, different QoS control. Particularly, when there are limited network resources, the network side may preferentially guarantee access of a subscriber but restrict access of a non-subscriber. In this way, the 5GC can support more access modes. This improves convergence of a fixed network and a mobile network.

FIG. 4A, FIG. 4B, and FIG. 4C are not limited thereto. In Embodiment 3, the AMF 2 may alternatively obtain the temporary identifier information of the 5G-RG in a manner described in Embodiment 2.

Figure 5A:
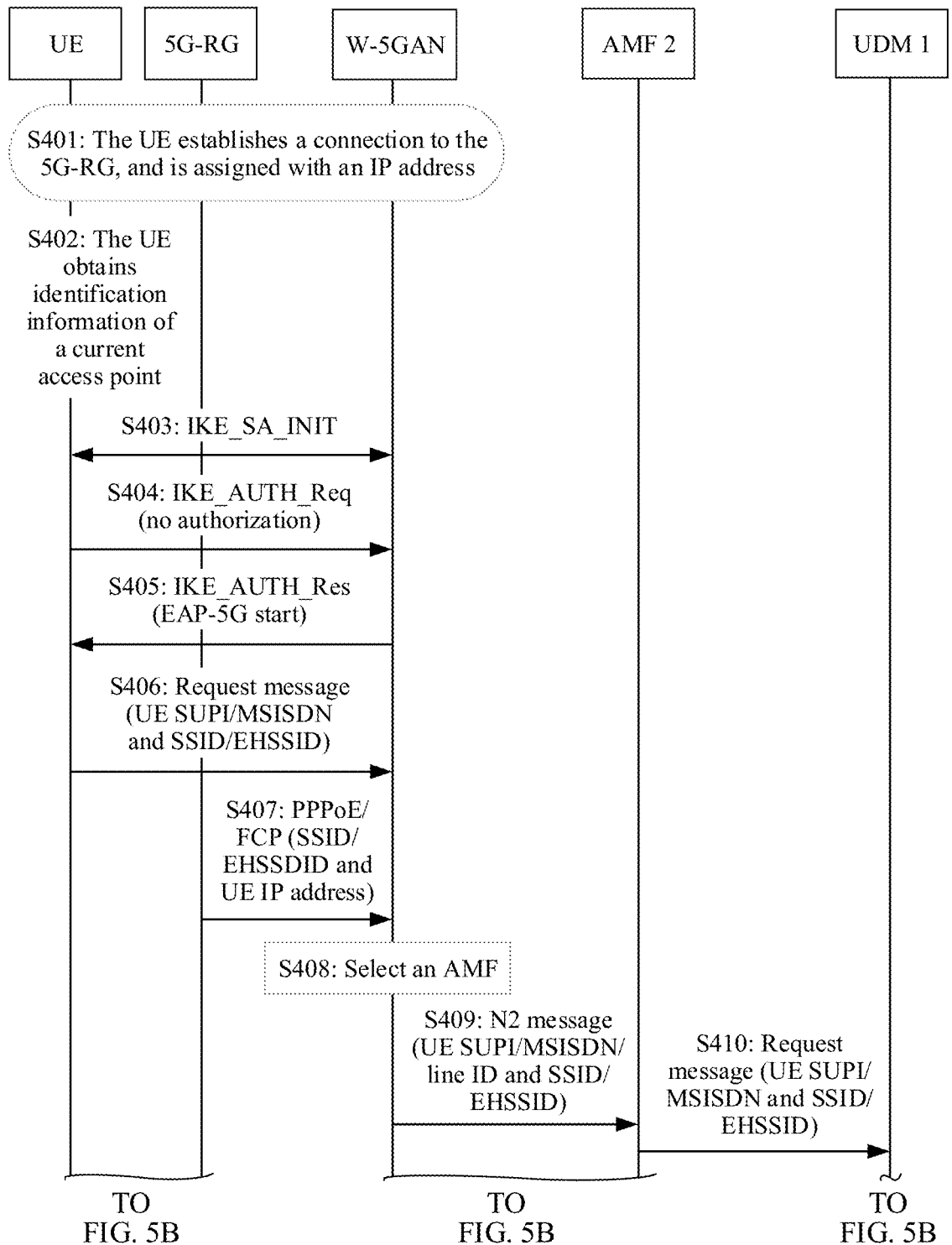
FIG. 5A and FIG. 5B are a schematic flowchart of yet another network access method according to this application.
Figure 5B:
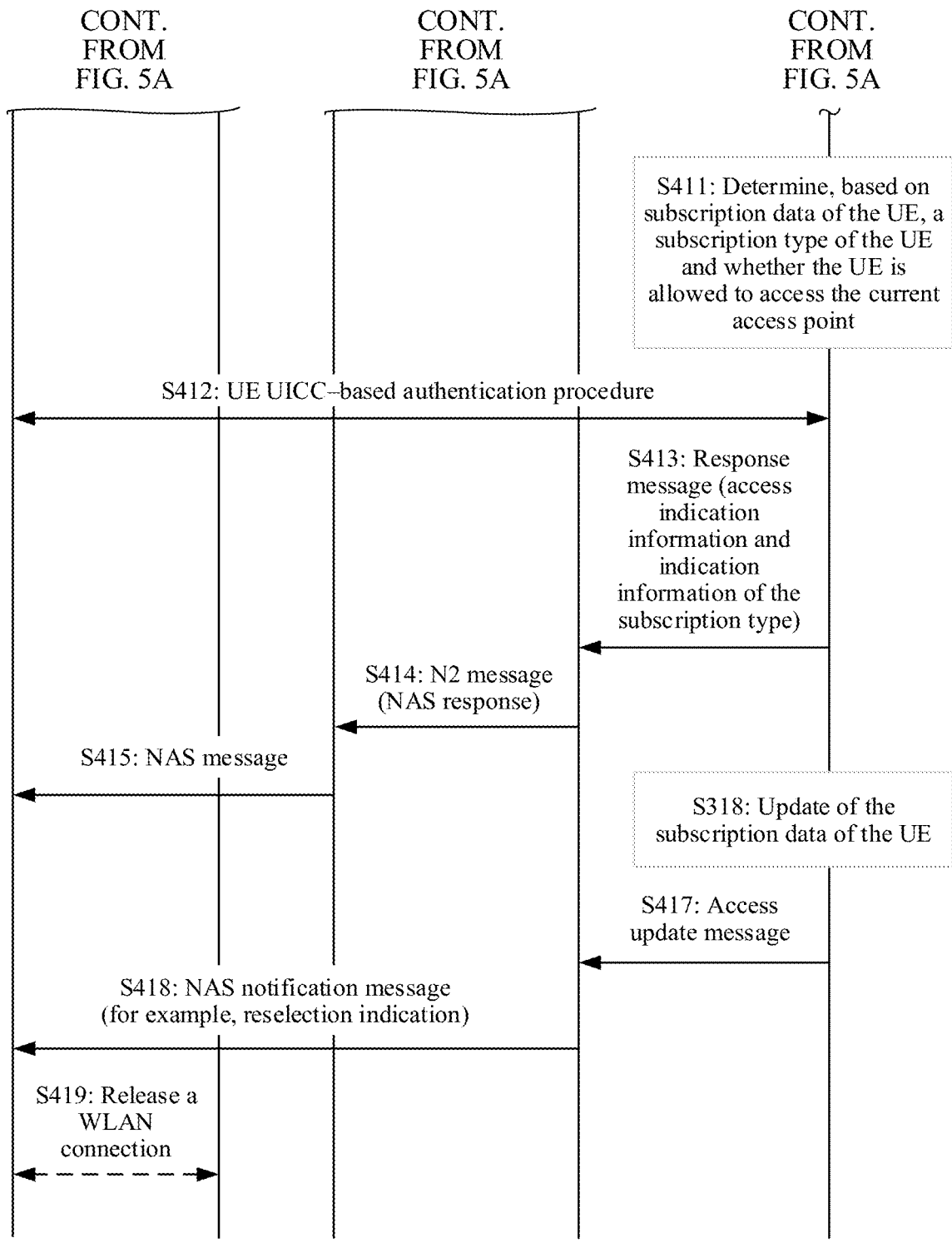

In addition, this application further provides another network access method. In this method, subscription type of UE and whether the UE can access a 5GC through a current access point may be determined based on subscription data of the UE. As shown in FIG. 5A and FIG. 5B, the method may include the following steps.

(1) Phase 1: The UE initiates an access request. Details may be as follows:

S401: The UE establishes a connection to a 5G-RG, for example, establishes the connection through a WLAN interface. Optionally, the 5G-RG or a W-5GAN device accessed by the 5G-RG may assign an IP address to the UE.

Before S401, the 5G-RG may register with the 5GC, and a core network element with which the 5G-RG registers is an AMF 1. For a specific procedure in which the 5G-RG registers with the 5GC, refer to a registration procedure defined in a 3GPP standard protocol. Details are not described herein.

S403 to S405: The UE establishes a connection to a W-5GAN device. For details, refer to S103 to S105 in Embodiment 1. Details are not described herein again.

S406: The UE may send a request message to the W-5GAN device over the connection established between the UE and the W-5GAN device. The request message may include identification information of the UE, and is used to request to access a core network (the 5GC). The request message may be a NAS message. The W-5GAN device may forward the NAS message to an AMF 2. For details, refer to S409.

(2) Phase 2: A network side obtains identification information and subscription data of the current access point of the UE. Details may be as follows:

S407: The 5G-RG sends the identification information of the current access point of the UE to the W-5GAN device. The current access point of the UE is a 5G-RG to which the UE is currently connected. The identification information of the current access point of the UE may be used as an index for obtaining, on a core network side, subscription data of the UE. An identifier of an access point may include a service set identifier (SSID), a homogeneous extended service set identifier (HESSID), or the like. How to obtain the identifier of the current access point of the UE is not limited in this application. For example, the 5G-RG sends a PPPoE message or another control plane message, where the message may carry the identification information of the current access point of the UE. Optionally, the message may further carry the IP address of the UE.

Optionally, in S406, the request message from the UE to the W-5GAN device may further carry the identification information of the current access point of the UE, and the identification information of the current access point may be obtained by the UE. As shown in S402, after establishing the connection to the 5G-RG, the UE may obtain the identification information of the current access point through ANQP query. Specifically, the UE may receive an ANQP message or an EAP message from the 5G-RG, where these messages include the identification information of the current access point.

S408: The W-5GAN device may select the AMF 2 for the UE. Specifically, the W-5GAN device may select the AMF 2 based on slice selection information or the identification information of the UE.

S409: The W-5GAN device may send a request message to the AMF 2, where the request message may include the identification information of the UE and the identification information of the current access point of the UE, and is used by the UE to request to access the core network. The request message may be an N2 message, and N2 is a reference point between the W-5GAN device and the AMF. Optionally, the W-5GAN device may include, in the N2 message, the NAS message (referring to S406) from the UE. In this way, the W-5GAN device may forward the NAS message to the AMF 2, where the NAS message is used by the UE to request access to the core network from the AMF 2.

S410: The AMF 2 may send a request message to a UDM 2, where the request message may include the identification information of the UE and the identification information of the current access point of the UE.

(3) Phase 3: The core network determines an access typeaccess type of the UE based on the subscription data of the UE. Details may be as follows:

S411: Correspondingly, the UDM 2 receives the request message sent by the AMF 2. The UDM 2 may obtain the subscription data of the UE based on the identification information of the current access point included in the request message. The UDM 2 may determine the subscription type of the UE based on the subscription data of the UE. The UDM 2 may further determine, based on the subscription data of the UE, whether the UE is allowed to access the current access point.

In this application, the subscription data of the UE may be used to indicate that the UE is a subscriber of specific access points.

Specifically, the subscription data of the UE may include the following information:

(1) Subscribed access point list: The subscribed access point list includes identification information of at least one access point, and the identification information of the at least one access point indicates that the UE is a subscriber of the at least one access point. If the identification information of the current access point of the UE belongs to the identification information of the at least one access point, it indicates that the UE is a subscriber of the current access point. It should be understood that if the UE is a subscriber of the current access point, the UE is allowed to access the current access point.

(2) Non-subscribed access point list: The non-subscribed access point list includes identification information of at least one access point, and the identification information of the at least one access point indicates that the UE is a non-subscriber of the at least one access point. If the identification information of the current access point of the UE belongs to the identification information of the at least one access point, it indicates that the UE is a non-subscriber of the current access point.

In this application, if the identification information of the current access point of the UE belongs to neither of the foregoing lists, it indicates that the UE is not allowed to be connected to the current access point. The access point list (the subscribed access point list or the non-subscribed access point list) includes an identifier of an access point that can be accessed by the UE. When the UE is allowed to access only a few access points, a whitelist can be used, to shorten a list length and save parameter storage space. Herein, the whitelist records only identification information of an access point that can be accessed by the UE.

S412: The UDM 2 may complete an authentication procedure of the UE based on an authentication vector in the subscription data of the UE. For details of the authentication procedure, refer to a related 3GPP standard protocol. Details are not described herein.

S413: The UDM 2 may send a response message to the AMF 2. The response message may include indication information of the subscription type of the UE. Correspondingly, the AMF 2 may receive the response message from the UDM 2, and determine a service management policy (for example, QoS control) of the UE based on the subscription type of the UE. In this way, a network side may distinguish different access typeaccess types of the UE, to subsequently perform different service control.

Optionally, when the UE is a subscriber, the UDM 2 may further determine that the UE is allowed to access the 5G-RG.

Specifically, the response message may further include access indication information, and the access indication information indicates whether the UE is allowed to access the current access point. When access of the UE is not allowed, the access indication information is an access reject indication. When access of the UE is allowed, the access indication information is an access grant indication. Optionally, for UE of which access is allowed, the UDM 2 may store the subscription type of the UE in a context of the UE.

In some optional embodiments, the UDM 2 may further send the subscribed access point list and/or the non-subscribed above point list to the AMF 2, and the AMF 2 determines the subscription type of the UE and whether the UE is allowed to access the current access point. Specifically, a manner in which the AMF 2 determines the subscription type of the UE and whether the UE is allowed to access the current access point may be the same as that used by the UDM 2. Details are not described herein again.

S414 and S415: The AMF 2 completes an access procedure, for example, an access grant procedure or an access reject procedure, of the UE based on an existing registration procedure, a mobility registration update procedure, or a periodic registration update procedure. For details of the existing registration procedure, the mobility registration update procedure, or the periodic registration update procedure, refer to a related 3GPP standard protocol. Details are not described herein.

Optionally, the AMF 2 may send the indication information of the subscription type of the UE and/or the service management policy (such as QoS control) of the UE to the W-5GAN device or the 5G-RG. Optionally, the AMF 2 may further send an access indication to the W-5GAN device or the 5G-RG, where the access indication is used to indicate whether the UE is allowed to access the current access point.

(4) Phase 4: The subscription data of the UE is updated. Details may be as follows:

S416: The subscription data of the UE stored on the UDM 2 is updated. For example, the subscribed access point list and/or the non-subscribed access point list are/is updated.

Optionally, the UDM 2 may re-determine, based on updated subscription data of the UE, a subscription type of the UE and whether the UE is allowed to access the current access point.

Optionally, the UDM 2 may further send the updated subscription data of the UE to the AMF 2, and the AMF 2 re-determines, based on the updated subscription data of the UE, the subscription type of the UE and whether the UE is allowed to access the current access point.

S417: When the subscription data of the UE is updated, the UDM 2 may send an access update message to the AMF 2 based on identification information of the AMF 2.

Specifically, the access update message is implemented as follows:

(1) If an updated subscribed access point list and/or an updated non-subscribed access point list indicate/indicates a change of UE subscription, the access update message may include indication information of an updated subscription type of the UE, to notify the AMF 2 to adjust the access typeaccess type of the UE and the service management policy of the UE.

(2) If the identification information of the current access point belongs to neither the updated subscribed access point list nor the updated non-subscribed access point list, the access update message may include an access reject indication.

S418: The AMF 2 sends a notification message to the UE. The notification message may be used to notify the UE of the changed subscription type of the UE. When the UE can no longer access the core network through the current access point, the notification message may carry a reselection indication, and the reselection indication is used to notify the UE to reselect an access point for access.

S419: Optionally, if receiving the reselection indication from the AMF 2, the UE may release the connection to the current access point, and select another access point to access the 5GC.

In Embodiment 4 shown in FIG. 5A and FIG. 5B, the core network may distinguish different access typeaccess types of the UE based on the subscription data of the UE, to subsequently perform different service control, for example, different QoS control. Particularly, when there are limited network resources, the network side may preferentially guarantee access of a subscriber but restrict access of a non-subscriber. In this way, the 5GC can support more access modes. This improves convergence of a fixed network and a mobile network.

In the foregoing solutions in which whether the residential gateway allows access of the UE is determined based on the subscription data of the 5G-RG, the network side may further obtain the identification information of the 5G-RG in the following manner: The UE sends a NAS message to the core network, where the NAS message includes the identification information of the 5G-RG. The identification information of the 5G-RG may be from the 5G-RG to the UE, or may be from the 5G-RG to the UE via the W-5GAN device. The identification information (that is, a 5G-RG ID) of the 5G-RG includes, for example, a 5G-GUTI of the 5G-RG, or an SUCI (Subscription Concealed Identifier, subscription encrypted identifier) of the 5G-RG, or a 5G-RG N2 interface identifier.

Figure 11:
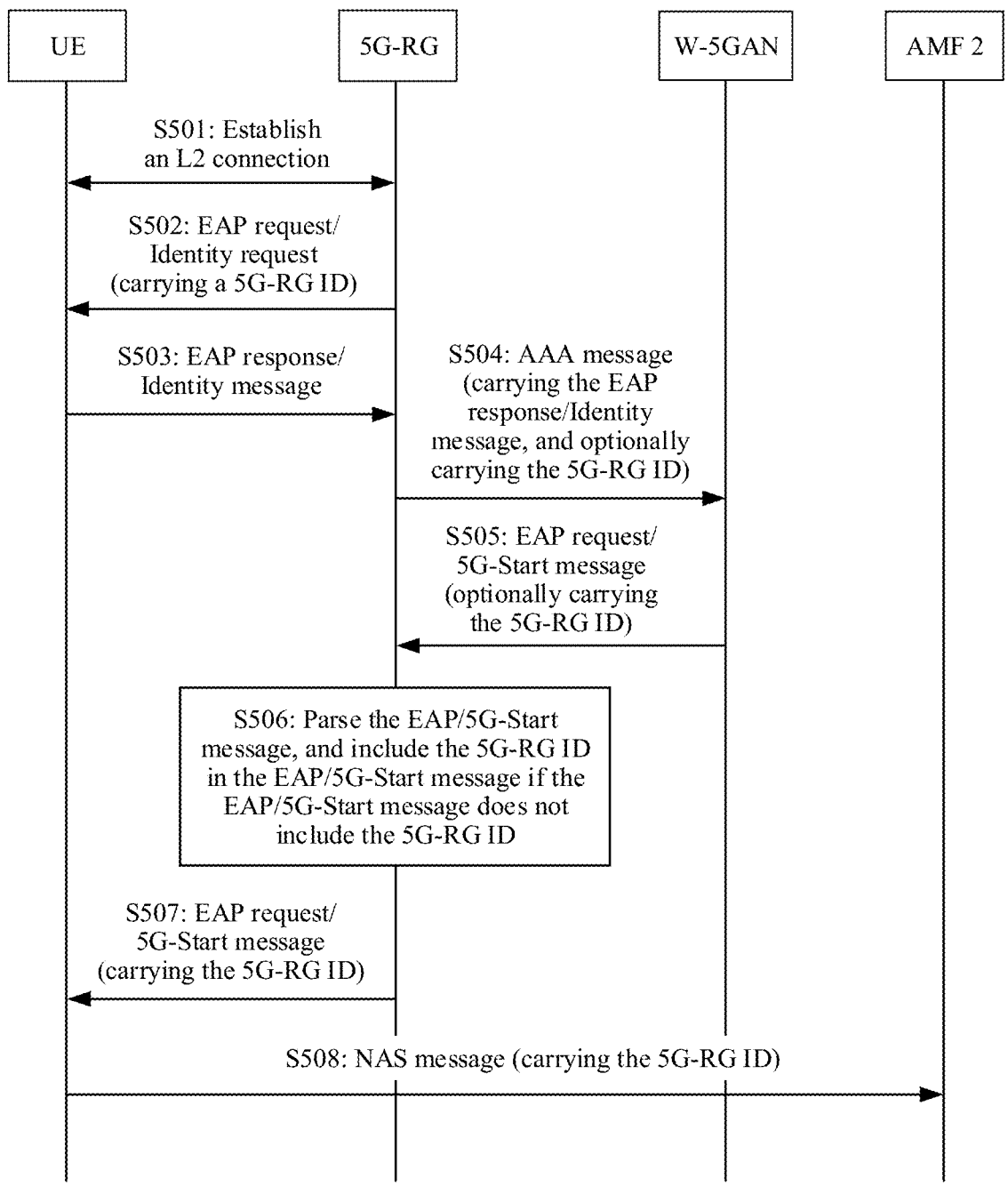
FIG. 11 is a schematic flowchart of a method for obtaining identification information of a residential gateway by a network side device according to this application.

As shown in FIG. 11, a specific procedure in which a network side obtains identification information of a 5G-RG may include the following steps.

S501: UE establishes a layer 2 (L2) connection to the 5G-RG.

S502: The 5G-RG sends an EAP request or an Identity request to the UE. Optionally, the EAP request or the Identity request may include the identification information of the 5G-RG, for example, a 5G-RG ID.

S503: After receiving the EAP request message or the Identity request message from the 5G-RG, the UE returns an EAP response message/Identity message to the 5G-RG.

S504: The 5G-RG sends, to a W-5GAN, an authentication, authorization, and accounting (AAA) message, for example, an authentication request message. The AAA message may carry an EAP message and is sent to the W-5GAN. Optionally, the AAA message may further carry the 5G-RG ID.

S505: The W-5GAN sends an EAP request/5G-Start message. The EAP request/5G-Start message may include the 5G-RG ID. The 5G-RG ID may be received in S504, for example, the 5G-GUTI of the 5G-RG, or the SUCI (subscribed encrypted identifier) of the 5G-RG. The 5G-RG ID may alternatively be another 5G-RG identifier, for example, a 5G-RG N2 interface identifier.

S506 and S507: The 5G-RG forwards the EAP request/5G-Start message to the UE. Optionally, as shown in S506, the 5G-RG may parse the EAP request/5G-Start message. If the EAP request/5G-Start message does not include the 5G-RG ID, the 5G-RG may add the 5G-RG ID into the EAP request/5G-Start message.

S508: The UE receives the EAP-Req/5G-Start message, obtains the 5G-RG ID from the message, and sends a NAS message, where the NAS message carries the 5G-RG ID. The 5G-RG ID is used by an AMF to search for context information of the 5G-RG, to obtain a 5G-RG permanent identifier (namely, a 5G-RG SUPI).

Optionally, the NAS message may further carry a host UE indication. The host UE indication indicates that the UE requests to access a core network as a host UE (namely, a subscriber). In this way, the core network may trigger, based on the host UE indication, a procedure for determining an access typeaccess type of the UE. For details, refer to Embodiment 1 to Embodiment 3. Optionally, the 5G-RG ID may be used as the host UE indication. In other words, the 5G-RG ID indicates that the UE requests to access the core network as host UE. The AMF determines, based on the host UE indication or based on 5G-RG ID information included in the NAS message, that the UE requests to access the core network as host UE. The network side determines, based on the solutions in the foregoing embodiments, whether the UE is host UE. If the UE requests access as a host, but the UE is not host UE, the AMF rejects the access request of the UE. In addition, the 5G-RG ID may also be used to indicate that the UE accesses the core network through the 5G-RG. The AMF determines, based on the 5G-RG ID information included in the NAS message, that the UE accesses the core network through the 5G-RG. When the UE accesses the core network through the 5G-RG, the AMF determines a device type of the UE. In other words, the AMF determines whether the UE is subscribed user equipment or non-subscribed user equipment.

The AMF searches for a context of the 5G-RG based on the 5G-RG ID. If the AMF does not store the context information of the 5G-RG, the AMF selects, based on the 5G-RG ID, another AMF (a target AMF) that stores the context of the 5G-RG. Specifically, the AMF sends a request message to the target AMF, where the request message includes the 5G-RG ID and a permanent identifier request indication (for example, a requested SUPI). The target AMF searches for the context of the 5G-RG based on the 5G-RG ID and returns the 5G-RG permanent identifier to the AMF.

In Embodiment 1 to Embodiment 3, a procedure executed by the AMF may alternatively be executed by an SMF. In other words, the AMF in Embodiment 1 to Embodiment 3 may be replaced with the SMF. Alternatively, the AMF may notify the SMF of the host UE indication. Specifically, the AMF 2 may send the host UE indication or a guest UE indication to a PCF or the SMF, and the PCF delivers a QoS policy based on the host UE indication or the guest UE indication.

If the AMF 2 sends the host UE indication or the guest UE indication to the SMF, the SMF reports the host UE indication or the guest UE indication to the PCF, and the PCF delivers different QoS policies based on the host UE indication or the guest UE indication. For example, for the host UE, the PCF allocates a high-priority parameter in the QoS policy. For example, for a QoS parameter, it is set that a resource is not allowed to be preempted or a resource of another user can be preempted. For guest UE, the PCF allocates a low-priority parameter in the QoS policy. For example, for a QoS parameter, it is set that a resource is allowed to be preempted or a resource of another user cannot be preempted.

In addition, when the 5G-RG ID is a SUCI, the AMF 2 may search, based on the SUCI, a UDM that stores subscription data of the 5G-RG, and sends a request message to the UDM. The message includes the 5G-RG SUCI and a UE identifier. The UDM searches for the subscription data of the 5G-RG based on the 5G-RG SUCI, and determines the device type of the UE based on the subscription data. This is the same as that in the foregoing embodiments. The UDM sends a response message to the AMF 2. In addition to the parameter described in the foregoing embodiments, the response message further includes an identifier of an AMF 1 to which the 5G-RG attaches, that is, an identifier of an AMF 1 serving the 5G-RG. The AMF 2 stores the 5G-RG ID and the identifier of the AMF 1.

Figure 12:
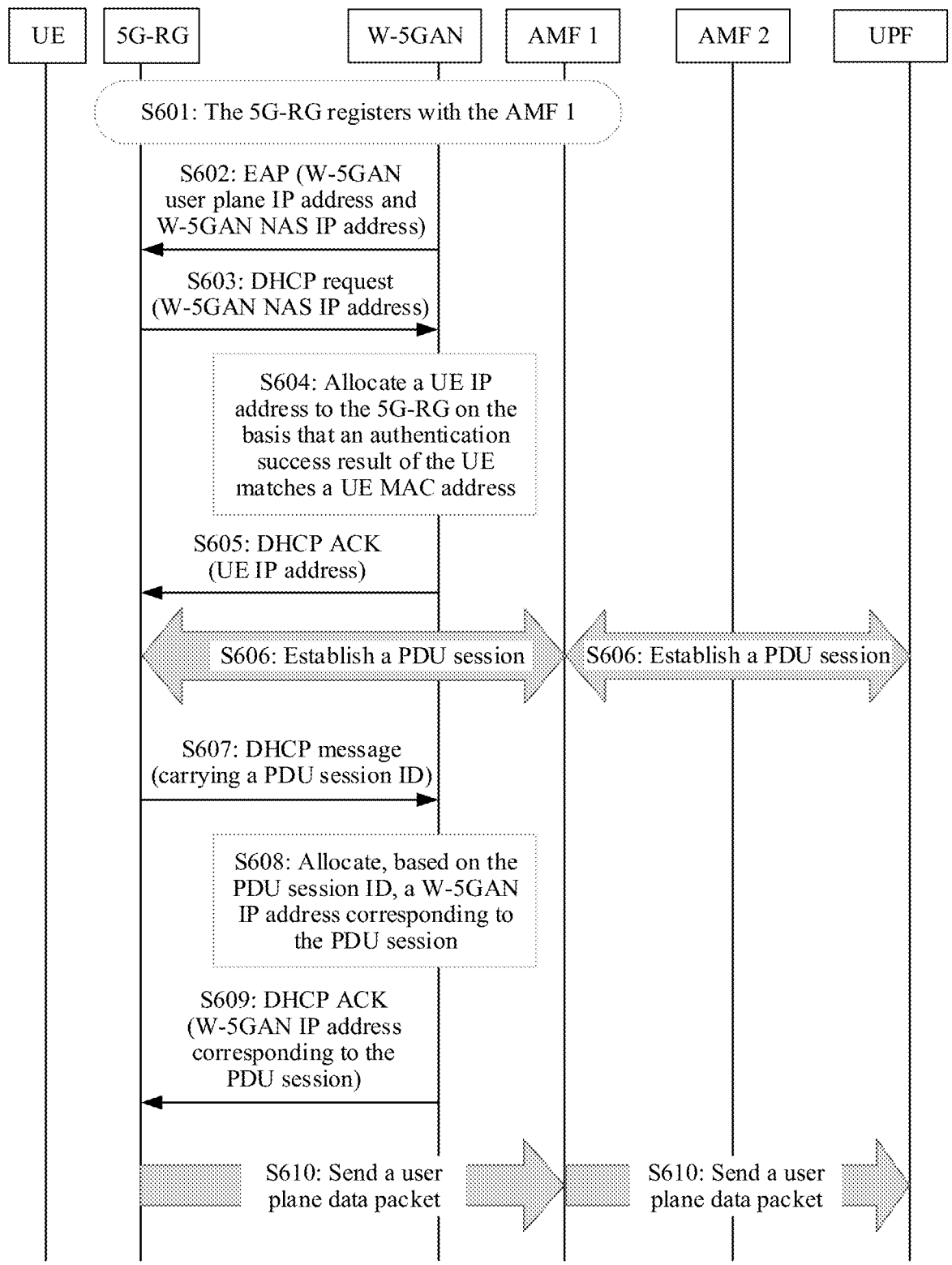
FIG. 12 is a schematic flowchart of still yet another network access method according to this application.

Before the network side performs the procedure for determining the access typeaccess type of the UE, a terminal device (the UE or the 5G-RG) further needs to register with a network, and obtains an access network side parameter related to a PDU session. A related technical solution is described below by using the 5G-RG as an example (the UE relates to a same procedure, and details are not described). As shown in FIG. 12, the procedure specifically includes the following steps.

S601: The 5G-RG registers with an AMF 1. The AMF 1 serves the 5G-RG.

S602: After learning that authentication of the 5G-RG succeeds (for example, a W-5GAN obtains an authentication success indication from an N2 interface, where the indication may be a security key), the W-5GAN may assign NAS IP address information corresponding to the 5G-RG. The W-5GAN may further assign a user plane address corresponding to the 5G-RG, for example, a user plane IP address. Then, the W-5GAN may send a message (for example, an EAP message) to the 5G-RG, where the message may carry the NAS IP address information corresponding to the 5G-RG. Optionally, the message may further include user plane address information corresponding to the 5G-RG.

The NAS IP address information corresponding to the 5G-RG is used for a NAS message subsequently from the 5G-RG. The user plane address information corresponding to the 5G-RG is used for a user plane data packet subsequently from the 5G-RG. When the 5G-RG encapsulates the user plane data packet, the 5G-RG adds an IP header, and sets a destination address in the newly added IP header to the user plane IP address corresponding to the 5G-RG.

Optionally, the W-5GAN may assign a UE IP address to the 5G-RG. The message (for example, the EAP message) may further carry the UE IP address assigned to the 5G-RG.

S603: The 5G-RG sends a request message to the W-5GAN, where the request message may be a DHCP discover message, a DHCP request message, or the like, and is used to request the W-5GAN to assign the UE IP address to the 5G-RG. The request message may carry identification information of the UE, for example, a network access identity (NAI) of the UE, a UE MAC address, or the UE IP address (which may be obtained from S602).

Optionally, the request message may carry the NAS IP address corresponding to the 5G-RG and/or the user plane IP address corresponding to the 5G-RG. Optionally, the request message may further carry at least one of a NAS indication or a user plane indication. The NAS indication is used to indicate that an address carried in the message is the NAS IP address, and the user plane indication is used to indicate that an address carried in the message is the user plane IP address.

S604: The W-5GAN assigns the UE IP address to the 5G-RG based on identification information of the 5G-RG.

Specifically, the W-5GAN may obtain the identification information of the 5G-RG from a header of the DHCP message sent in S603, and search for a context of the UE based on the identification information of the 5G-RG, where the context of the UE includes indication information indicating that the authentication of the 5G-RG succeeds. The W-5GAN assigns the UE IP address to the 5G-RG of which the authentication succeeds. If the UE IP address has been assigned to the 5G-RG in S602, the W-5GAN may assign a same or different UE IP address in this step.

S605: The W-5GAN sends a response message (an EAP message or a DHCP ACK message) to the 5G-RG, where the response message carries the UE IP address assigned by the W-5GAN to the 5G-RG.

S606: The 5G-RG initiates a NAS message, for example, a PDU session establishment request message. The UE IP address assigned by the W-5GAN to the 5G-RG is used as a source address for encapsulating the NAS message, and the NAS IP address that is assigned by the W-5GAN and that corresponds to the 5G-RG is used as a destination address for encapsulating the NAS message.

In this way, the W-5GAN may identify, based on the NAS IP address in an IP header, that an IP data packet carries the NAS message, and forward the NAS message to an AMF through an N2 interface. Then, the AMF may process the NAS message, and complete a PDU session establishment procedure of the 5G-RG based on an existing procedure. In this procedure, the AMF sends identification information (such as a PDU session ID) of a PDU session to the W-5GAN through the N2 interface. In this way, the W-5GAN can obtain the PDU session ID of the PDU session.

S607: After the 5G-RG receives a PDU session establishment accept message, the 5G-RG initiates a request message to the W-5GAN, where the request message may be a DHCP request message or a DHCP information message. The request message may carry the identification information (for example, the PDU session ID) of the PDU session. The request message is used to request the W-5GAN to assign a W-5GAN IP address corresponding to the PDU session.

S608: After receiving the request message from the 5G-RG, the W-5GAN may assign, based on the PDU session ID in the request message, the W-5GAN IP address corresponding to the PDU session, and store a correspondence between the W-5GAN IP address and the PDU session ID. The W-5GAN IP address corresponding to the PDU session is address information that is of the W-5GAN and that corresponds to the PDU session.

Optionally, the W-5GAN IP address corresponding to the PDU session may be used as identification information of the PDU session, and may be used by a user plane to establish a correspondence between a session resource allocated by the W-5GAN to the PDU session and the PDU session.

S609: The W-5GAN sends a response message (such as a DHCP ACK message) to the 5G-RG, where the response message may carry the address information that is of the W-5GAN and that corresponds to the PDU session. Optionally, the response message may further carry the PDU session ID corresponding to the W-5GAN IP address.

The address information that is of the W-5GAN and that corresponds to the PDU session is used as a destination IP address of a user plane data packet that is of the PDU session and that is from the 5G-RG.

S610: The 5G-RG sends the user plane data packet. Specific implementation is detailed subsequently.

It can be learned from the foregoing steps that a destination address required for sending a user plane data packet by the terminal device (the 5G-RG or the UE) may exist in two forms: the user plane address information (which is obtained in S602) corresponding to the terminal device, and the address information (which is obtained in S607 and S608) that is of the W-5GAN and that corresponds to the PDU session. The address information that is of the W-5GAN and that corresponds to the PDU session is an address at a smaller granularity, and can directly indicate a specific PDU session to which the user plane data packet belongs.

The following separately describes, based on the two forms of the destination address, manners used by the 5G-RG to send the user plane data packet.

(1) Manner 1: A generic routing encapsulation (GRE) header is encapsulated outside the user plane data packet, and an IP header is encapsulated outside the GRE header. The GRE header may carry QoS flow identifier (QFI) information/reflective QoS indication (RQI). A source address in the IP header is the UE IP address, and a destination address in the IP header is the address information that is of the W-5GAN and that corresponds to the PDU session.

After the W-5GAN receives the user plane data packet that is of the PDU session and that is from the 5G-RG, the W-5GAN may identify the PDU session based on the address information that is of the W-5GAN and that corresponds to the PDU session, and sends, after removing the GRE header and the IP header, the user plane data packet of the PDU session through a tunnel corresponding to the identified PDU session.

The address information that is of the W-5GAN and that corresponds to the PDU session, as mentioned in Manner 1, is obtained in S607 and S608.

(2) Manner 2: A GRE header is encapsulated outside the user plane data packet, and an IP header is encapsulated outside the GRE header. The GRE header may carry QoS flow identifier (QFI) information/(RQI). The GRE header carries the PDU session ID. A source address in the IP header is the UE IP address, and a destination address in the IP header is the user plane address information.

After the W-5GAN receives the user plane data packet from the 5G-RG, the W-5GAN may identify the PDU session based on the PDU session ID, and sends, after removing the GRE header and the IP header, the user plane data packet of the PDU session through a tunnel corresponding to the PDU session ID.

The user plane address information mentioned in Manner 2 is obtained in S602.

After the network side executes the procedure for determining the access type of the UE, the core network further needs to deliver a service management policy specific to the UE, for example, a QoS policy or a local resource control policy. This details how the network side implements different QoS control and local service control based on host UE/guest UE. The following describes a related technical solution with reference to FIG. 13.

S701: After a 5G-RG registers with an AMF 2 according to the embodiment shown in FIG. 12, and the AMF 2 determines an access type of UE according to Embodiment 1 to Embodiment 3, the AMF 2 may send, to a PCF, a first message such as a policy association setup/modify message. The first message may include device classification indication information of the UE. Host UE/guest UE indication information is not limited thereto. The device classification indication information may further include device type indication information. A manner based on which device classification is performed is not limited in this application. The first message may be used to request the PCF to deliver a service management policy specific to the UE. The service management policy may include at least one of a QoS policy or a local resource control policy.

Optionally, the AMF 2 may further send the device classification indication information of the UE to an SMF, and the SMF sends, to the PCF, the first message that carries the device classification indication information.

S702: The PCF sends a second message to the AMF 2 or the SMF, where the second message may include a service management policy that is specific to the UE and that is determined by the PCF based on a device classification of the UE. In other words, after receiving the first message from the AMF or the SMF, the PCF may send the second message to the SMF or the AMF.

S703 to S707: The AMF 2 completes a registration procedure of the UE. For UE of which authentication succeeds, a W-5GAN assigns a NAS IP address and an optional user plane IP address. For details, refer to S602 in the embodiment shown in FIG. 12.

S708: The AMF 2 sends the device classification indication information (for example, the host UE/guest UE indication information) of the UE and identification information of the UE to an AMF 1. The identification information of the UE may be at least one of a UE MAC address, a UE 5G GUTI, a UE SUPI, or other identification information.

Optionally, the AMF 2 may send the identification information of the UE to the AMF 1. The AMF 1 may determine a classification of the UE, for example, determine whether the UE is host UE or guest UE.

S709: According to the service control policy obtained from the PCF in S701 and S702, the AMF 1 may deliver the service management policy, for example, the QoS policy or the local resource control policy, specific to the UE to the 5G-RG based on the device classification indication information (for example, the host UE/guest UE indication information) of the UE. Specifically, the AMF 1 may deliver the service management policy specific to the UE by sending a UE configuration update message, a NAS notification message, or the like. The UE configuration update message or the NAS notification message may carry the identification information of the UE and the device classification indication information of the UE.

Optionally, the local resource control policy may include a local device list, for example, a local device MAC address list or a local device IP address list. A local device may allow access of only host UE. The local device may be a device such as a local printer.

Correspondingly, after receiving the UE configuration update message or the NAS notification message from the AMF 1, the 5G-RG may store the identification information of the UE and the device classification indication information (the host UE/guest UE indication information) of the UE. Optionally, the 5G-RG may further store, in a corresponding manner, the identification information of the UE and a service policy delivered by a network side.

In some optional embodiments, the 5G-RG may control access of the UE according to the local resource control policy. A specific procedure may include: The 5G-RG may receive the identification information of the UE and the device classification indication information of the UE that are from the AMF, then obtain the local resource access policy, and finally control access of the UE to a local resource based on the device classification indication information of the UE and the local resource access policy.

Optionally, the 5G-RG may receive the local resource access policy of the 5G-RG that is from the AMF or the SMF.

Optionally, if the AMF does not send the UE resource control policy specific to the UE, the 5G-RG may configure the local resource control policy. The local resource control policy may include a local device MAC address list or a local device IP address list. A local device may allow access of only host UE. The local device may be a device such as a local printer.

Subsequently, the UE initiates a local service. In other words, the UE initiates a request to the 5G-RG, where the request carries the identification information. The 5G-RG may identify the UE based on the identification information, and determine a classification of the UE (for example, determine whether the UE is host UE) based on the stored identification information of the UE and the stored device classification indication information (for example, the host UE/guest UE indication information) of the UE. Optionally, if the UE is host UE, a connection between the UE and the local device may be established. Optionally, the 5G-RG may also reply to the UE with a MAC address or an IP address of the local device.

S710: The UE initiates a PDU session to the core network, and allocates a corresponding PDU session ID. After the PDU session is successfully established, the UE may send a request message to the W-5GAN, to request to obtain a W-5GAN IP address that corresponds to the PDU session and that is allocated by the W-5GAN. For details, refer to S607 to S609 in the embodiment in FIG. 12. Details are not described herein again.

Figure 6:
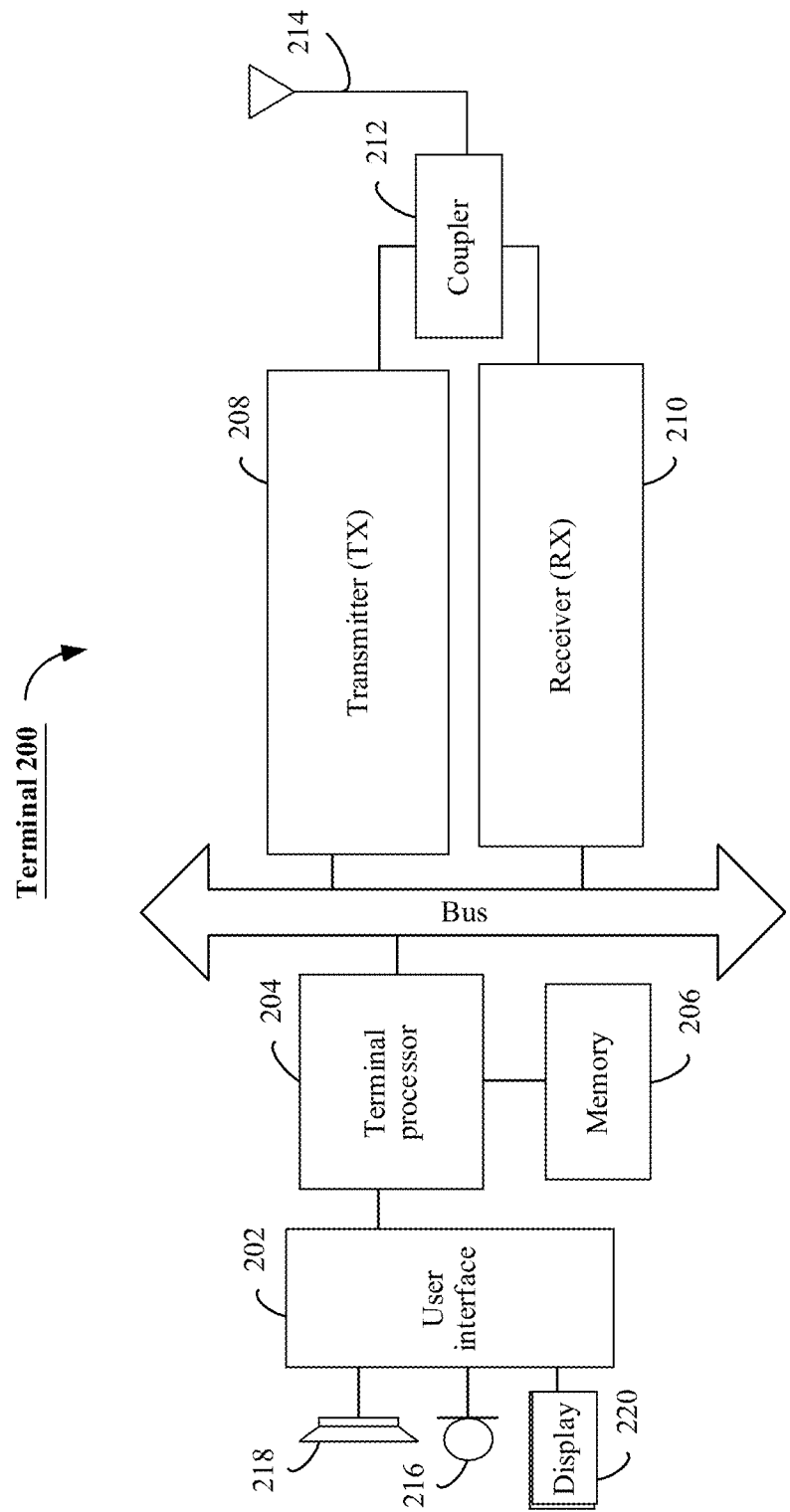
FIG. 6 is a schematic architectural diagram of user equipment according to an embodiment of this application.

FIG. 6 shows a terminal 200 provided in some embodiments of this application. As shown in FIG. 6, the terminal 200 may include an input/output module (including an audio input/output module 218, a key input module 216, a display 220, or the like), a user interface 202, one or more terminal processors 204, a transmitter 208, a receiver 210, a coupler 212, an antenna 214, and a memory 206. These components may be connected through a bus or in another manner. In FIG. 6, an example in which the components are connected through the bus is used. A communications interface 201 may be configured for communication between the terminal 200 and another communications device, for example, a base station.

Figure 8:
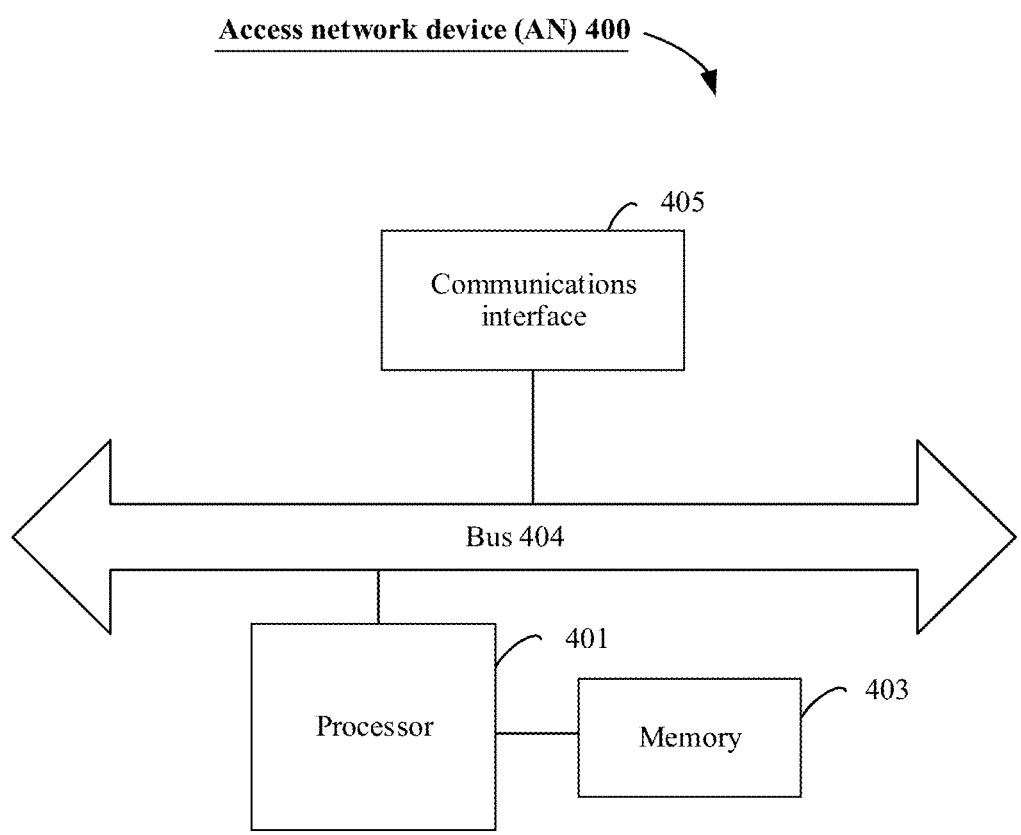
FIG. 8 is a schematic architectural diagram of an access network device according to an embodiment of this application.

Specifically, the base station may be a network device 400 shown in FIG. 8. The communications interface 201 is an interface, such as an X1 interface in LTE, between the terminal processor 204 and a transceiver system (including the transmitter 208 and the receiver 210). In specific implementation, the communications interface 201 may include one or more of a global system for mobile communications (GSM) (2G) communications interface, a wideband code division multiple access WCDMA (3G) communications interface, a long term evolution (LTE) (4G) communications interface, and the like. Alternatively, the communications interface 201 may be a 4.5G, 5G, or future new radio communications interface. A wireless communications interface is not limited thereto. The terminal 200 may be further configured with a wired communications interface 201, for example, a local access network (LAN) interface.

The antenna 214 may be configured to convert electromagnetic energy in a transmission line into an electromagnetic wave in free space, or convert an electromagnetic wave in free space into electromagnetic energy in a transmission line. The coupler 212 is configured to split a mobile communication signal received by the antenna 214 into a plurality of signals, and allocate the plurality of signals to a plurality of receivers 210.

The transmitter 208 may be configured to perform transmission processing on a signal output by the terminal processor 204, for example, modulate the signal onto a licensed or unlicensed frequency band. The receiver 210 may be configured to perform reception processing on a mobile communication signal received by the antenna 214. For example, the receiver 210 may demodulate a received signal that has been modulated onto an unlicensed or licensed frequency band. In some embodiments of this application, the transmitter 208 and the receiver 210 may be considered as a wireless modem. The terminal 200 may include one or more transmitters 208 and one or more receivers 210.

In addition to the transmitter 208 and the receiver 210 shown in FIG. 6, the terminal 200 may further include other communications components, for example, a GPS module, a Bluetooth module, and a wireless fidelity (Wi-Fi) module. The foregoing described wireless communication signal is not limited thereto. The terminal 200 may further support other wireless communication signals, for example, a satellite signal and a short-wave signal. Wireless communication is not limited thereto. The terminal 200 may be further configured with a wired network interface (for example, a LAN interface) to support wired communication.

The input/output module may be configured to implement interaction between the terminal 200 and a user/an external environment, and may mainly include the audio input/output module 218, the key input module 216, the display 220, or the like. In specific implementation, the input/output module may further include a camera, a touchscreen, a sensor, or the like. Each input/output module communicates with the terminal processor 204 through the user interface 202.

The memory 206 is coupled to the terminal processor 204, and is configured to store various software programs and/or a plurality of sets of instructions. In specific implementation, the memory 206 may include a high speed random access memory, or may include a nonvolatile memory, for example, one or more magnetic disk storage devices, a flash memory device, or another nonvolatile solid-state storage device. The memory 206 may store an operating system (which is briefly referred to as a system below), for example, an embedded operating system such as Android, iOS, Windows, or Linux. The memory 206 may further store a network communications program. The network communications program may be used to communicate with one or more additional devices, one or more terminal devices, and one or more network devices. The memory 206 may further store a user interface program. The user interface program may vividly display content of an application program in a graphical operating window, and receive, through an input control such as a menu, a dialog box, or a key, a control operation performed by a user on the application program.

In some embodiments of this application, the memory 206 may be configured to store a program for implementing, on the side of the terminal 200, the network access method provided in one or more embodiments of this application. For an implementation of the network access method provided in one or more embodiments of this application, refer to the following embodiments.

The terminal processor 204 may be configured to read and execute a computer-readable instruction. Specifically, the terminal processor 204 may be configured to: invoke a program stored in the memory 206, for example, a program for implementing, on the side of the terminal 200, the network access method provided in one or more embodiments of this application, and execute an instruction included in the program.

It may be understood that the terminal 200 may be the terminal 103 in the wireless communications system shown in FIG. 2A, FIG. 2B, and FIG. 2C, and may be implemented as a mobile device, a mobile station, a mobile unit, a radio unit, a remote unit, a user agent, a mobile client, or the like.

It should be noted that the terminal 200 shown in FIG. 6 is only an implementation of this application. In actual application, the terminal 200 may alternatively include more or fewer components, and this is not limited herein.

Figure 7:
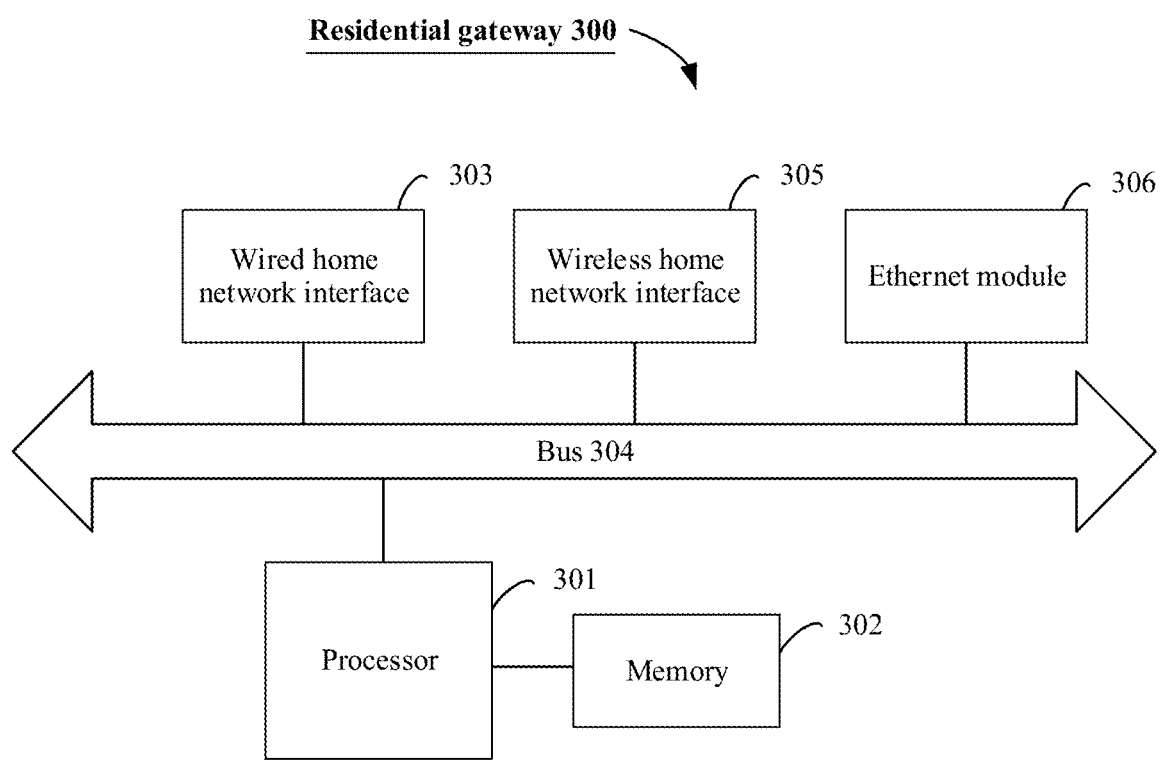
FIG. 7 is a schematic architectural diagram of a residential gateway according to an embodiment of this application.

FIG. 7 shows a residential gateway 300 provided in some embodiments of this application. As shown in FIG. 7, the residential gateway 300 may include: one or more processors 301, a memory 302, a wired home network interface 303, a wireless home network interface 305, and an Ethernet module 306. These components may be connected through a bus 304 or in another manner. In FIG. 7, an example in which the components are connected through the bus is used. The Ethernet module 306 implements a physical connection between the residential gateway and an external network, and a user may remotely access and control a home internal network through the internet.

A connection between the residential gateway and the internet may be implemented in a wired manner, or may be implemented based on mobile wireless communication.

Both the wireless home network interface 305 and the wired home network interface 303 are networking manners of the home internal network. A wired manner typically includes a twisted pair, a telephone line, a power line, or the like. A wireless manner includes IrDA, Bluetooth, IEEE802.11, ZigBee, UWB, or the like. A wireless connection is ideal for a home network. This can avoid re-cabling in the home.

The memory 302 is coupled to the processor 301, and is configured to store various software programs and/or a plurality of sets of instructions. Specifically, the memory 302 may include a flash chip and an SDRAM chip. The flash chip may be configured to store an embedded operating system in the residential gateway, a common gateway interface (CGI) gateway application program, a home network server, and a file system required for supporting various services. The memory 302 may store an operating system, for example, an embedded operating system such as uCOS, VxWorks, or RTLinux. The memory 302 may further store a network communications program. The network communications program may be used to communicate with one or more additional devices, one or more terminal devices, and one or more network devices.

Figure 13:
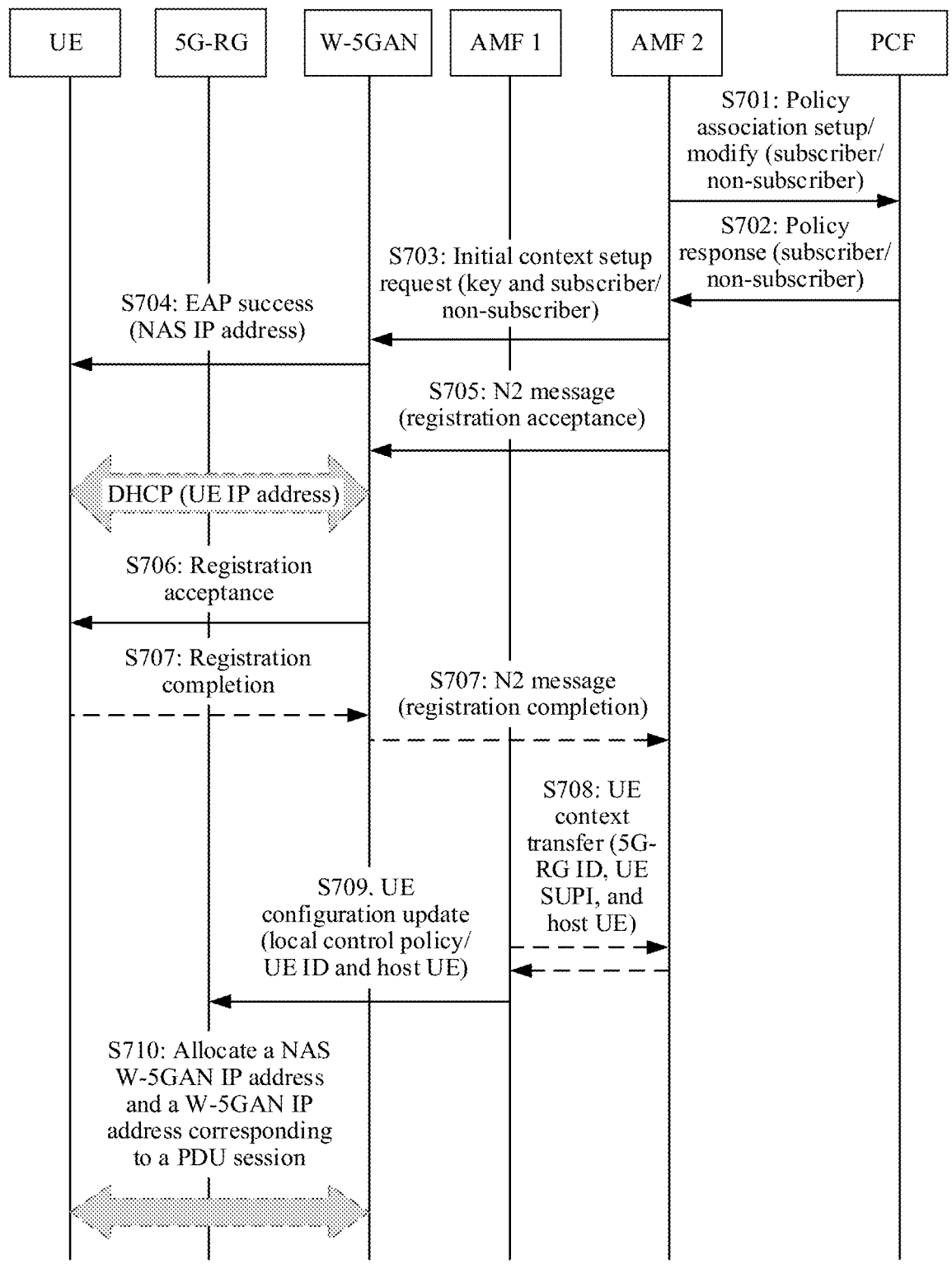
FIG. 13 is a schematic flowchart of a method for delivering a service management policy by a network side according to this application.

In some embodiments of this application, the memory 302 may be configured to store a program for implementing the network access method provided in one or more embodiments of this application and for implementing, on the side of the residential gateway 300, the technical solutions provided in the embodiments in FIG. 11 to FIG. 13 in this application. Refer to related embodiments for the network access method provided in the one or more embodiments of this application and implementation of the technical solutions provided in the embodiments in FIG. 11 to FIG. 13 in this application.

The processor 301 may be configured to read and execute a computer-readable instruction. Specifically, the processor 301 may be configured to: invoke a program stored in the memory 302, for example, the program for implementing the network access method provided in the one or more embodiments of this application and for implementing, on the side of the residential gateway 300, the technical solutions provided in the embodiments in FIG. 11 to FIG. 13 in this application; and execute an instruction included in the program.

It may be understood that the residential gateway 300 may be the 5G-RG in the communications system architectures shown in FIG. 1A to FIG. 1C. The residential gateway 300 shown in FIG. 7 is merely an implementation of the embodiments of this application. In actual application, the residential gateway 300 may alternatively include more or fewer components, and this is not limited herein.

FIG. 8 shows an access network device 400 provided in some embodiments of this application. As shown in FIG. 8, the access network device 400 may include one or more processors 401, a memory 403, and a communications interface 405. These components may be connected through a bus 404 or in another manner. In FIG. 8, an example in which the components are connected through the bus is used. The communications interface 405 may be configured for communication between the access network device 400 and another communications device, for example, a residential gateway or a core network device.

Figure 9:
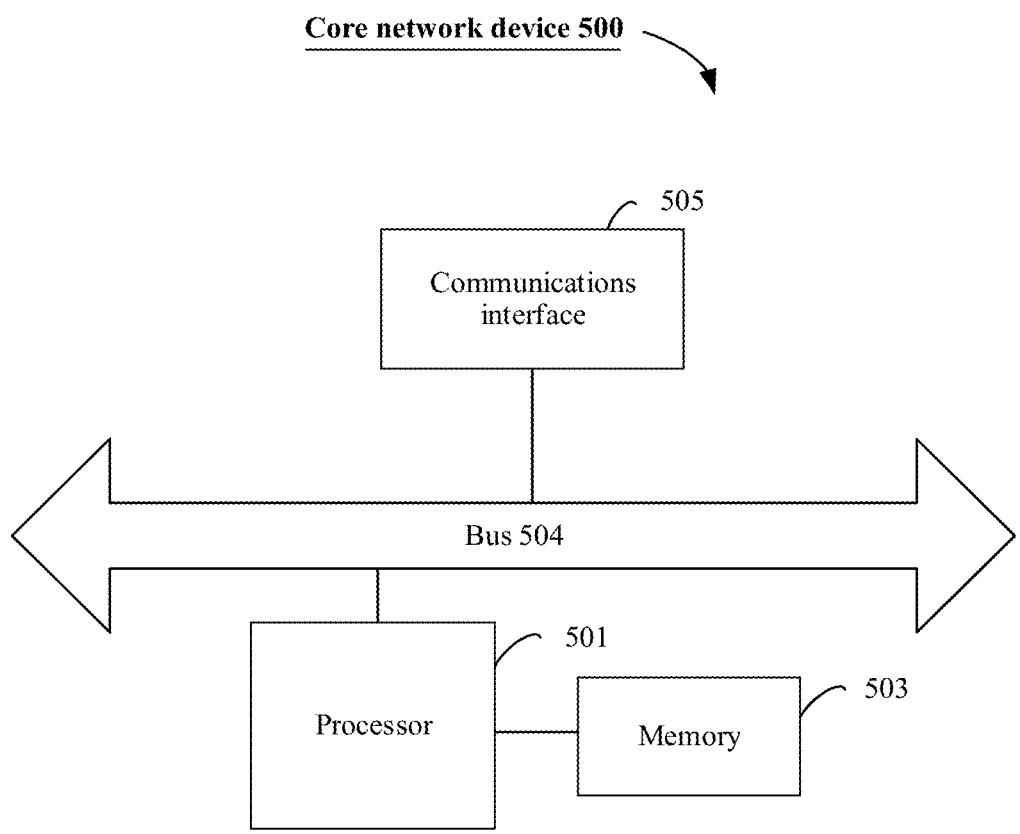
FIG. 9 is a schematic architectural diagram of a core network device according to an embodiment of this application.

Specifically, the residential gateway may be the residential gateway 300 shown in FIG. 7, and the core network device may be a core network device 500 shown in FIG. 9. Specifically, the communications interface 405 may include a wired communications interface such as a wide area network (WAN) interface or a local area network (LAN) interface. The wired communications interface is not limited thereto. In some possible embodiments, the communications interface 405 may further include a wireless communications interface such as a wireless local area network (WLAN) interface.

The memory 403 is coupled to the processor 401, and is configured to store various software programs and/or a plurality of sets of instructions. Specifically, the memory 403 may include a high speed random access memory, or may include a nonvolatile memory, for example, one or more disk storage devices, a flash memory device, or another nonvolatile solid-state storage device. The memory 403 may store an operating system (which is briefly referred to as a system below), for example, an embedded operating system such as uCOS, VxWorks, or RTLinux. The memory 403 may further store a network communications program. The network communications program may be used to communicate with one or more additional devices, one or more terminal devices, and one or more network devices.

In some embodiments of this application, the memory 403 may be configured to store a program for implementing the network access method provided in one or more embodiments of this application and for implementing, on the side of the access network device 400, the technical solutions provided in the embodiments in FIG. 11 to FIG. 13 in this application. Refer to related embodiments for the network access method provided in the one or more embodiments of this application and implementation of the technical solutions provided in the embodiments in FIG. 11 to FIG. 13 in this application.

The processor 401 may be configured to read and execute a computer-readable instruction. Specifically, the processor 401 may be configured to: invoke a program stored in the memory 405, for example, the program for implementing the network access method provided in the one or more embodiments of this application and for implementing, on the side of the access network device 400, the technical solutions provided in the embodiments in FIG. 11 to FIG. 13 in this application; and execute an instruction included in the program.

It may be understood that the access network device 400 may be the W-5GAN in the system architectures shown in FIG. 1A to FIG. 1C. The access network device 400 shown in FIG. 8 is merely an implementation of the embodiments of this application. In actual application, the access network device 400 may alternatively include more or fewer components, and this is not limited herein.

FIG. 9 shows a core network device 500 provided in some embodiments of this application. As shown in FIG. 9, the core network device 500 may include one or more processors 501, a memory 503, and a communications interface 505. These components may be connected through a bus 504 or in another manner. In FIG. 9, an example in which the components are connected through the bus is used. The communications interface 505 may be configured for communication between the core network device 500 and another communications device, for example, an access network device.

Specifically, the access network device may be the access network device 400 shown in FIG. 8. Specifically, the communications interface 505 may include a wired communications interface such as a wide area network (WAN) interface or a local area network (LAN) interface. The wired communications interface is not limited thereto. In some possible embodiments, the communications interface 505 may further include a wireless communications interface such as a wireless local area network (WLAN) interface.

The memory 503 is coupled to the processor 501, and is configured to store various software programs and/or a plurality of sets of instructions. Specifically, the memory 503 may include a high speed random access memory, or may include a nonvolatile memory, for example, one or more disk storage devices, a flash memory device, or another nonvolatile solid-state storage device. The memory 503 may store an operating system (which is briefly referred to as a system below), for example, an embedded operating system such as uCOS, VxWorks, or RTLinux. The memory 503 may further store a network communications program. The network communications program may be used to communicate with one or more additional devices, one or more terminal devices, and one or more network devices.

In some embodiments of this application, the memory 503 may be configured to store a program for implementing the network access method provided in one or more embodiments of this application and for implementing, on the side of the core network device 500, the technical solutions provided in the embodiments in FIG. 11 to FIG. 13 in this application. Refer to related embodiments for the network access method provided in the one or more embodiments of this application and implementation of the technical solutions provided in the embodiments in FIG. 11 to FIG. 13 in this application.

The processor 501 may be configured to read and execute a computer-readable instruction. Specifically, the processor 501 may be configured to: invoke a program stored in the memory 505, for example, the program for implementing the network access method provided in the one or more embodiments of this application and for implementing, on the side of the core network device 500, the technical solutions provided in the embodiments in FIG. 11 to FIG. 13 in this application; and execute an instruction included in the program.

It may be understood that the access network device 500 may be the core network device in the system architectures shown in FIG. 1A to FIG. 1C, and may be implemented as an AMF network element, a UDM network element, or the like. The core network device 500 shown in FIG. 9 is merely an implementation of the embodiments of this application. In actual application, the core network device 500 may alternatively include more or fewer components, and this is not limited herein.

Figure 10:
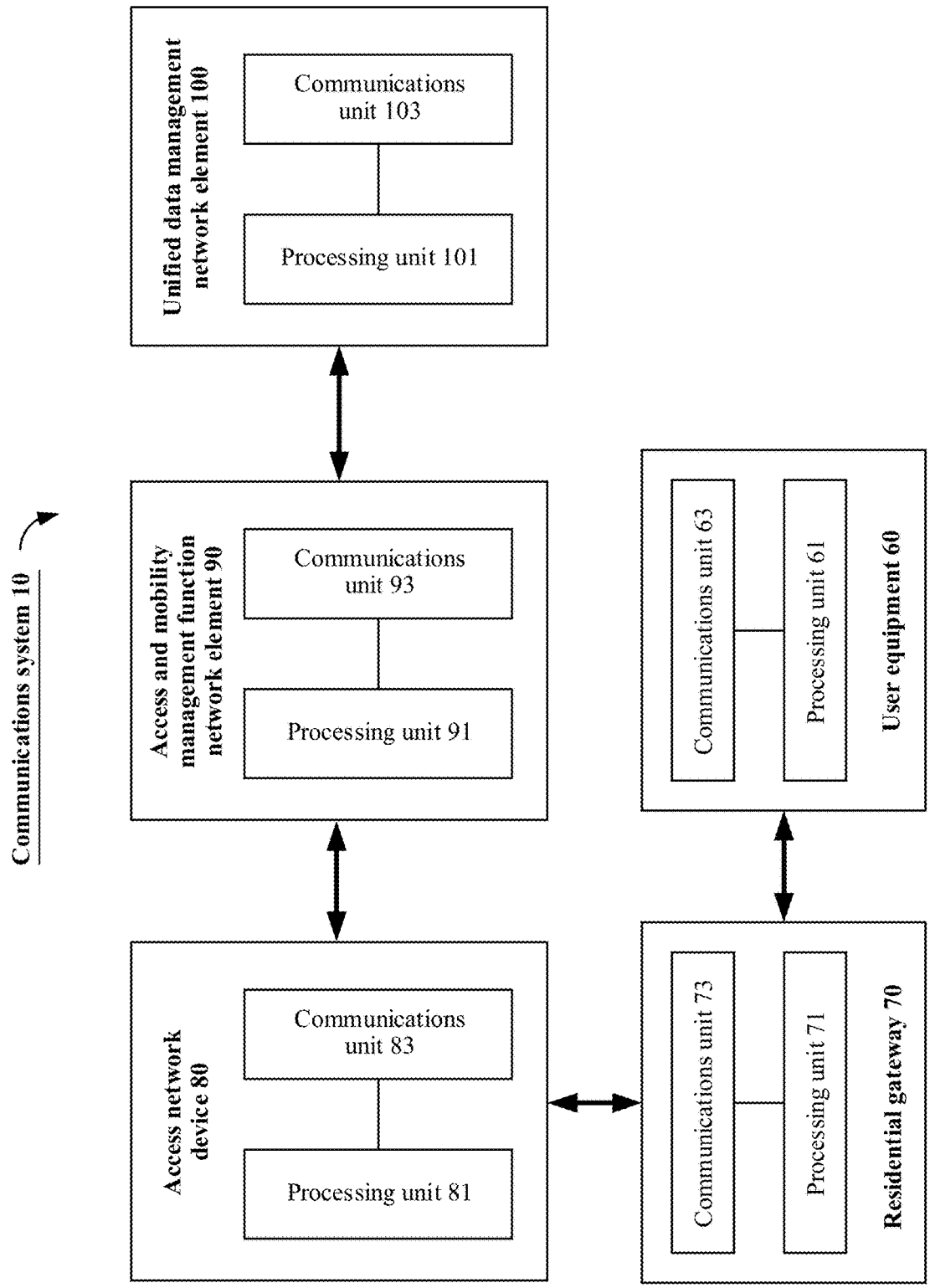
FIG. 10 is a functional block diagram of a communications system and a related apparatus according to this application.

FIG. 10 shows a communications system and communications apparatuses provided in this application. A communications system 10 may include the following communications apparatuses: user equipment 60, a residential gateway 70, an access network device 80, an access and mobility management network element 90, and a unified data management network element 100. The communications system 10 and the communications apparatuses in the communications system 10 may be configured to implement the network access methods described in the embodiments corresponding to FIG. 2A, FIG. 2B, and FIG. 2C to FIG. 4A, FIG. 4B, and FIG. 4C. Details are described below.

When the communications system 10 and the communications apparatuses in the communications system 10 may be configured to implement the network access methods described in the embodiments corresponding to FIG. 2A, FIG. 2B, and FIG. 2C, and FIG. 3A and FIG. 3B, specific implementation of the communications apparatuses may be as follows:

As shown in FIG. 10, the user equipment 60 may include a processing unit 61 and a communications unit 63. The processing unit 61 may be configured to: generate information to be from the user equipment 60 and parse information received by the user equipment 60.

The communications unit 63 may be configured to obtain temporary identifier information of the residential gateway 70 connected to the user equipment 60.

The communications unit 63 may be further configured to send a request message to the access network device 80, to request to access a core network. The request message may include the temporary identifier information of the residential gateway 70 and identification information of the user equipment 60.

In some optional embodiments, the communications unit 63 may be configured to receive the temporary identifier information of the residential gateway 70 from the residential gateway 70. Specifically, after establishing a connection to the residential gateway 70, the communications unit 63 may obtain the temporary identifier information of the residential gateway 70 through query according to an access network query protocol (ANQP). Specifically, the communications unit 63 may receive an ANQP message or an EAP message from the residential gateway 70, where these messages include a temporary identifier of the residential gateway 70. Alternatively, the communications unit 63 may obtain the temporary identifier information of the 5G-RG through an EAP message. Specifically, the 5G-RG includes the temporary identifier of the 5G-RG in the EAP message sent to the UE. The EAP message may be an EAP-Request/Identity message or an EAP-Request/5G-Start message.

It may be understood that for specific implementation of functional units of the user equipment 60, refer to the method embodiments corresponding to FIG. 2A, FIG. 2B, and FIG. 2C, and FIG. 3A and FIG. 3B. Details are not described herein again.

As shown in FIG. 10, the residential gateway 70 may include a processing unit 71 and a communications unit 73. The processing unit 71 may be configured to: generate information to be from the residential gateway 70 and parse information received by the residential gateway 70.

The communications unit 73 may be configured to send the temporary identifier information of the residential gateway 70 to the access network device 80.

Specifically, the temporary identifier information of the residential gateway 70 may be used as an index for obtaining, on a core network side, a context of the residential gateway 70. The temporary identifier of the residential gateway 70 may include a GUTI. A manner in which the communications unit 73 sends the temporary identifier information of the residential gateway 70 is not limited in this application. For example, the communications unit 73 may send a PPPoE message or another control plane message, where the message may carry the temporary identifier information of the residential gateway 70. Optionally, the message may further carry an IP address of the UE.

It may be understood that for specific implementation of functional units of the residential gateway 70, refer to the method embodiments corresponding to FIG. 2A, FIG. 2B, and FIG. 2C, and FIG. 3A and FIG. 3B. Details are not described herein again.

As shown in FIG. 10, the access network device 80 may include a processing unit 81 and a communications unit 83. The processing unit 81 may be configured to: generate information to be from the access network device 80 and parse information received by the access network device 80.

The communications unit 83 may be configured to obtain the temporary identifier information of the residential gateway 70 connected to the user equipment 60.

The communications unit 83 may be further configured to send a message to the access and mobility management function network element 90, where the message includes the temporary identifier information of the residential gateway 70 and the identification information of the user equipment 60. The identification information of the user equipment 60 is from the user equipment 60.

In some optional embodiments, to obtain the temporary identifier information of the residential gateway 70, the communications unit 83 may be specifically configured to receive the temporary identifier information from the user equipment 60 or from the residential gateway 70.

In some optional embodiments, to obtain the temporary identifier information of the residential gateway 70, the processing unit 81 may be specifically configured to identify the temporary identifier information based on the IP address of the user equipment 60, an identity of a line connected to a fixed network gateway, a VLAN identifier, or identification information of an access point of the user equipment 60.

It may be understood that for specific implementation of functional units of the access network device 80, refer to the method embodiments corresponding to FIG. 2A, FIG. 2B, and FIG. 2C, and FIG. 3A and FIG. 3B. Details are not described herein again.

As shown in FIG. 10, the access and mobility management network element 90 may include a processing unit 91 and a communications unit 93. The communications unit 93 may be configured to send a request message to the unified data management network element 100, where the request message includes the identification information of the user equipment 60 and identification information of the residential gateway 70 connected to the user equipment 60.

The communications unit 93 may be further configured to receive indication information that is of a subscription type of the user equipment 60 and that is from the unified data management network element 100.

The processing unit 91 may be configured to determine, based on the subscription type of the user equipment 60, whether the user equipment 60 is allowed to access the residential gateway 70, and/or a service management policy of the user equipment 60.

In some optional embodiments, the processing unit 91 may be specifically configured to: if the subscription type of the user equipment 60 indicates a subscriber of the residential gateway 70, determine that the user equipment 60 is allowed to access the residential gateway 70.

In some optional embodiments, the processing unit 91 may be specifically configured to: if the subscription type indicates a non-subscriber, determine that the service management policy of the user equipment 60 is a service management policy corresponding to the non-subscriber; or if the subscription type indicates the subscriber, determine that the service management policy of the user equipment 60 is a service management policy corresponding to the subscriber.

In some optional embodiments, the communications unit 93 may be further configured to: receive indication information of the service management policy of the user equipment 60 and/or access indication information that are/is from the unified data management network element 100, where the access indication information indicates whether the user equipment 60 is allowed to access the residential gateway 70. In this way, the access and mobility management network element 90 may notify the UE whether access is allowed and notify the UE of a specific subscription type.

In some optional embodiments, the communications unit 93 may be further configured to receive subscription data of the residential gateway 70 from the unified data management network element 100. The processing unit 91 may be further configured to determine, based on the subscription data of the residential gateway 70 and the identification information of the user equipment 60, whether the user equipment 60 is allowed to access the residential gateway 70. A manner in which the access and mobility management network element 90 determines the subscription type of the user equipment 60 and whether the user equipment 60 is allowed to access the residential gateway 70 is the same as that used by the unified data management network element 100.

In some optional embodiments, the communications unit 93 may be further configured to send the indication information of the service management policy of the user equipment 60 and/or the access indication information to the access network device 80 or the residential gateway 70, where the access indication information indicates whether the user equipment 60 is allowed to access the residential gateway 70.

In this application, the identification information of the residential gateway 70 carried in the request message from the communications unit 93 to the unified data management network element 100 is permanent identifier information.

The communications unit 93 may be specifically configured to: obtain the temporary identifier information of the residential gateway 70, and obtain the permanent identifier information from the context of the residential gateway 70 based on the temporary identifier information.

To obtain the temporary identifier information of the residential gateway 70, specific implementation of the communications unit 93 may include but is not limited to: The communications unit 93 may be specifically configured to obtain the temporary identifier information from NAS signaling from the user equipment 60, or obtain the temporary identifier information from signaling from the access network device 80 accessed by the residential gateway 70. The temporary identifier information included in the signaling from the access network device 80 is from the residential gateway 70 to the access network device 80. Alternatively, the temporary identifier information included in the signaling from the access network device 80 is identified by the access network device 80 based on the IP address of the user equipment 60, the identity of the line connected to the fixed network gateway, the VLAN identifier, or an access point identifier of the user equipment 60.

It may be understood that for specific implementation of functional units of the access and mobility management network element 90, refer to the method embodiments corresponding to FIG. 2A, FIG. 2B, and FIG. 2C, and FIG. 3A and FIG. 3B. Details are not described herein.

As shown in FIG. 10, the unified data management network element 100 may include a processing unit 101 and a communications unit 103. The communications unit 103 may be configured to receive the request message from the access and mobility management function network element 90, where the request message includes the identification information of the user equipment 60 and the identification information of the residential gateway 70 connected to the user equipment 60.

The processing unit 101 may be configured to determine the subscription data of the residential gateway 70 based on the identification information of the residential gateway 70.

The processing unit 101 may be further configured to determine the subscription type of the user equipment 60 based on the subscription data of the residential gateway 70 and the identification information of the user equipment 60.

The communications unit 103 may be further configured to send the indication information of the subscription type to the access and mobility management function network element, where the subscription type indicates a subscriber or a non-subscriber of the residential gateway 70.

In some optional embodiments, the subscription data of the residential gateway 70 may include the identification information of the user equipment 60 that is a subscriber of the residential gateway 70. In this case, the processing unit 101 is specifically configured to: if the identification information of the user equipment 60 belongs to the identification information of the user equipment 60 that is a subscriber of the residential gateway 70, determine that the user equipment 60 is a subscriber of the residential gateway 70.

Further, the subscription data of the residential gateway 70 may include a type of access to the residential gateway 70, where the type of access indicates whether the residential gateway 70 allows access of a non-subscriber.

The processing unit 101 may be further configured to determine whether the user equipment 60 is allowed to access the residential gateway 70. Details may be as follows:

The processing unit 101 may be specifically configured to: if the identification information of the user equipment 60 belongs to the identification information of the user equipment 60 that is a subscriber of the residential gateway 70, determine that the user equipment 60 is allowed to access the residential gateway 70.

The processing unit 101 may be specifically configured to: if the identification information of the user equipment 60 does not belong to the identification information of the user equipment 60 that is a subscriber of the residential gateway 70 but the type of access to the residential gateway 70 indicates that the residential gateway 70 allows access of a non-subscriber, determine that the user equipment 60 is allowed to access the residential gateway 70.

The processing unit 101 may be specifically configured to: if the identification information of the user equipment 60 does not belong to the identification information of the user equipment 60 that is a subscriber of the residential gateway 70 and the type of access to the residential gateway 70 indicates that the residential gateway 70 does not allow access of a non-subscriber, determine that the user equipment 60 is not allowed to access the residential gateway 70.

In some optional embodiments, when the processing unit 101 has determined whether the user equipment 60 is allowed to access the residential gateway 70, the communications unit 103 may be further configured to send access indication information, where the access indication information indicates whether the user equipment 60 is allowed to access the residential gateway 70.

In some optional embodiments, the communications unit 103 may be further configured to send the subscription data to the access and mobility management function network element. In this way, the access and mobility management function network element may also determine, based on the subscription data of the residential gateway 70, the subscription type of the UE and whether the UE is allowed to access the residential gateway 70.

It may be understood that for specific implementation of functional units of the unified data management network element 100, refer to the method embodiments corresponding to FIG. 2A, FIG. 2B, and FIG. 2C, and FIG. 3A and FIG. 3B. Details are not described herein.

Refer to the foregoing content for specific implementation of the user equipment 60, the residential gateway 70, and the access network device 80 when the communications system 10 and the communications apparatuses in the communications system 10 may be configured to implement the network access method described in the embodiment in FIG. 4A, FIG. 4B, and FIG. 4C. The access and mobility management network element 90 determines a subscription type of the UE and whether the UE is allowed to access the residential gateway 70. Specific implementation of the access and mobility management network element 90 may be as follows:

The access and mobility management network element 90 may include a processing unit 91 and a communications unit 93. The communications unit 93 may be configured to receive a request message from the access network device 80 (a W-5GAN), where the request message includes identification information of the residential gateway 70 and identification information of the user equipment 60.

The communications unit 93 may be further configured to obtain subscription data of the residential gateway 70 based on the identification information of the residential gateway 70.

The processing unit 91 may be configured to determine a subscription type of the user equipment 60 and/or a service management policy of the user equipment 60 based on the subscription data of the residential gateway 70 and the identification information of the user equipment 60.

The communications unit 93 may be further configured to send indication information of the subscription type and/or indication information of the service management policy of the user equipment 60 to the access network device 80 or the residential gateway 70, where the subscription type indicates a subscriber or a non-subscriber of the residential gateway 70.

In some optional embodiments, to obtain the subscription data of the residential gateway 70, the communications unit 93 may be specifically configured to receive, based on the identification information of the residential gateway 70, the subscription data of the residential gateway 70 from the unified data management network element 100.

In some optional embodiments, to obtain the subscription data of the residential gateway 70, when a context of the residential gateway 70 includes the subscription data of the residential gateway 70, the processing unit 91 may be specifically configured to obtain the subscription data of the residential gateway 70 from the context of the residential gateway 70 based on the identification information of the residential gateway 70.

In some optional embodiments, the subscription data of the residential gateway 70 may include the identification information of the user equipment 60 that is a subscriber of the residential gateway 70. To determine the subscription type the user equipment 60, the processing unit 91 may be specifically configured to: if the identification information of the user equipment 60 belongs to the identification information of the user equipment 60 that is a subscriber of the residential gateway 70, determine that the user equipment 60 is a subscriber of the residential gateway 70.

In some optional embodiments, the subscription data may further include a type of access to the residential gateway 70, where the type of access indicates whether the residential gateway 70 allows access of a non-subscriber.

In some optional embodiments, to determine whether the user equipment 60 is allowed to access the residential gateway 70, the processing unit 91 may be specifically configured to: if the identification information of the user equipment 60 belongs to the identification information of the user equipment 60 that is a subscriber of the residential gateway 70, determine that the user equipment 60 is allowed to access the residential gateway 70.

In some optional embodiments, to determine whether the user equipment 60 is allowed to access the residential gateway 70, the processing unit 91 may be specifically configured to: if the identification information of the user equipment 60 does not belong to the identification information of the user equipment 60 that is a subscriber of the residential gateway 70 but the type of access to the residential gateway 70 indicates that the residential gateway 70 allows access of a non-subscriber, determine that the user equipment 60 is allowed to access the residential gateway 70.

In some optional embodiments, to determine whether the user equipment 60 is allowed to access the residential gateway 70, the processing unit 91 may be specifically configured to: if the identification information of the user equipment 60 does not belong to the identification information of the user equipment 60 that is a subscriber of the residential gateway 70 and the type of access to the residential gateway 70 indicates that the residential gateway 70 does not allow access of a non-subscriber, determine that the user equipment 60 is not allowed to access the residential gateway 70.

In some optional embodiments, the communications unit 93 may be further configured to send the indication information of the service management policy of the user equipment 60 and/or access indication information to the access network device 80 or the residential gateway 70, where the access indication information indicates whether the user equipment 60 is allowed to access the residential gateway 70.

In this application, the identification information of the residential gateway 70 carried in the request message from the access network device 80 (the W-5GAN) is temporary identifier information. The communications unit 93 may be further configured to: obtain the temporary identifier information of the residential gateway 70, and determine the subscription data from the context of the residential gateway 70 based on the temporary identifier information.

To obtain the temporary identifier information of the residential gateway 70, the communications unit 93 may be specifically configured to: The access and mobility management function network element receives the temporary identifier information from the user equipment 60; or receives the temporary identifier information from the access network device 80 accessed by the residential gateway 70. The temporary identifier information from the access network device 80 may be from the residential gateway 70 to the access network device 80; or may be identified by the access network device 80 based on an IP address of the user equipment 60, an identity of a line connected to a fixed network gateway, a VLAN identifier, or an access point identifier of the user equipment 60.

It may be understood that for specific implementation of functional units of the access and mobility management network element 90, refer to the method embodiment in FIG. 4A, FIG. 4B, and FIG. 4C. Details are not described herein.

When the communications system 10 and the communications apparatuses in the communications system 10 may be configured to implement the technical solution described in the embodiment in FIG. 12, specific implementation of the communications apparatuses may be as follows:

As shown in FIG. 10, the access network device 80 may include a processing unit 81 and a communications unit 83. The communications unit 83 may be configured to receive a request message, where the request message includes identification information of a packet data unit PDU session.

The communications unit 83 may be further configured to send a response message to the residential gateway 70, where the response message includes address information that is of the access network device and that corresponds to the PDU session. The address information that is of the access network device and that corresponds to the PDU session is used as a target address for a user plane data packet that is of the PDU session and that is from the residential gateway 70.

In some embodiments, the processing unit 81 may be configured to store a correspondence between the identification information of the PDU session and the address information of the access network device.

In some embodiments, the communications unit 83 may be further configured to receive identification information of the residential gateway 70. The processing unit 81 may be configured to assign an address to the residential gateway 70 based on the identification information of the residential gateway 70. The communications unit 83 may be further configured to send the address of the residential gateway 70 to the residential gateway 70, where the address of the residential gateway 70 is used as a source address for the user plane data packet that is of the PDU session and that is from the residential gateway 70.

In some embodiments, the communications unit 83 may be further configured to receive the user plane data packet that is of the PDU session and that is from the residential gateway 70, where the destination address included in the user plane data packet is the address information that is of the access network device and that corresponds to the PDU session. The processing unit 81 may be further configured to identify the PDU session based on the address information that is of the access network device and that corresponds to the PDU session.

In another solution, the processing unit 81 may be configured to assign user plane address information that is of the access network device and that corresponds to the residential gateway 70. The communications unit 83 may be further configured to send a message to the residential gateway 70, where the message includes the user plane address information, and the user plane address information is used as a destination address for a user plane data packet that is of a PDU session and that is from the residential gateway 70.

In some embodiments, the communications unit 83 may be further configured to receive identification information of the residential gateway 70. The processing unit 81 may be configured to assign an address to the residential gateway 70 based on the identification information of the residential gateway 70. The communications unit 83 may be further configured to send the address of the residential gateway 70 to the residential gateway 70, where the address of the residential gateway 70 is used as a source address for the user plane data packet that is of the PDU session and that is from the residential gateway 70.

In some embodiments, the communications unit 83 may be further configured to receive the user plane data packet from the residential gateway 70, where the destination address in the user plane data packet is the user plane address information of the access network device, and the user plane data packet further includes identification information of the PDU session. The processing unit 81 may be further configured to identify the PDU session based on the identification information of the PDU session. The communications unit 83 may be further configured to send the user plane data packet through a tunnel corresponding to the identified PDU session.

As shown in FIG. 10, the residential gateway 70 may include a processing unit 71 and a communications unit 73 (the user equipment 60 may be implemented in a similar manner, and details are not described).

The communications unit 73 may be configured to send a request message to the access network device 80, where the request message includes identification information of a packet data unit PDU session.

The communications unit 73 may be further configured to receive a response message from the access network device 80, where the response message includes address information that is of the access network device and that corresponds to the PDU session. The address information that is of the access network device and that corresponds to the PDU session is used as a target address for a user plane data packet that is of the PDU session and that is from the residential gateway 70.

In some embodiments, the communications unit 73 may be further configured to send identification information of the residential gateway 70. The communications unit 73 may be further configured to receive an address of the residential gateway 70, where the address of the residential gateway 70 is used as a source address for the user plane data packet that is of the PDU session and that is from the residential gateway 70.

In some embodiments, the communications unit 73 may be further configured to send the user plane data packet of the PDU session, where the destination address included in the user plane data packet is the address information that is of the access network device and that corresponds to the PDU session. The processing unit 71 may be further configured to identify the PDU session based on the address information that is of the access network device and that corresponds to the PDU session.

In another solution, the communications unit 73 may be further configured to receive a message from the residential gateway 70, where the message includes user plane address information, and the user plane address information is used as a destination address for a user plane data packet that is of a PDU session and that is from the residential gateway 70.

In some embodiments, the communications unit 73 may be further configured to send identification information of the residential gateway 70. The communications unit 73 may be further configured to receive an address of the residential gateway 70, where the address of the residential gateway 70 is used as a source address for the user plane data packet that is of the PDU session and that is from the residential gateway 70.

In some embodiments, the communications unit 73 may be further configured to send the user plane data packet, where the destination address in the user plane data packet is user plane address information of the access network device, and the user plane data packet further includes identification information of the PDU session.

When the communications system 10 and the communications apparatuses in the communications system 10 may be configured to implement the technical solution described in the embodiment in FIG. 13, the communications system 10 may further include a policy control network element (which is not shown in the figure) and a session management network element (which is not shown in the figure). Specific implementation of the communications apparatuses may be as follows:

The policy control network element may include a processing unit and a communications unit. The communications unit may be configured to receive a first message from the access and mobility management function network element or the session management network element, where the first message includes indication information of a device type of the user equipment.

The communications unit may be further configured to send a second message to the session management network element, where the second message includes a service management policy that is of the user equipment and that is determined by the policy control network element based on the indication information of the device type of the user equipment.

The service management policy includes a local resource access policy of the residential gateway and/or a QoS policy.

In some embodiments, the communications unit may be further configured to send the local resource access policy to the access and mobility management function network element.

The session management network element may include a processing unit and a communications unit. The communications unit may be further configured to: receive identification information of the user equipment and the indication information of the device type of the user equipment that are from the access and mobility management function network element, and obtain the local resource access policy of the residential gateway.

The processing unit may be configured to control access of the user equipment to a local resource based on the indication information of the device type of the user equipment and the local resource access policy.

In some embodiments, the communications unit may be specifically configured to receive the local resource access policy of the residential gateway from the access and mobility management function network element or the session management network element.

In some embodiments, the processing unit may be configured to configure the local resource access policy.

In some embodiments, the local resource access policy includes address information of a device connected to the residential gateway.

In some embodiments, the communications unit may be further configured to receive a request message from the user equipment, where the request message includes the identification information of the user equipment. The processing unit may be specifically configured to: determine the device type of the user equipment based on the identification information of the user equipment and the indication information of the device type of the user equipment, and control access of the user equipment to the local resource based on the device type of the user equipment and the local resource access policy.

It can be learned that, based on the communications system 10 and the communications apparatuses in the communications system 10 shown in FIG. 10, a 5GC may distinguish different access types of the user equipment based on the subscription data of the residential gateway, to subsequently perform different service control, for example, different QoS control. Particularly, when there are limited network resources, a network side may preferentially guarantee access of a subscriber but restrict access of a non-subscriber. In this way, the 5GC can support more access modes. This improves convergence of a fixed network and a mobile network.

In addition, the communications system 10 and the communications apparatuses in the communications system 10 may alternatively be configured to implement another network access method described in the embodiment in FIG. 5A and FIG. 5B. When the communications system 10 and the communications apparatuses in the communications system 10 may be configured to implement the network access method described in the embodiment in FIG. 5A and FIG. 5B, refer to the embodiment in FIG. 5A and FIG. 5B for specific implementation of the communications apparatuses. Details are not described herein again.

It should be understood that the communications system 10 shown in FIG. 10 may be implemented as the system architectures shown in FIG. 1A to FIG. 1C. The residential gateway 70 may be the 5G-RG in the system architectures shown in FIG. 1A to FIG. 1C, and the user equipment 60 may be the UE connected to the 5G-RG. The access network device 80 may be the W-5GAN in the system architectures shown in FIG. 1A to FIG. 1C, the access and mobility management network element 90 may be the AMF, and the unified data management network element 100 may be the UDM. The access and mobility management network element 90 may include an AMF serving the user equipment and an AMF serving the residential gateway. The two AMFs may be a same AMF, or may be different AMFs. Similarly, the unified data management network element 100 may include a UDM with which the user equipment registers and a UDM with which the residential gateway registers. The two UDMs may be a same UDM, or may be different UDMs.

In conclusion, according to the technical solutions provided in this application, the 5GC can support more access modes. This improves convergence of a fixed network and a mobile network.

A person of ordinary skill in the art may understand that all or some of the procedures of the methods in the embodiments may be implemented by a computer program instructing relevant hardware. The program may be stored in a computer-readable storage medium. When the program is run, the procedures of the methods in the embodiments may be performed. The foregoing storage medium includes any medium that can store program code, such as a ROM, a random access memory RAM, a magnetic disk, or an optical disc.

What is claimed is:

1. A network access method, comprising:
sending, by an access and mobility management function network element, a request message to a unified data management network element, wherein the request message comprises identification information of user equipment and identification information of a residential gateway connected to the user equipment;
determining, by the unified data management network element, subscription data of the residential gateway based on the identification information of the residential gateway;
determining, by the unified data management network element, a subscription type of the user equipment based on the subscription data of the residential gateway and the identification information of the user equipment;
sending, by the unified data management network element and to the access and mobility management function network element, indication information indicating a subscription type of the user equipment; and
determining, by the access and mobility management function network element and based on the subscription type of the user equipment, whether the user equipment is allowed to access the residential gateway.

2. The method according to claim 1, wherein the determining, by the access and mobility management function network element and based on the subscription type of the user equipment, whether the user equipment is allowed to access the residential gateway comprises:
determining, by the access and mobility management function network element, that the user equipment is allowed to access the residential gateway when the subscription type of the user equipment indicates that the user equipment is a subscriber of the residential gateway.

3. The method according to claim 1, further comprising:
sending, by the access and mobility management function network element, an access indication information to an access network device or the residential gateway, wherein the access indication information indicates whether the user equipment is allowed to access the residential gateway.

4. The method according to claim 1, wherein the identification information of the residential gateway is permanent identifier information of the residential gateway, and wherein the method further comprises:
obtaining, by the access and mobility management function network element, temporary identifier information of the residential gateway; and
obtaining the permanent identifier information from a context of the residential gateway based on the temporary identifier information.

5. The method according to claim 4, wherein the obtaining, by the access and mobility management function network element, temporary identifier information of the residential gateway comprises:
obtaining, by the access and mobility management function network element, the temporary identifier information from non-access stratum (NAS) signaling from the user equipment.

6. The method according to claim 4, wherein the obtaining, by the access and mobility management function network element, temporary identifier information of the residential gateway comprises:
obtaining, by the access and mobility management function network element, the temporary identifier information from signaling from an access network device accessed by the residential gateway.

7. The method according to claim 6, wherein the temporary identifier information comprised in the signaling from the access network device is identified by the access network device based on one of an IP address of the user equipment, an identity of a line connected to a fixed network gateway, a virtual local area network (VLAN) identifier, or an access point identifier of the user equipment.

8. A system, comprising:
a unified data management (UDM) network element, comprising:
at least one UDM processor; and
a UDM non-transitory computer-readable storage medium coupled to the at least one UDM processor and storing UDM programming instructions for execution by the at least one UDM processor; and
an access and mobility management function (AMMF) network element, comprising:
at least one AMMF processor; and
an AMMF non-transitory computer-readable storage medium coupled to the at least one AMMF processor and storing AMMF programming instructions for execution by the at least one AMMF processor, wherein the AMMF programming instructions instruct the at least one AMMF processor to cause the access and mobility management function network element to:
send a request message to the unified data management network element, wherein the request message comprises identification information of user equipment and identification information of a residential gateway connected to the user equipment, and wherein the UDM programming instructions instruct the at least one UDM processor to cause the unified data management network element to:
determine subscription data of the residential gateway based on the identification information of the residential gateway;
determine a subscription type of the user equipment based on the subscription data of the residential gateway and the identification information of the user equipment; and
send indication information indicating a subscription type of the user equipment to the access and mobility management function network element, wherein the AMMF programming instructions further instruct the at least one AMMF processor to cause the access and mobility management function network element to:
determine whether the user equipment is allowed to access the residential gateway based on the subscription type of the user equipment.

9. The system according to claim 8, wherein the determine whether the user equipment is allowed to access the residential gateway based on the subscription type of the user equipment comprises:
determine that the user equipment is allowed to access the residential gateway when the subscription type of the user equipment indicates that the user equipment is a subscriber of the residential gateway.

10. The system according to claim 8, wherein the AMMF programming instructions further instruct the at least one AMMF processor to cause the access and mobility management function network element to send an access indication information to an access network device or the residential gateway, wherein the access indication information indicates whether the user equipment is allowed to access the residential gateway.

11. The system according to claim 8, wherein the identification information of the residential gateway is permanent identifier information of the residential gateway, and wherein the AMMF programming instructions further instruct the at least one AMMF processor to cause the access and mobility management function network element to:
obtain temporary identifier information of the residential gateway; and
obtain permanent identifier information from a context of the residential gateway based on the temporary identifier information.

12. The system according to claim 11, wherein the obtain temporary identifier information of the residential gateway comprises:
obtain the temporary identifier information from non-access stratum (NAS) signaling from the user equipment.

13. The system according to claim 11, wherein the obtain temporary identifier information of the residential gateway comprises:
obtain the temporary identifier information from signaling from an access network device accessed by the residential gateway.

14. The system according to claim 13, wherein the temporary identifier information comprised in the signaling from the access network device is identified by the access network device based on one of an IP address of the user equipment, an identity of a line connected to a fixed network gateway, a virtual local area network (VLAN) identifier, or an access point identifier of the user equipment.

15. An apparatus, comprising:
at least one processor; and
a memory coupled to the at least one processor and storing instructions for execution by the at least one processor, wherein the instructions instruct the at least one processor to cause the apparatus to:
send a request message to a unified data management network element, wherein the request message comprises identification information of user equipment and identification information of a residential gateway connected to the user equipment;
receive indication information indicating a subscription type of the user equipment from the unified data management network element; and
determine whether the user equipment is allowed to access the residential gateway based on the subscription type of the user equipment.

16. The apparatus according to claim 15, wherein the determine whether the user equipment is allowed to access the residential gateway based on the subscription type of the user equipment comprises:
determine that the user equipment is allowed to access the residential gateway when the subscription type of the user equipment indicates that the user equipment is a subscriber of the residential gateway.

17. The apparatus according to claim 15, wherein the instructions further instruct the at least one processor to cause the apparatus to send an access indication information to an access network device or the residential gateway, wherein the access indication information indicates whether the user equipment is allowed to access the residential gateway.

18. The apparatus according to claim 15, wherein the identification information of the residential gateway is permanent identifier information of the residential gateway, and wherein the instructions further instruct the at least one processor to cause the apparatus to:
obtain temporary identifier information of the residential gateway; and
obtain the permanent identifier information from a context of the residential gateway based on the temporary identifier information.

19. The apparatus according to claim 18, wherein the obtain temporary identifier information of the residential gateway comprises:
obtain the temporary identifier information from non-access stratum (NAS) signaling from the user equipment.

20. The apparatus according to claim 18, wherein the obtain temporary identifier information of the residential gateway comprises:
obtain the temporary identifier information from signaling from an access network device accessed by the residential gateway.

* * * * *